United States Patent [19]

Schmit et al.

[11] 4,382,867
[45] May 10, 1983

[54] IN PLACE GAS CLEANING OF DIFFUSION ELEMENTS

[75] Inventors: Frank L. Schmit, Port Washington; David T. Redmon, Racine; Lloyd Ewing, Bayside, all of Wis.

[73] Assignee: Water Pollution Control Corporation, Milwaukee, Wis.

[21] Appl. No.: 203,834

[22] Filed: Nov. 4, 1980

Related U.S. Application Data

[63] Continuation-in-part of Ser. No. 191,974, Sep. 29, 1980, abandoned.

[51] Int. Cl.³ .............................................. C02F 3/20
[52] U.S. Cl. ...................................... 210/754; 134/29; 134/170; 261/122
[58] Field of Search ................ 210/749, 754, 28, 759, 210/760; 261/122; 134/170, 29; 55/96

[56]  References Cited
U.S. PATENT DOCUMENTS

| | | | |
|---|---|---|---|
| T975,002 | 10/1978 | Linda | 210/62 |
| 2,318,728 | 5/1943 | Werking | 261/122 |
| 2,684,330 | 7/1954 | French | 210/8 |
| 2,686,138 | 8/1954 | Klein | 134/15 |
| 2,686,139 | 8/1954 | Lamb et al. | 134/29 |
| 2,689,714 | 9/1954 | French | 261/39 |
| 2,771,416 | 11/1956 | Ryan | 210/16 |
| 2,774,585 | 12/1956 | Wirts | 261/122 |
| 2,815,943 | 12/1957 | Lamb | 261/122 |
| 2,826,209 | 3/1958 | Klein et al. | 134/170 |
| 2,947,525 | 8/1960 | Klein | 261/122 |
| 3,206,178 | 9/1965 | Lamb | 261/122 |
| 3,315,895 | 4/1967 | Klingbeil et al. | 239/145 |
| 3,416,776 | 12/1968 | Gamer | 261/122 |
| 4,132,637 | 1/1979 | Key et al. | 210/7 |
| 4,261,932 | 4/1981 | Ewing et al. | 261/122 |
| 4,261,933 | 4/1981 | Ewing et al. | 261/122 |

FOREIGN PATENT DOCUMENTS 721725  1/1955  United Kingdom .
1348658  3/1974  United Kingdom .

OTHER PUBLICATIONS

W. M. Franklin "Purging Diffuser Plates With Chlorine", *Water Works and Sewerage*, Jun. 1939, pp. 232-233.
R. B. Jackson, "Maintaining Open Diffuser Plates With Chlorine", *Water Works & Sewerage*, Sep. 1942, pp. 380-382.
Manuel of Practice No. 5, Federation of Sewage and Industrial Waste Associations, 1952, pp. 48-62.
A. J. Beck "Diffuser Plate Studies", *Sewage Works Journal*, Jan. 1936, pp. 22-37.
L. R. Setter et al. "Experimental Laundering of Air Diffuser Plates", *Sewage Works Journal*, Sep. 1945, pp. 867-877.
L. R. Setter "Air Diffusion Problems at Activated Sludge Plants", *Water and Sewage Works*, Dec. 1948, pp. 450-456.
M. Lamb "Designing and Maintaining Porous Tube Diffusers", *Wastes Engineering*, Sep. 1954, pp. 405-411.
P. F. Morgan "Clogging Studies of Fine Bubble Diffuser Media", *Sewage and Industrial Wastes*, Feb. 1959, pp. 153-163.
Manual of Practice No. 5, Federation of Sewage and Industrial Waste Associations, 1971, pp. 65-74.
Hydroceramic Co. literature carrying a 1978 copyright date, p. 1, Forward; p. 42, Appendix; Cover sheet identified as Hydroceramic & G. A. Boulier, Appendix A. The Lasaire System Diffuser Maintenance, pp. 1-7.

*Primary Examiner*—Thomas G. Wyse
*Attorney, Agent, or Firm*—Pollock, Vande Sande and Priddy

[57]  ABSTRACT

Cleaning of multi-pore diffusion elements in place with cleaning gases while submerged in liquid media by applying said cleaning gases intermittently or continuously to said diffusion elements between predetermined limits of operating pressure and flow through flow regulation means and plenums for the respective diffusion elements.

80 Claims, 44 Drawing Figures

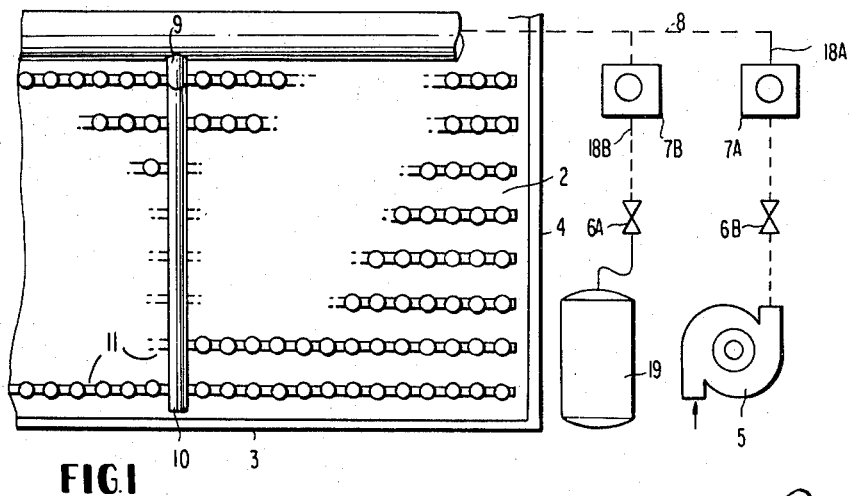
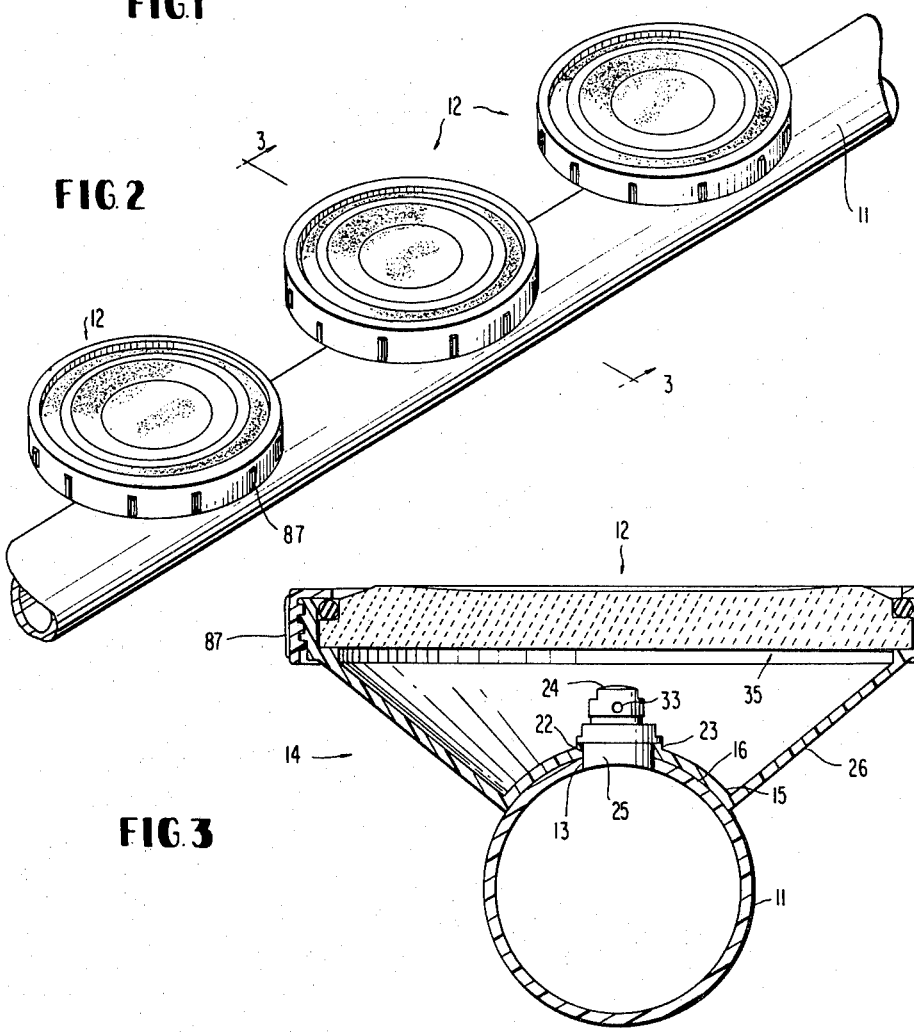
FIG.1
FIG.2
FIG.3

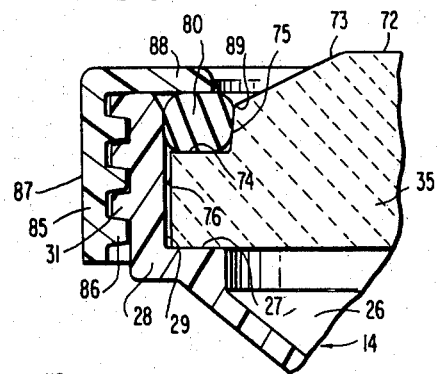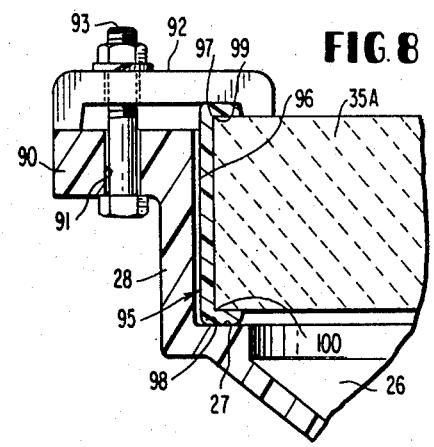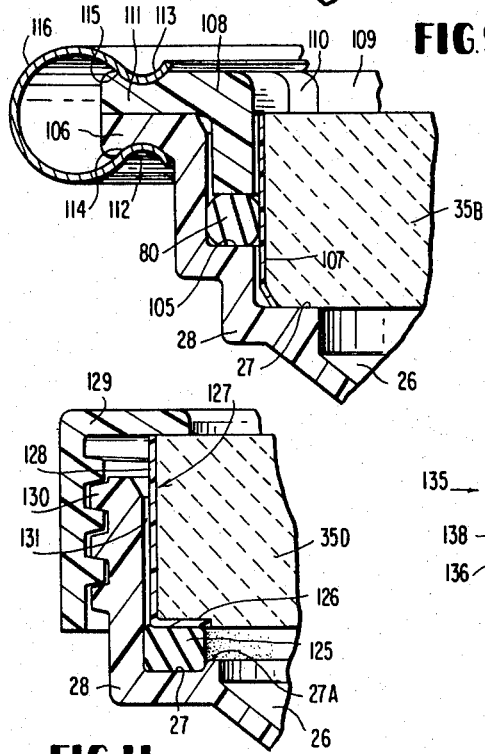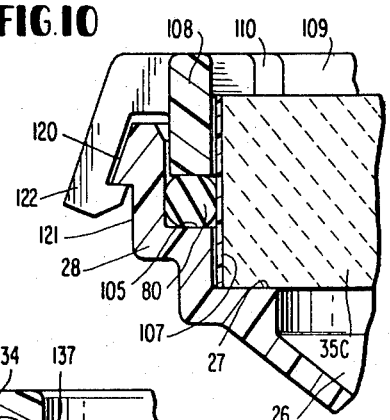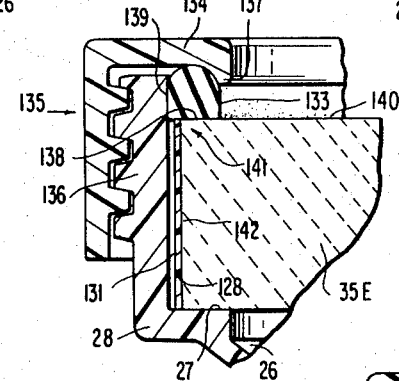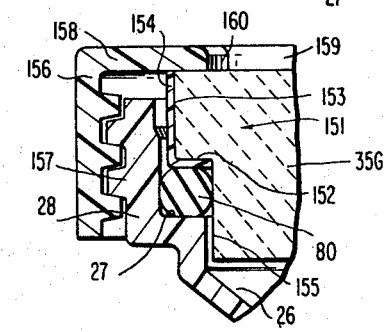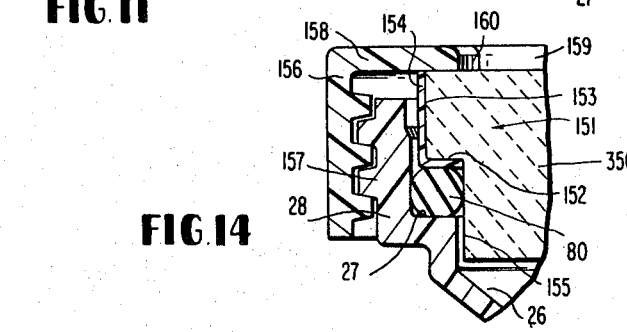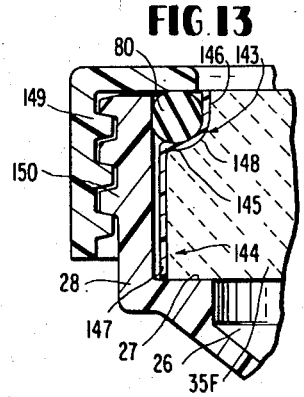

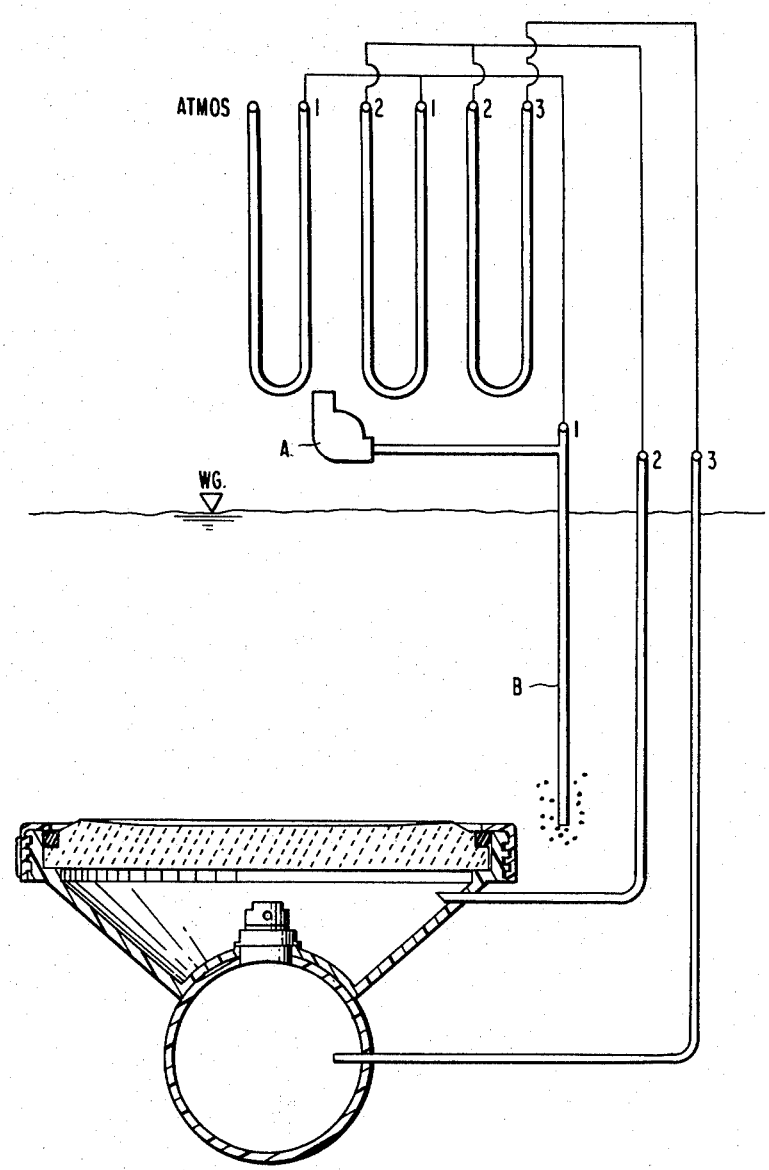

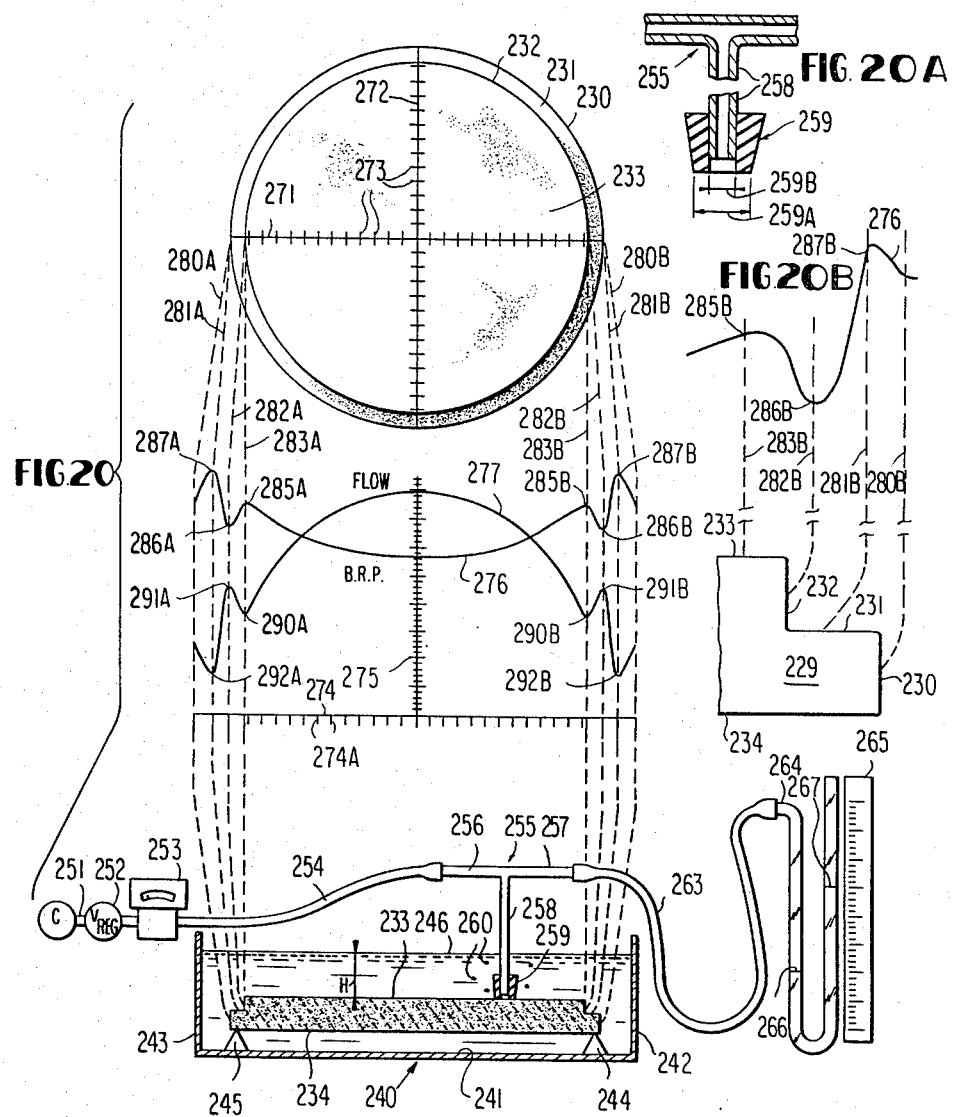

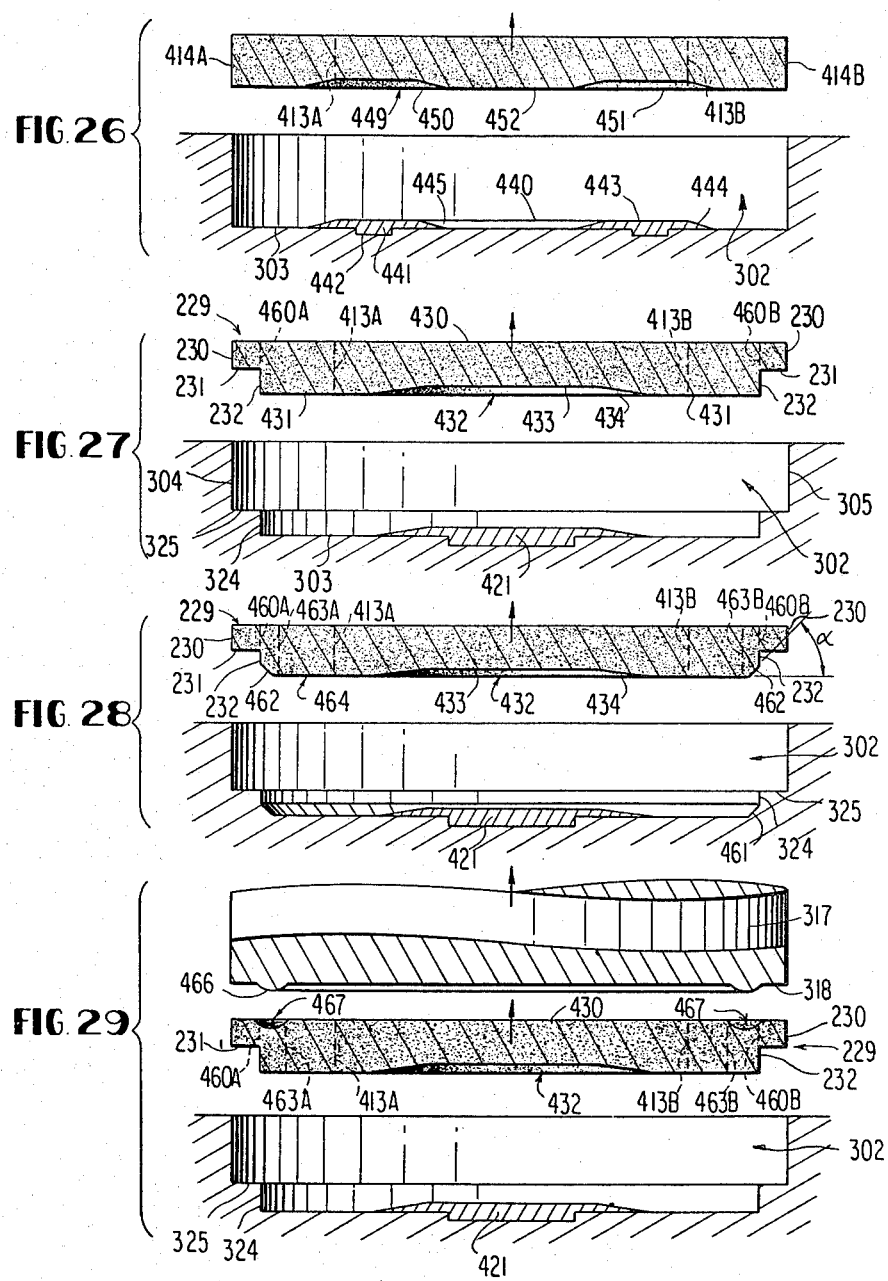

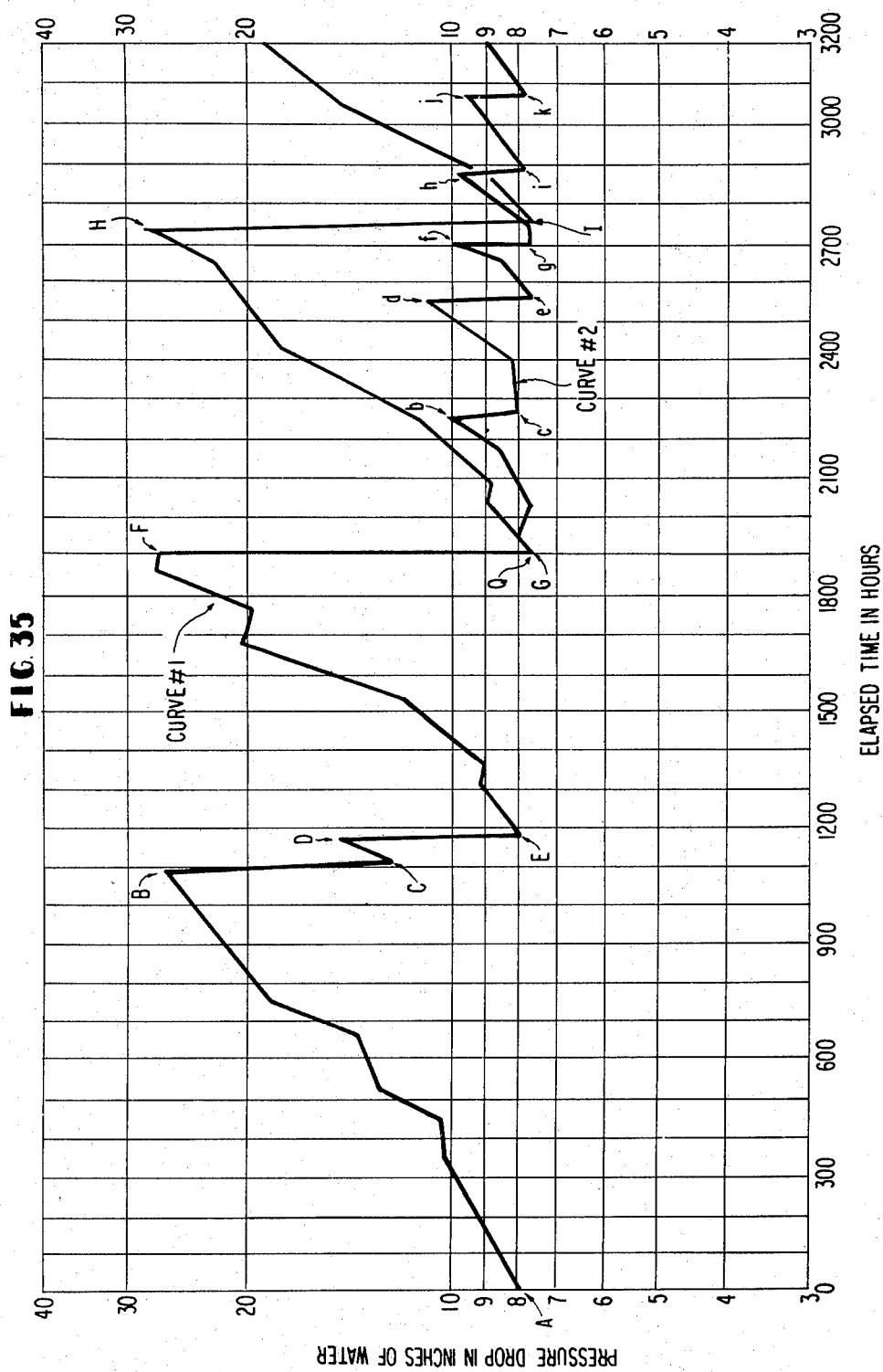

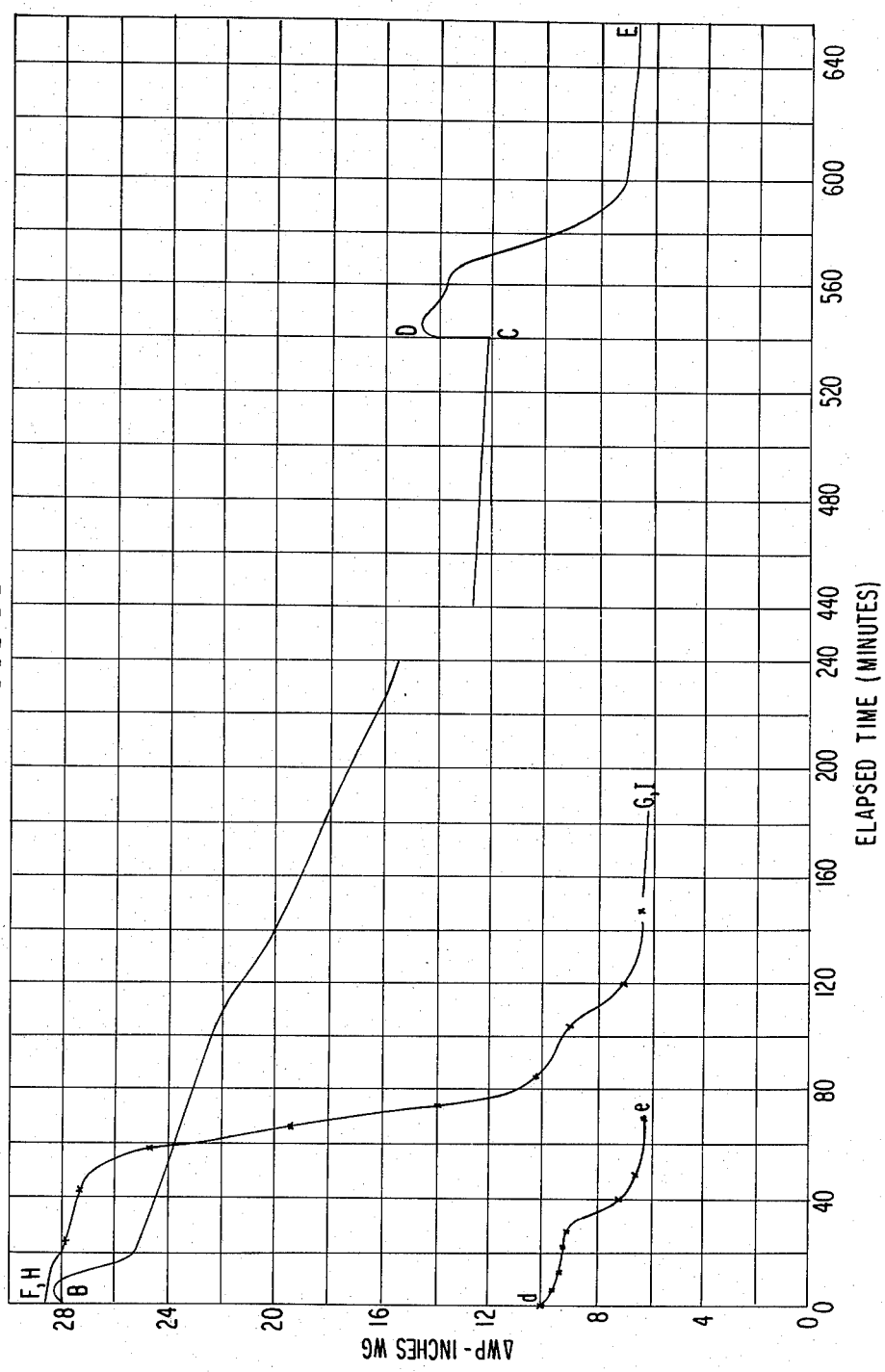

IN PLACE GAS CLEANING OF DIFFUSION ELEMENTS

This application is a continuation-in-part of Ser. No. 191,974, filed on Sept. 29, 1980, now abandoned.

FIELD OF THE INVENTION

The present invention relates to the treatment of liquid media containing organic and/or inorganic foulants. More particularly the invention relates to the cleaning of multipore diffusion elements while submerged in liquid media including such foulants.

BACKGROUND OF THE INVENTION

The aeration of waste liquid media, including for example domestic sewage and industrial waste waters, is an old art. The activated sludge process, which includes aeration of liquors containing domestic sewage, has been in continuous use for about sixty years.

The liquid media treated in such aeration processes very commonly contain organic and/or inorganic foulants such as for example relatively insoluble salts which are responsible for the hardness of the water, and living and non-living organic residues which contribute to the formation of scales and slimes. Upon aeration of these media with submerged aeration devices, there is a tendency for the foulants to progressively foul such devices at the point of release of oxygen-containing gas into the liquid media, closing up or otherwise modifying the openings through which the oxygen-containing gas is released into the media with various undesirable results.

Such fouling can impair the uniformity of gas distribution from aeration devices, especially when such devices are of the area discharge type, such as for example the flat porous ceramic plates which were used to discharge air into sewage liquors in early activated sludge plants. Also, fouling can in certain circumstances increase the pressure differential required to drive oxygen-containing gas through the aeration devices at a given flow rate, thus either reducing the flow of oxygen available, and therefore the oxygen transfer rate of the aeration system, and/or increasing the amount of power consumed in maintaining the desired rate of flow, thus substantially increasing the energy requirements and cost of the process.

Since these fouling phenomena are often progressive in nature they can eventually lead to a complete or near complete disablement of the aerating devices if permitted to continue long enough. However, a long-standing recognition of the intolerable circumstances that can result from failure of a sewage treatment plant has provided considerable encouragement for persons skilled in the art to explore remedial measures.

The fouling problem has been discussed and confronted in various ways with varying degrees of success for many years. Literature references discussing the problem and proposed solutions were available in the 1930s. These and subsequent publications demonstrate the severity of the problem and the elusiveness of any truly satisfactory solution. At a very early stage it was recognized that the removal of diffusion elements from an aeration tank for cleaning was both inconvenient and relatively expensive in view of the labor costs and the loss of use of the facility. Accordingly various attempts were made to develop satisfactory processes for cleaning the aeration devices in place, i.e. without removal from the aeration tanks and, wherever possible, without draining the liquid media from the tanks.

One of the techniques tried was injection of chlorine gas into the aeration system in admixture with air while the aeration system was in operation. A measure of success was obtained in that there was reduction of flow resistance and apparently some prolongation of the life of the elements. However, such techniques were only sporadically successful.

For example, R. B. Jackson reported in his article "Maintaining Open Diffuser Plates With Chlorine", Water Works & Sewerage, September 1942, pages 380–382, that the application of chlorine, whenever required, was effective in maintaining operation for a period of time, following which it again became necessary to drain the aeration tank and clean the decommissioned diffusion elements with liquid cleaners including acids. But Jackson was only one of a number of individuals who experimented with in place cleaning with gaseous cleaning agents in a variety of plants. See for example W. M. Franklin, "Purging Diffuser Plates With Chlorine", Water Works & Sewerage, June 1939, pages 232–233; "Manual of Practice No. 5", Federation of Sewage and Industrial Wastes Associations, Champaign, Illinois, 1952, pages 60–61; and U.S. Pat. No. 2,686,138 to Klein.

However, despite the early attempts at perfecting this technique, it has not been widely regarded as generally acceptable heretofore for large sewage treatment plants with multi-pore diffusion elements.

It is of interest to note that sewage treatment plant designers are generally familiar with the tubing-type diffusers for the sewage treatment ponds or lagoons used by small communities. Such systems usually employ rows of small diameter plastic tubing resting on or suspended above the bottom of a lagoon or basin and having small holes or slits formed in the tubing at relatively widely spaced intervals along the length of the tubing. For example, one commercially available type of tubing-type diffuser marketed by Lagoon Aeration Corporation under the trademark LASAIRE is weighted tubing having an inside diameter of approximately one-half inch with a small bore on the order of 0.012" in diameter about every four inches along the crown of the tubing. Another commercially available form of tubing type diffuser employs slits instead of bores. Still another type employs rigid plastic tubing having small porous ceramic inserts cemented into the tubing wall instead of the bores or slits previously mentioned. Sanitary engineers are, of course, aware of the successful cleaning of such tubing type diffusers by the addition of a cleaning gas such as hydrogen chloride to the oxygen-containing gas, which mixture is forced through the bores, slits or small ceramic inserts, while the latter are in place submerged in the liquid media, to remove incrustations of organic and/or inorganic foulants.

Notwithstanding the apparent success of in place gas cleaning of tubing-type diffusers and the long-standing knowledge of and early attempts at in place gas cleaning of the multi-pore area release diffusion elements customarily employed in the tank-type aeration facilities generally used by large cities and counties, gas cleaning in place has not been generally adopted for such facilities. Considering the long-standing nature of the fouling problem and the fact that the technology relating to in place gas cleaning of tubing type diffusers has been readily available to sewage plant designers for years, it might seem reasonable to assume that in place gas cleaning would have long ago become the technique of choice for the tank-type aeration facilities equipped with multi-pore diffusion elements. That it has not become a commonly used method bears silent but effective witness to the fact that a practical, economical and dependable technique for in place gas cleaning of multi-pore diffusion elements in tank-type aeration facilities was not obvious to plant designers and operators of ordinary skill in the art.

Further evidence of such non-obviousness is provided by the willingness of facility operators to indulge in such inconvenient, time consuming and expensive measures as removing the unit from service, draining the tank, doing preliminary cleaning of the tank and of the fouled diffusion elements with fire hoses and the like, removing literally tons of elements from the tanks, transporting them to a cleaning facility, subjecting them to acid and/or caustic solution cleaning, drying the elements, refiring them at elevated temperatures, replacing the rather substantial number of elements which are inevitably destroyed by cracking or warping in the refiring process, transporting the elements back to the plant, reinstalling them with removal of damaged gasket material from the holders, installation of new gaskets, retightening and torqueing of the means for holding the diffusion elements in their holders, refilling the tank and returning the facility to operation.

Additional evidence has been provided by a study entitled "Survey and Evaluation of Fine Bubble Dome Diffuser Aeration Equipment", by Daniel H. Houck and Arthur G. Boon, completed Sept. 15, 1980, in fulfillment of a grant from the Association of Metropolitan Sewerage Agencies and the British Water Research Centre under the partial sponsorship of the U.S. Environmental Protection Agency. While making an in-depth review of the designs, operating procedures, preformance and maintenance procedures of U.S. and overseas activated sludge plants equipped with fine bubble diffusers, the investigators surveyed fouling problems and cleaning methods. None of the plants which required periodic cleaning employed in-place gas cleaning. Among the cleaning methods used for ceramic diffusion elements were refiring, acid washing combined with clean water-and steam-cleaning, ultrasonic cleaning, hand brushing and others. The study provided detailed information and observations in the costliness of and limited economic justification for refiring. Nevertheless, it was recommended on grounds of established effectiveness that refiring and/or acid washing be used where possible. But the study also uncovered evidence that acid washing did not adequately clean ceramic diffusion elements fouled with scale, apparently calcium carbonate, and that the diffusion elements should be refired for proper cleaning.

Plainly the need for an in-place gas cleaning technique suitable for tank-type plants with the multi-pore diffusion elements has existed for more than forty years. However, the willingness of plant designers, operators and government officials to accept or even promote the above described disruptive, lengthy, troublesome and expensive procedure shows that the solution to the problem is not in fact evident. The present invention is aimed at fulfilling this need.

SUMMARY OF THE INVENTION

In common with prior technology the invention includes passing a treating gas through multi-pore diffusion elements submerged in liquid media. Foulants in the media or treating gas have a tendency to form organic and/or inorganic deposits within the elements or at their surfaces, and particularly adjacent the liquid media. As in prior attempts at a satisfactory process, a cleaning gas is passed through the elements, alone or in admixture with the treating gas. The cleaning gas or mixture of cleaning gas and treating gas is one which is aggressive towards the aforementioned deposits, thereby tending to dissolve and/or dislodge them.

According to the invention, gas cleaning is conducted with sufficient frequency, including continuously, to prevent fouling from progressing beyond a predetermined extent. The extent of fouling can, for example, be characterized in terms of an increased level of dynamic wet pressure or of mean bubble release pressure of the diffusion elements relative to a previous base condition of said elements. For example, cleaning gas may be applied with sufficient frequency and in sufficient amount for restricting any increase in the dynamic wet pressure level of the elements, above their base condition, to an amount which is equal or equivalent to about 25 inches or less, more preferably about 15 inches or less and still more preferably about 7 inches or less of water gauge at 2 SCFM per square foot of active gas discharge surface. Alternatively, cleaning gas may be applied with sufficient frequency and in sufficient amount for restricting any increase in the mean bubble release pressure of the elements, above their base condition, to about 25 inches or less, preferably about 15 inches or less and still more preferably about 7inches or less of water gauge.

The cleaning gas is fed to the elements through a gas distribution network having a submerged portion and which includes in said submerged portion a plurality of flow-regulating means. The flow regulating means are sized or adjusted to deliver cleaning gas alone or in admixture with treating gas at a substantially similar rate to each of a plurality of plenums, each of the plenums being connected directly or indirectly with one or more diffusion elements whereby the one or more diffusion elements connected with each plenum can be supplied with gas at a substantially similar rate as compared to the diffusion elements connected to the other plenums.

Treating gas, alone or in admixture with cleaning gas, is discharged through the diffusion elements for an extended cycle of operation which may constitute at least about 30, more preferably at least about 90 and still more preferably at least about 365 total days of continuous or intermittent passage of treating gas through the elements. During said cycle, fouling is restrained (including retardation, prevention and/or removal of deposits) by applying the cleaning gas with sufficient frequency and in sufficient amounts to maintain the dynamic wet pressure and/or mean bubble release pressure at or below the levels described above.

One of many kinds of liquid treatment apparatus useful for practicing the invention includes a gas distribution network in a tank. Such apparatus includes means for introducing into said network a treating gas and, periodically, cleaning gas, alone or in admixture with the treating gas. A plurality of flow regulating means is distributed about in a submerged portion of the network for receiving the aforementioned gases and for discharging them at predetermined flow rates. Also included in the system is a plurality of multi-pore area release diffusion elements which are members each comprising a multiplicity of closely spaced fine pores defining paths for discharge of said gases, and which exhibit an increase in dynamic wet pressure, as compared to a base condition of said pressure, through deposition of organic and/or inorganic foulants. Each of the diffusion elements is connected to its own individual flow regulating means through its own individual plenum downstream of the flow regulating means.

Many possible variations of the invention which are also considered to be inventions in their own right are disclosed in conjunction with various and preferred embodiments discussed below and/or shown in the accompanying drawings. On the other hand, the invention can be embodied in an even wider variety of forms than can be specifically discussed and illustrated herein. Thus the various and preferred embodiments and examples set forth in the text which follows and in the accompanying drawings are to be regarded as illustrative and not limiting with respect to the scope of the invention.

Possible Theoretical Considerations

In order for a gas to flow through a gas discharge passage of a diffusion element and bubble into a liquid medium, there must be a relatively higher pressure in the gas at the influent end of the passage as compared to the pressure in the liquid at the effluent end of the passage. This difference in pressure may be referred to as pressure loss.

A substantial portion of the pressure loss is attributable to the force exerted on the gas by liquid surface tension at the location where bubbles are formed. Frictional resistance to the flow of gas in the passage also contributes, but to a lesser degree, to the total pressure loss across the element.

The magnitude of the surface tension component of the pressure loss varies inversely with the effective hydraulic radius of the passage at the location where bubbles are formed. Thus, the surface tension component of pressure loss tends to be larger for smaller passages and vice versa.

The frictional resistance component of pressure loss varies inversely with pore diameter. Thus this component tends to be larger in smaller pores and vice versa.

Pressure loss through a passage is also affected by the rate of flow of gas through the passage. Surface tension forces are not greatly affected by flow rate at typical rates for multi-pore diffusion elements, but the frictional resistance to flow is directly related to the flow rate. Thus an increase or decrease in flow rate through a passage respectively increases or decreases the total pressure loss.

Each diffusion element, when new, for a given gas or gas mixture, under given conditions of flow, temperature, gas viscosity, barometric pressure and humidity, will have a characteristic pressure loss, as well as a characteristic rate of flow at a given pressure loss. The pressure/flow characteristics of diffusion elements are often expressed in terms of dynamic wet pressure. The pressure loss and dynamic wet pressure of an element represent combined effects of different flows through many individual passages throughout the element.

There are significant variations in pressure/flow characteristics among diffusion elements. Individual pores in a given element differ in their pressure/flow characteristics due to differences in the shape, size and hydraulic radii of the passages or pores. Considering the state of the art it is challenging to manufacture a run of hundreds or thousands of diffuson elements in which most or all of the elements exhibit substantially the same pressure/flow characteristics. Moreover, as elements are used in liquid media containing foulants, the foulants can clog the passages or pores at their inlets, interior portions, outlets or any combination thereof in such a manner as to reduce pore diameter and/or effective hydraulic radius, with a consequent effect on the pressure/flow relationships of the element. Thus, all other factors remaining equal or equivalent, fouling tends to reduce the rate of flow at a given pressure or increase the amount of pressure required to maintain a given flow rate.

Without intending to be bound by any theory, the applicants offer the following theoretical explanation which may be indicative of the operation of the invention and the nature of certain advantages which may accrue from its use. When an element is new, it is believed that the flow of gases through the element is preferentially directed through those pores having the lowest combined frictional and surface tension resistance. It appears that other pores with a higher combined frictional and surface tension resistance would remain less active or perhaps inactive, at least temporarily. According to this theory, as the active or most active pores begin to clog through deposits of foulants, flow is reduced. If the system operating pressure is increased in order to maintain flow, progressively more and more of the pores which were originally active or most active continue to clog, and some of the less active pores characterized by higher pressure loss are now able to transmit gas due to the increased pressure. It is visualized that the aforementioned portion of the less active pores will themselves become clogged eventually. If the system pressure again increases, additional less active pores, characterized by an even higher pressure loss, will then become active. It is visualized that progressive clogging and the increasing of pressure to maintain flow can proceed to such an extent that most of the available pores in the diffusion element have been clogged. If in place gas cleaning is performed in a conventional manner at this point in the history of the element, it is theorized that because of the aggravated clogging of the element, the cleaning gas will pass through only a relatively few pores, such as for example, those small pores which were among the last to become active and perhaps some larger pores which were not fully obstructed when cleaning was commenced.

According to this theory, as the cleaning gas passes through the few pores referred to above, and the deposits on and within them are reduced, there is a resultant rapid increase in flow through these passages or pores. Such increase tends to reduce the gas pressure available at the influent surface of the element to drive cleaning gas through other clogged pores or passages which, as a result of clogging, are characterized by a higher resistance to flow than the few passages which have been cleaned. The available pressure may now be so low that it is unable to overcome the effects of frictional resistance and surface tension in many or most of the clogged passages. Unfortunately, if the theory is correct, those passages or pores on which the cleaning will have limited or no beneficial effect are some of those which were the first to clog and which would have had the potential or providing the maximum flow at a given system operating pressure and therefore would have provided the greatest potential for saving power through cleaning.

The foregoing theory, if correct, may explain why diffusion elements were frequently not restored to their original levels of pressure loss by in place gas cleaning. Possibly, such inability may also have resulted from the use of inadequate quantities of cleaning gas. Such failure may in some cases have occurred because there was no provision for individual flow regulating means for each diffusion element or group or diffusion elements. Such lack may have caused the flow of cleaning gas to seek out and pass through those diffusion elements which were among the last to become active in preference to those which had clogged earlier, so that application of the cleaning gas was ineffective in restoring the system to its original condition or flow capabilities. The invention provides the opportunity of overcoming the above mentioned difficulties by applying the cleaning gas early and with frequency in the clogging history of the elements and/or with individual flow regulating means for the elements.

The adverse effects of delayed frequency of cleaning may be reduced and the efficiency of cleaning according to the invention may be enhanced by a number of techniques and facilities, including but not limited to: division of the diffusion elements in a diffusion system into groups, which groups may be cleaned separately and independently from other groups; providing means for operating the diffusion elements in one of the aforementioned groups, during cleaning, at flow rates and/or pressure differentials higher than flow rates and/or pressure differential for the groups in the remainder of the system; provision of flow control means for diffusion elements that will apply relatively higher plenum pressure to elements operating at lower air flow rates and vice versa; temporarily lowering the surface tension at the interfaces of the liquid medium and diffusion elements while the latter are being cleaned; initiating gas cleaning with the diffusion elements are operating at relatively low mean dynamic wet pressure and/or mean bubble release pressure; initiating cleaning prior to the onslaught of load fluctuations creating peak demand for treating gas, such as for example peak seasonal demand conditions of activated sludge plants; and providing means for manipulating liquid levels in the tanks in the system.

BRIEF DESCRIPTION OF THE DRAWINGS

FIG. 1 is a fragmentary view of a sewage aeration system including a sewage aeration tank, an air supply main, means for introducing a mixture of aeration gas and cleaning gas into said air supply main, a downcomer pipe, distribution pipes, header pipes and diffusers.

FIG. 2 is a perspective view of a section of header pipe and diffusers of FIG. 1.

FIG. 3 is a vertical transverse cross section of the header pipe and one of the diffusers of FIG. 2 taken on section line 3—3 of FIG. 2.

FIG. 7 is an enlarged portion of FIG. 3 showing the peripheral edge of the diffusion element in transverse cross section, along with portions of the plenum, retaining means and sealing means.

FIGS. 8 to 14 show the same portion of the apparatus as FIG. 7, but with varying modification to the diffusion element retaining means and sealing means.

FIG. 19 is a sectional view, partly schematic, showing a portion of a gas distribution network, flow regulating means, a diffusion element and its holder, and means for determining pressure and flow data useful in the practice of the invention.

FIG. 20 is a diagrammatic illustration, partly in section, including a gas diffusion element, an apparatus for determining the bubble release pressure of the element and a graphical representation of the bubble release pressure and corresponding flow characteristics of the element.

FIG. 20A is an enlarged portion of the probe of FIG. 20.

FIG. 20B is an enlarged and foreshortened portion of the element and bubble release pressure curve of FIG. 20.

FIGS. 21 through 29 are fragmentary, diagrammatic, transverse sectional views disclosing diffusion elements in accordance with the present invention and illustrative methods for manufacturing same.

FIG. 35 is a graph of the results of illustrative examples set forth below.

FIG. 36 is an enlargement of portions of certain of the curves illustrated in FIG. 35.

VARIOUS AND PREFERRED EMBODIMENTS

Figure 4:
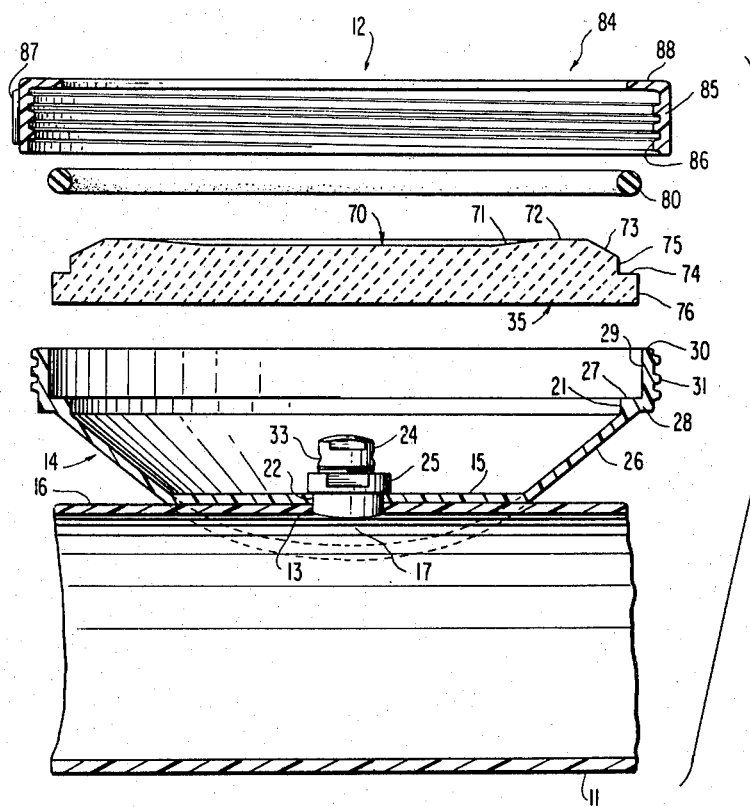
FIG. 4 is a longitudinal cross section of the diffuser and pipe of FIG. 3, the component parts of the diffuser being exploded for clarity.

Although the invention will most commonly be used in aeration systems for the biological treatment of wastewater, it is useful in the treatment of aqueous or non-aqueous liquids with or without biological and non-biological foulants. See the definition of foulants below.

Any suitable cleaning gas which is aggressive towards the foulants may be used as cleaning gas for purposes of the present invention. See the definition of cleaning gas below.

According to a particularly preferred embodiment of the invention, the treating gas is an oxygen-containing gas, especially air, the cleaning gas is hydrogen chloride gas (HCl), the liquid medium is wastewater containing domestic sewage, and the treatment facility is a tank-type activated sludge plant.

In typical sewage treatment plant operation, unrestrained deposition of foulants will normally cause a substantial increase in the dynamic wet pressure of the diffusion elements, or a substantial increase in the mean bubble release pressure of the elements, measured at the influent and/or effluent surfaces(s) of the elements, or a substantial increase in both of said pressures. For example, substantial deposits of foulants concentrated at the gas effluent surfaces of the diffusion elements may result in appreciable increases of both the dynamic wet pressure of the elements and the mean bubble release pressure measured at the effluent surfaces, while resulting in no change in bubble release pressure at the influent surfaces. Alternatively, minor deposits of foulants concentrated at the gas influent surfaces of the diffusion elements can result in appreciable increase in mean bubble release pressure at these influent surfaces, no change in bubble release pressure at the element effluent surfaces, and an increase in dynamic wet pressure across the elements which may be within the limits of experimental error of the dynamic wet pressure measuring technique and may therefore not be measurable in any practical sense. But major deposits of foulants concentrated at the influent surfaces can result in appreciable measurable increases in dynamic wet pressure, and in bubble release pressure at the influent surfaces, even if there were no measureable increase in bubble release pressure at the effluent surfaces.

According to the invention, cleaning is conducted in such a manner as to restrain formation of foulant deposits in the diffusion elements. Included in restraining are operations which prevent or retard the formation of such deposits or which remove at least a portion of accumulated deposits from time to time, whereby the extent of fouling of the diffusion elements is controlled. Thus, for example, cleaning gas may be applied with sufficient frequency to prevent any appreciable amount of deposits from forming, in which case it could be possible that no increase in either the dynamic wet pressure or the mean bubble release pressure of the elements would be observed. Another example of restraining would include treatment with cleaning gas with a frequency which was not effective to completely prevent the formation of appreciable deposits of foulants in the diffusion elements, but which was sufficient to discourage the growth of organic or other foulants and thereby maintain the dynamic wet pressure and/or mean bubble release pressure of the elements within one or more of the ranges set forth above over an extended cycle of operation. Also, at different times and under different conditions a given plant may be operated in any of the modes described above, i.e. the prevention, retardation or removal modes.

Whether the process is operated in the prevention, retardation or removal mode, the cleaning gas may be applied continuously or intermittently, including application at sporadic or periodic time intervals. For example, it is contemplated that cleaning gas may be applied substantially continuously for an extended cycle of operation, following which the application of cleaning gas may be either suspended for a time or may be intermittent, for example when the concentration of foulants in the liquid medium or treating gas is reduced for some reason, or when conditions in the process become less hospitable to the formation of foulant deposits. Alternatively, where the normal plant procedure is to conduct cleaning intermittently during one or more extended cycles of operation, there may be continuous cleaning from time to time, for example when seasonal or other factors cause the concentration of foulants in the liquid medium or treating gas to increase to an unusually high level. This is one example of situations in which it could prove advantageous to feed cleaning gas continuously before any increase in dynamic wet pressure and/or mean bubble release pressure is apparent. Also, continuous application of cleaning gas may for example be employed when the system is being used in the practice of recarbonation. Hydrogen chloride is the preferred cleaning gas for continuous cleaning.

It is preferred however to apply the cleaning gas intermittently and to initiate the application of cleaning gas at or before the time when foulding has progressed to a predetermined extent. The extent of fouling used as a basis to commence cleaning can, for example, to characterized in terms of an increased level of dynamic wet pressure or of mean bubble release pressure of the diffusion elements relative to a previous base condition of the elements. This does not however imply that the application of cleaning gas must await the advent of sufficient fouling to create a measureable increase in the dynamic wet pressure and/or mean bubble release pressure of the diffusion elements. In fact, it is contemplated that the cleaning gas could be applied intermittently but sufficiently frequently so that there would be no increase or only a very small increase of the dynamic wet pressure and/or mean bubble release pressure over the base condition of either of said pressures. Also, in many plants where cleaning gas is applied intermittently but quite frequently, the available pressure measuring equipment may not be sufficiently precise to measure the very small increases in pressure attributable to deposition of foulants between applications of cleaning gas.

Perhaps the most typical mode of operation for most sewage treatment plants will be to conduct the process so that some appreciable amount of clogging of the diffusion elements does occur between applications of cleaning gas. For example, clogging could be permitted to progress to the point where there was a measurable increase in the dynamic wet pressure and/or mean bubble release pressure of the elements. For instance, the increase in dynamic wet pressure level above base condition could be at least about 0.2, at least about 0.5 or at least about 0.7 inches of water gauge at 2 SCFM per square foot of active gas discharge surface of the element. The increase in mean bubble release pressure above base condition could be at least about 0.2, at least about 0.5 or at least about 0.7 inches of water gauge.

When operating in the intermittent mode, gas cleaning may be initiated at or before the time when the dynamic wet pressure level of the elements has increased above their base condition by an amount which is equal or equivalent to about 25 inches or less, more preferably about 15 inches or less and still more preferably about 7 inches or less, of water gauge at 2 SCFM per square foot of active gas discharge surface. Alternatively cleaning may be initiated when the mean bubble release pressure of the elements has increased relative to the base condition by about 25 inches or less, preferably about 15 inches or less and still more preferably about 7 inches or less, of water gauge.

Cleaning is conducted, i.e. the cleaning gas is applied in one or more periods of application, with a sufficient amount of cleaning gas to effect a substantial extent of cleaning which can for example be characterized in terms of a certain minimum reduction of any increase in dynamic wet pressure or of any increase in mean bubble release pressure which occurred as a result of fouling between a previous base condition and the commencement of cleaning. For example, cleaning may be conducted until the reduction in the dynamic wet pressure, if any, corresponds to at least about 0.3, more preferably at least about 0.5 and still more preferably at least about 0.8 of any increase in dynamic wet pressure. Alternatively, cleaning may be conducted until the reduction in the mean bubble release pressure, if any, corresponds to a least about 0.5, more preferably at least about 0.8 and still more preferably at least about 0.9 of any increase in bubble release pressure.

It is also preferred that cleaning be conducted with sufficient frequency, employing a sufficient amount of cleaning gas, so that the diffusion elements can remain in contact with the liquid medium for extended cycles of operation with treating gas without removing diffusion elements from contact with liquid medium and/or without application of cleaning techniques other than gas cleaning to the diffusion elements. An object of the invention is to continue such contact and/or non-use of such other cleaning techniques, especially those involving removal of the diffusion elements from their holders, for extended cycles of operation of at least about two, three, five years, or more, including the entire design life of the element. With this objective in mind, it is considered best to apply cleaning gas continuously or intermittently to restrict any increase in the dynamic wet pressure or the mean bubble release pressure of the elements to zero to about 5 inches of water gauge over their base condition.

It should be understood that it is permissible to conduct the process intermittently or continuously with or without actually measuring dynamic wet pressure or bubble release pressure. For example, the flow of cleaning gas to the diffusion elements may be initiated, maintained, controlled or terminated in response to any variable or condition which is sufficiently related to or representative of the rate or extent of fouling to be effective in maintaining the dynamic wet pressure or mean bubble release pressure at or below the levels indicated above. For example, through operating experience with a given plant, liquid medium and cleaning gas, it will usually be possible to determine the maximum number of days which the plant may be operated with treating gas and liquid medium before the increase in dynamic wet pressure and/or mean bubble release pressure of the elements will exceed the above indicated levels. Through experience it should also be possible to determine the time interval during which cleaning gas should be applied at a given flow rate in order to adequately restrain foulant deposition. With such information in hand, one may initiate cleaning periodically on the basis of time elapsed since the last cleaning and during each such cleaning apply cleaning gas for that period of time which prior experience has shown to be adequate.

Preferably however the flow of cleaning gas is initiated, maintained, controlled or terminated in response to a system condition which is more directly indicative of the dynamic wet pressure or mean bubble release pressure of the diffusion elements. To illustrate, system back pressure can in certain cases be sufficiently representative of the average dynamic wet pressure and/or bubble release pressure of the diffusion elements to serve as a basis for conducting intermittent or continuous gas cleaning.

Increases and decreases in the aforementioned pressures may be detected by measurement of changes in the pressure in the conduits of the distribution network between the compressors (including blowers) and the flow regulating means through which the diffusion elements are supplied. Alternatively, increases and decreases in said pressures may be detected on the basis of variations in the flow of gases through the diffusion elements, all other conditions being equal or at least equivalent. Increases and decreases in said pressures may also be detected on the basis of the amount of additional power consumed in maintaining equivalent flow as the fouling of the elements progresses.

The cleaning gas is applied simultaneously to diffusion elements arranged in groups ranging in number from about 10, more or less, to hundreds or thousands of such elements, and it should be understood that the foregoing limits of increase in dynamic wet pressure or mean bubble release pressure will not necessarily be applicable to all of the elements in such groups. Put differently, cleaning may be commenced when something less than all of the elements in a given group have reached the predetermined extent of fouling at which cleaning is to be commenced. Nor is there any intention of excluding the possibility that a minor portion of the elements may exceed the limits indicated above. Thus, the process may be conducted on the basis of the dynamic wet pressures or mean bubble release pressures of typical elements in such group or groups or on the basis of the estimated average condition of all the elements in the group or groups. Moreover, it is not essential that all of the elements in a given group or groups receive the same amount of cleaning. Indeed, it is apparent that if the group or groups under treatment contain elements with varying degrees of fouling, there may be varying degrees of cleaning experienced by the individual elements, and that not all of them will necessarily be cleaned to the same extent, as indicated by varying reductions in dynamic wet pressure or mean bubble release pressure from one element to another.

According to a particularly preferred embodiment of the invention, at least a portion of any reduction in dynamic wet pressure which may occur during cleaning is postponed, with the objective of increasing insofar as possible the number of pores in the diffusion elements through which cleaning gas is caused to pass. Assume that a fouled diffusion element is cleaned, and that during cleaning no other steps are taken to maintain or alter dynamic wet pressure. Assume further that the type of foulant is one which tends to manifest a decrease in dynamic wet pressure as cleaning proceeds. As substantial numbers of clogged pores are restored to an active condition, it is believed that they will transmit gas much more readily and reduce the gas pressure available at the element influent surface to force the cleaning gas through other clogged pores, it being theorized therefore that the last mentioned pores may never be cleaned, and that cleaning will thus be only partially effective. To avoid this difficulty, the present invention is preferably practiced in conjunction with postponement (including retardation) of at least a portion of any dynamic wet pressure reduction which may result from cleaning.

This aspect of the invention is useful when cleaning is commenced at a dynamic wet pressure increase or mean bubble release pressure increase, above base condition, of about 25 or less inches of water gauge, and is particularly beneficial when practiced in conjunction with commencing cleaning at about 15 inches or less, and even more preferably at about 7 inches or less, of water gauge over base condition. Such a method of operation holds promise of considerably lengthening the useful lives of diffusion elements.

Such step of postponement of dynamic wet pressure reduction may for example include doing any one or more of the following in any sequence for at least a sufficient portion of a cleaning cycle for obtaining appreciably better cleaning of the diffusion elements: increasing the dynamic wet pressure across the elements for a portion of the cycle; maintaining the dynamic wet pressure across the elements constant for a portion of the cycle; and/or, for a portion of the cycle, slowing the rate of decrease of dynamic wet pressure across the elements, e.g. to a rate slower than that rate of decrease which will result merely from cleaning (assuming all other conditions remain the same or equivalent).

Since dynamic wet pressure is in effect the difference between the gas pressure at the influent surface of a diffusion element and the hydrostatic head in the liquid medium at the effluent surface of the element, postponement of the dynamic wet pressure reduction attributable to gas cleaning can be practiced by controlling either said gas pressure, or said hydrostatic head, or both.

For example, during cleaning one may apply enhanced pressure differential across the diffusion elements. Such will result if the total gas pressure applied to the gas influent surfaces of the elements is maintained for at least a substantial portion of the cleaning cycle at a pressure in excess of that which would have been applied if the only change in the apparatus and operating conditions had been the removal of foulants by cleaning gas. Whether a total pressure level representing an enhanced pressure defferential is first established prior to, at or after the commencement of flow of cleaning gas, the enhancement level is usually about 0.5 or more, preferably about 1 or more and most preferably about 2 or more inches of water gauge.

The cleaning gas may be fed in any gas mixture in which the total pressure of all gases applied meets a criterion for enhancement set forth above, irrespective of the extent to which the individual gases contribute to the total gas pressure. As cleaning gas gradually removes foulant deposits from the elements, flow to the individual elements will generally increase and the dynamic wet pressure will generally decrease, all other independent variables remaining the same. Manipulation of some of the variables however can result in control of the dynamic wet pressure to either hold it constant, or cause it to increase or cause it to decrease at a slower rate than would otherwise have occurred. This postponement of the reduction of dynamic wet pressure, including reduction in its rate of decline, can have a favorable effect in cleaning, since it makes the cleaning gas available to more passages or for a longer period of time or both. This postponement or delay may be obtained by increasing the pressure in the plenums which deliver gas to the diffusion elements, and/or by reducing the hydrostatic head.

Any suitable technique for increasing plenum pressure may be used to postpone dynamic wet pressure reduction. Suitable examples include increasing compressor output and/or adjusting valves in the system to provide a higher flow of air to the section being cleaned, relative to the remainder of those portions of the system having a common air supply.

Any suitable technique for reducing hydrostatic head may be used to postpone dynamic wet pressure reduction. For example, one may conduct gas cleaning while the hydrostatic head is appreciably below its pre-cleaning operating head. Operating at diminished hydrostatic head includes reducing the submergence of the diffusion elements during at least a portion of the time during which cleaning is being conducted. For example, the level of liquid medium in the treatment tank may be lowered or, if the diffusion elements are mounted in the tank in arrays on lifting means for lifting them from the liquid medium, at least a portion of the diffusion elements may be raised to a higher submerged elevation in the medium using the lifting means.

One may also postpone dynamic wet pressure reduction during cleaning by combined control and adjustment of the gas pressure applied to the element influent surfaces and the hydrostatic head. For example, during periods of rising hydrostatic head due to increased plant load, pressure enhancement may be applied in sufficient amount to postpone dynamic wet pressure reduction.

Another technique that has been found to produce benefits similar to those which result from postponement of dynamic wet pressure reduction is the application of surface active agent(s) in either liquid or gaseous form during the cleaning period to the interface between the diffusion elements and the liquid medium. Gas flow to the units being cleaned can thus be increased through reduction of the effect of surface tension, whereby more of the elements may be caused to transmit cleaning gas for a longer period of exposure. HCL appears to produce such a benefit.

It is preferred though by no means essential that at least about 40%, more preferably at least about 60% and most preferably at least about 80% of the cleaning gas be discharged from the diffusion elements while sufficient enhanced pressure is being supplied, and/or while sufficient amounts of surface active agent(s) are being maintained in contact with the diffusion elements/liquid medium interface, for promoting cleaning.

Any of the foregoing techniques which result in postponement of dynamic wet pressure reduction or comparable effects can be applied to the gas distribution network or to any selected portion thereof, including individual tanks in multi-tank plants and individual groups of diffusion elements constituting only part of the diffusion elements in a given tank.

A number of kinds of pressure conditions have been discussed herein as bases for conducting or measuring progress in any portion of the process of the present invention, including for example dynamic wet pressure, mean bubble release pressure, base conditions of either of the foregoing, and system back pressure. It will of course be understood that where it is necessary to make comparisons of a number of different observations of a given type of pressure value, such observations should be made with the diffusion elements submerged at the same level of submergence in the same or equivalent liquid medium while discharging the same or equivalent gas or, if there are significant differences in the submergence, liquid and/or gas, appropriate adjustments should be made in the data to compensate for these differences. Moreover, dynamic wet pressure and system back pressure values are sometimes expressed in terms of numerical pressure values referenced to a given reference rate, e.g. 2 SCFM per square foot of active gas discharge area as designed, manufactured or installed. When interpreting observations or data relative to dynamic wet pressure or system back pressure variables, certain additional adjustments in data may be required.

When necessary, the need for such adjustments may arise in part from the fact that not all plants operate at a gas flow of 2 SCFM per square foot, and that even those plants designed to operate at 2 SCFM will operate at various rates under different conditions. Thus, for example, in any given plant, in order to compare observed conditions of system back pressure and dynamic wet pressure, including increases in dynamic wet pressure above the base condition, it may be necessary to adjust the observed dynamic wet pressures by means of calculations familiar to persons skilled in the art, based on the flow rate through the elements, the density and viscosity of the gases, the temperature, the humidity and the barometric pressure. In particular there will be a need to convert said observed conditions of dynamic wet pressure to a basis comparable with the 2 SCFM per square foot rate employed in establishing the dymamic wet pressure ranges.

On the other hand, where the invention is being practiced in a plant having reasonably accurate flow measuring equipment, it will sometimes be possible and convenient to minimize the computations involved by recording the total flow of gas from the compressors, viscosity of the gases, the temperature, the humidity, the barometric pressure, and other operating conditions, at a time corresponding to a base condition of dynamic wet pressure. Then from time to time in the future, as plant operating conditions and flow rates fluctuate, trial checks can be conducted to determine whether cleaning should be commenced. These trail checks will include temporarily returning the plant to the flow rate noted at the base condition and then recording the other data mentioned in the preceding sentence, as required for calculations to adjust the observed pressures to an equivalent basis with the base condition. Similar techniques can be applied to the determination of system back pressures.

Flowmeters are commercially available which are capable of measuring flow with the requisite accuracy, and many are available with conversion tables for converting the registered flow back to standard cubic feet per minute at whatever conditions of temperature, pressure and humidity have been adopted as standard for the plant in question. Also, it is apparent that a general or special purpose computer may be provided and programmed to make the necessary conversions of data, and, if desired, actuate process control devices.

While a flow rate of 2 SCFM per square foot is a convenient reference rate for dynamic wet pressures and systemback pressures and is fairly typical of flows through diffusion elements in many commercial plants, one may adopt one or more different reference flow rates as a basis for controlling and conducting the present invention in a given plant. For example the plant and diffusion elements may have been designed for a different flow rate than 2 SCFM per square foot, or may have been operated successfully over an extended period, e.g. ninety (90) days, at a daily average rate of flow differing substantially from 2 SCFM per square foot. It may be desirable to use an increase in dynamic wet pressure at one of these flow rates for initiating or otherwise controlling cleaning. For example, in the latter instance the plant could be operated in such a manner that cleaning was initiated before the increase in dynamic wet pressure as compared to the base condition, exceeded 25 inches of water gauge, the base operating condition and the 25 inches of water gauge both being referenced to a flow rate equal to the daily average of the flow rate through the plant for the last 90 days immediately prior to the commencement of cleaning. Changes in reference flow rate may be made for the system back pressure values as well.

No fixed rule can be stated concerning the quantity of cleaning gas which must be applied relative to the quantity of foulant deposits. The various cleaning gases differ in efficacy, and the deposits differ from one another in their susceptibility to cleaning gases in general and in their susceptibility to particular cleaning gases. However with the aid of the present disclosure persons skilled in the art should be able to determine sufficient amounts of cleaning gases to clean deposits of the various kinds of foulants disclosed herein. In general the amount employed should be sufficient to reduce any dynamic wet pressure increase and/or any mean bubble release pressure increase of the elements in the manner indicated above.

The rate of application of cleaning gas, and the concentration of cleaning gas in admixture with other gases may also be varied considerably; we have observed that at lower rates or concentrations cleaning gas must be applied over a longer time interval, while higher rates and concentrations are able to effect cleaning in a shorter time interval. It is however preferred to apply the cleaning gas at a sufficient rate or concentration for effecting the indicated extent of cleaning within a period of about eight (8) hours or less.

It has been found that the concentration of cleaning gas in a mixture of cleaning gas with treatment gas may be expressed in mole fraction of cleaning gas in the mixture and/or by the equilibrium concentration, defined hereinafter, which results upon saturating a liquid sample with the medium. This is not however intended to suggest that the liquid medium in which the diffusion elements are operated must become saturated with the mixture during cleaning. The concentration to be used can be selected on the basis of various factors, including the solubility of the gas in the liquid medium, the specific aggressiveness of the liquid solution of cleaning gas to the type of foulant deposit present and, in electrolytes, the degrees of ionization of the resultant solutions. In the case of cleaning gases that form acidic solutions in water the solubility constant and degree of ionization are particularly significant. In that instance pH, as well as gas phase mole fraction and equilibrium value, may be used as means of measurement and definition.

Appropriate limits of the above may be determined experimentally. Such tests employing mixtures of HCl and air at approximately 100% humidity and atmospheric pressure have for example shown that mole fraction of at least about $7.5 \times 10^{-5}$, preferably at least about $1.3 \times 10^{-3}$, and more preferably at least about $6.6 \times 10^{-3}$ mole, per mole of total gas mixture, are adequate. These correspond to equilibrium concentrations of 0.167, 0.24 and 0.28 by weight of the total gas mixture, and approximate pH values of less than 0.7, 0.5 and 0.4, all at standard barometric pressure and temperature. However, the use of any acid-reacting gases at pH equilibrium concentrations of about 3 or less, about 2 or less and about 1 or less is contemplated. In practicing the invention in a sewage treatment tank employing microorganisms aerobically and/or anaerobically to metabolize pollutants in wastewater, the concentration and dosage of cleaning gas should however be an amount which is insufficient to substantially impair overall metabolic activity of the micro-organisms in the tank as a whole.

Another gas, as defined herein, which may or may not be applied to the diffusion elements in admixture with the cleaning gas, is water vapor, including either water vapor which has or has not been intentionally added to the system. For example water vapor may enter the system and become mixed with the cleaning gas because the water vapor is a normal or usual component of certain kinds of treating gas (e.g. the humidity in air when the latter is used as treating gas). The cleaning gas and water vapor may be brought into admixture prior, during, to or subsequent to the introduction of the cleaning gas into the above mentioned network. For example, the cleaning gas may be dissolved in water, followed by passage of the treating gas through the water to pick up cleaning gas and water vapors and then by introduction of the resultant mixture into the network. On the other hand, in commercial tank type aeration plants, the network often contains substantial quantities of condensed water vapor which entered the system as a component of aeration air; thus the cleaning gas and water vapor may become mixed as a result of contact and admixture of water vapor held in the network with cleaning gas, or with a mixture of cleaning gas and treating gas that has been formed prior to contacting the condensed water. Moreover, when cleaning gas is supplied to a network containing substantial quantities of condensed water, peak cleaning effectiveness may not necessarily be attained until all or a substantial quantity of the condensed water has been purged from the system or the condensed water has absorbed a substantial quantity of, or become substantially saturated with, cleaning gas. If foulant deposits form at a location in the diffusion element which is not readily supplied with water by the liquid medium or treating gas, it can be beneficial to supply water vapor in admixture with the cleaning gas for forming agressive aqueous solutions that assist in cleaning.

One may employ various means for feeding treating gas and for continuously or periodically feeding aggressive mixtures of treating gas and cleaning gas. The treating gas may for example be fed with the usual compressor or blower and overall system pressure or flow control means familiar to those skilled in the art. The cleaning gas may be fed from a storage tank containing a substantial supply of said gas under high pressure via a conventional flow controller and measuring means. By a suitable connection with the means for feeding treating gas into the means which convey the treating gas into the liquid medium one may form the desired aggressive mixtures. Provision may be made for automatic control of the blending of the treating gas and cleaning gas and of the commencement of the feeding of the aggressive mixtures. According to a preferred embodiment, said distribution network also includes measuring means which are preferably, but not necessarily, located in a submerged portion of said tank, for measuring temperature, pressure and flow of gas through said network or through representative diffusion elements with sufficient precision for maintaining the dynamic wet pressure across the diffusion elements in a range not to exceed about 25 inches, more preferably about 15 inches or less, and still more preferably about 7 inches or less of water gauge above said base condition.

The gas distribution network may be constructed of any suitable material, including for instance, metallic, resin-lined metallic, and rigid resin pipe, including reinforced or unreinforced thermoplastic and thermoset resin pipe. It is desireable to transmit the cleaning gas to the diffusion elements through a portion of the above mentioned network which is formed of synthetic resinous material. Other portions of the network may be formed of other materials, including for example metallic conduits and fittings. According to a particularly preferred embodiment of the invention the cleaning gas is first brought into admixture with the treating gas at a submerged location in the network. This facilitates the use of metallic conduits in the non-submerged portions of the network, including for example those conduits, such as downcomer pipes, which convey the treating gas from a position above the surface of the liquid medium down into the liquid medium. Preferably, that portion of the gas distribution network which is exposed to the agressive mixtures is composed of conduit having internal surfaces of acid resistant synthetic polymeric material. If one chooses a synthetic resinous pipe having a load bearing wall of polymeric material, which is preferred, it should have tensile strength of about 2000 to about 60,000 psi, a flexural modulus of about $4 \times 10^4$ to about $4 \times 10^6$ psi and a pipe stiffness of about 10 to about 1000 psi, by ASTM D-2412. Preferably the conduit walls are formed of such synthetic polymeric materials as rigid polyvinyl chloride (PVC), acrylonitrilebutadiene-styrene (ABS) or other suitable resinous materials. These same materials may also be and preferably are embodied in the construction of the flow regulating means and diffusion element holders, although it should be understood that elastomeric materials resistant to the cleaning gases may be employed in certain of the flow regulating means and in the sealing means. Whatever materials are used should be chosen with due regard to resistance to corrosion, weather, collapse and impact. Suitable provision (not shown) should be made for expansion and contraction where necessary.

The flow regulator means may be at least in part integral or non-integral with the holders for the diffusion elements. Mounting of the flow regulators within or without the holders is acceptable, but the most convenient arrangement is within the holders and therefore such arrangement is preferred. The flow regulators employed in accordance with the invention may be of any desired type, such as passive and active flow regulator means, including those with varying pressure response characteristics. For instance, one may employ flow regulator means which respond exponentially to changes in pressure, such as for instance fixed orifices, or those which respond in a more linear fashion, such as for instance passages with large ratios of length to cross sectional area. Passages which change their cross-section in response to pressure changes are also contemplated, including those which can perform a valving function and those which are capable only of uni-directional flow.

The diffusion elements may be supported by suitable holders, each of which at least partly encloses a plenum (to be discussed below) and includes a supporting surface against which a peripheral surface portion of a diffusion element may be supportively engaged with the aid of restraining means and/or of sealing means (also to be discussed below). Among the known and acceptable types of holders are those which secure the element to the holder by bolt holes through the element, engaging threads in the holders, and those which secure the elements about their peripheries. The latter holders are preferred, and a variety of preferred embodiments of such holders and of the sealing means for sealing the elements to the holders are disclosed below.

Although the plenum may be of any suitable material, it also is preferably of synthetic polymeric material, which may be reinforced and preferably has the physical properties described above in connection with the preferred pipe. The holders may be fashioned by any appropriate forming process, such as for instance, injection molding, lay up and spray up techniques.

The plenums through which the respective flow regulating means discharge gas to the gas influent surfaces of the diffusion elements are gas chambers defined by wall means which provide the gases with ready access, and an opportunity for relatively uniform distribution, to said influent surfaces. The plenums will normally but not necessarily be within the holders. Usually one or more walls of each plenum will be defined by the influent surface of the diffusion element itself and the other walls of the plenum will be defined by internal surfaces of the holder. In certain cases the majority of the wall areas in the plenums may be defined by the influent surfaces of the diffusion elements, such as where the elements are in the form of elongated tubes of relatively small diameter compared to their length.

As suggested above, the holders as well as their respective retaining means can take a wide variety of forms, including those which secure the diffusion elements by direct or indirect contact about their entire peripheries, or at spaced points about their peripheries or at other locations, such as for example the center bolt arrangements shown for instance in U.S. Pat. Nos. 4,046,845 to Richard K. Veeder and 3,532,272 to Eric S. Branton. However, attachment of the diffuser elements by central or other fasteners which extend through holes in the active diffusion surface produce detrimental effects, the prediction of which would not have been obvious.

In such of the prior art, sealing between element and plenum is accomplished through vertically loaded elastomeric gaskets. The required loading to effect adequate seal of the porous diffuser element may be high, e.g. 50 pounds/lineal inch of seal. Greater strength and rigidity of the diffuser and plenum is required to distribute these forces about the periphery than in the preferred embodiments of this invention wherein continuous peripheral clamping or retaining is employed.

Further, fasteners extending through the element into the plenum typically require holes with clearance. Unless the interiors of the holes are sealed in their entireties, free passage of air is provided in these clearances that promotes excessive flow from the diffuser element in the vicinity of the fastener. Enlarging the sealed area under the lower horizontal surface of the retaining means, to lengthen the path of air from the clearance zone to the diffuser surface does not correct this deficiency, since the reduction in unit flow (flux) in the vicinity of the fastener resulting from the additional sealed area at the surface, similarly reduces the frictional pressure drop in that region, and the problem of non-uniform distribution persists.

The detrimental effects of the "through-hole" type fasteners above described may be overcome by the use of the preferred peripheral clamping or retaining methods employed in our invention. Among the applicable retaining means are, for example, those including clips, clamps and rings which clamp or merely restrain, secured to the plenum by bolts, hooks, threads and other fastening means.

Suitable sealing means may be fabricated from a wide variety of materials in a wide variety of forms. For example, one may employ various plastics and rubbery elastomers. The sealing means may be one or more members of circular, flat or other cross-section, including special profiles matched to the shape of the diffusion element and/or its support means. The requisite shapes can be produced by any suitable forming process, such as for instance extrusion, casting and other molding techniques.

The invention contemplates the use of sealing means which are adherent or attached to the diffusion elements, such as those which are clamped or bonded in place, and those which are not adherent or attached. Those sealing means which are neither adherent nor attached to the diffusion elements, and which are preferred in the present invention, are preferably held against the elements by the structure of the holder, by the structure of the retaining means described above, by the structure of the diffusion element itself, and preferably by a combination of the foregoing. Disposition of the sealing means adjacent the periphery of the diffusion element includes placement inside and/or outside the outline of the periphery of the element as viewed in plan view and at varying elevations above, below and/or along the side of the element, but the sealing means preferably makes contact with an upper edge of a vertical (including near vertical) side surface of the element as described in greater detail below.

A wide variety of diffusion elements may be employed, made of varying materials in varying configurations. In general the invention is practiced with multipore diffusion elements, members containing a multitude of closely spaced passages or pores of small diameter defining paths for the discharge of gases into liquid media. Such pores or passages may be of any suitable shape, size and length, their shape being determined to a certain extent by the method of producing the element. There are of course a variety of ways of forming diffusion elements and any suitable technique may be employed. For example a porous body may be formed by solidifying a shaped mixture of water-insoluble molten material and water soluble solid particles, followed by leaching out the soluble particles. Alternatively a porous member may be formed for example by building up layers of fabric formed from fibers or filaments.

Preferably however the diffusion elements and their pores are formed by the bonding of solid particles together in a mass in which the pores are formed by the spaces extant between the bonded particles. The particles may be bonded with or without an adhesive or other bonding agent.

The elements may, for instance, be formed of organic or inorganic materials in particulate and/or fibrous forms. An exemplary organic material is particles of fusible polymeric material as disclosed in U.S. Pat. No. 3,970,731. Exemplary of inorganic materials are metal and ceramic powders, including for example, alumina, silica, mullite, and various clays. The finely divided materials are generally shaped and compacted under pressure, and, if necessary, heated or fired to fully develop the necessary coherency. Bonding with organic or inorganic binders is contemplated, and the finely divided particles and/or fibers may be bound together by organic adhesive bonds, ceramic or fusion bonding or sintering.

The diffusion elements may be formed in any useful shape. For example they may be formed in the shape of plates, defining a flat or curved surface, tubes or domes. Among the applicable shapes are those which appear round, oval, square, rectangular, polygonal and irregular in plan view, and those which appear substantially horizontal in transverse cross section, including those which are truly flat and those which are only generally horizontal, in the sense of including non-horizontal surfaces but including a portion which extends in a generally horizontal direction. The elements may have plain vertical or inclined edges, with or without steps and the edge portions may include bevels, rounded portions, grooves and the like.

In general the applicable elements preferably have active gas discharge surfaces which are free of bubble emitting macro openings, such as those shown for instance in U.S. Pat. No. 3,970,731 to Oksmann. Preferably the element is such that it will emit fine bubbles from random locations throughout the gas discharge surface. Preferably the gas infusion surface of the element is free of air transmitting macro holes longer than 0.3T wherein T is the average thickness of the element weighted on an area basis, or is free of such macro holes. A macro hole is an intentionally or unintentionally produced hole larger than that normally produced by compaction of the particulate material. It is beneficial if substantially all gas paths through the body of the element to its gas discharge surface, as installed in the plenum or other holder, areabout the same length. Moreover, it is preferred to employ a diffusion element having a bubble release pressure in the range of about 2 to about 20, preferably about 3 to about 15 and more preferably about 4 to about 10 inches of water gauge. The optimum bubble release pressure is considered to be about 7 inches. The values given are for bubble release pressure in water of new elements as manufactured, i.e. prior to use. A technique for determining bubble release pressure, and other preferred characteristics for the diffusion elements used in the present invention, are disclosed in the U.S. patent application Ser. No. 952,892 of Lloyd Ewing and David T. Redmon, entitled "Diffusion Element", filed in the U.S. Patent and Trademark Office on Nov. 19, 1978, the entire disclosure of which is hereby incorporated herein by reference. It is also preferred to fabricate the element of hydrophilic materials, i.e. materials which are hydrophilic in the element as manufactured and prior to use.

Also, preferably, the element is one whose sides, including for example, any extreme vertical edges and vertical or near vertical surfaces of steps which may be present near the periphery of the element, are porous, at least semi-permeable and free of adherent material preventing bubble emission. The preferred elements have a specific permeability when new of about 6 to about 200 SCFM at 2 inches of water gauge. The thickness of the elements may be uniform throughout or may vary when viewed in horizontal cross section. A particularly desireable characteristic of the preferred diffusion elements is that of relative uniformity of bubble release pressure throughout the gas effluent surfaces of the elements. Such uniformity may be attained in any suitable fashion, such as for example by the techniques disclosed in the above-mentioned U.S. patent application Ser. No. 952,892. In accordance with a particularly preferred embodiment the standard deviation of at least 5 bubble release pressure measurements taken along each of two perpendicular lines across the diffusion element effluent surface is less than 0.25 and preferably less than 0.05. The most preferred diffusion elements are those which are formed of sintered or bonded particles in accordance with the teachings of the aforesaid U.S. patent application Ser. No. 952,892, and of the simultaneously filed U.S. patent application Ser. No. 952,862 of the said Ewing, Redmon and William H. Roche, the entire disclosure of which is hereby incorporated herein by reference. One may choose a diffusion element having any one or all of the above preferred characteristics.

Irrespective of the particular form of holder and diffusion element arrangement adopted, it is preferred that the element be so supported that all portions thereof which emit air to the surrounding liquid may have ready access to replacement water, to maintain such emitting portions in contact with water and subject to the influence of surface tension. Thus, it is preferred to avoid a situation in which a side surface of the element is adjacent to a crevice which can be swept clear and kept clear of water by the air discharged from the side surface. The air emanating from the element adjacent said crevice does not have to overcome the effects of surface tension, causing air to be preferentially routed to that portion of the element and thus correspondingly impairing the uniformity of distribution of flow from the element. However, if the supporting means and other associated structure are so shaped and positioned that any exposed portion of the element capable of emitting air to the liquid has ready access to replacement liquid, so that the surface is not swept and kept clear of water, the aforementioned distribution difficulty can be avoided. Alternatively, a portion of the diffusion element which would otherwise discharge air into a crevice of the type described above can be sealed by appropriately positioning a seal of lesser height than the element, by applying an impermeable coating to the surface, or by sufficiently compressing such sides or any portion thereof having access to water so as to render same substantially impermeable. However, the preferred diffusion elements include sides which are porous, at least semi-permeable, free of adherent material preventing bubble emission and "vertical" (including near vertical, e.g. within about 20° of vertical). Still more preferably such vertical or near vertical edges are covered by the combined structure of the plenum, sealing means and retaining means. According to a particularly preferred embodiment, described in greater detail below, the sealing means is of lesser height than the diffusion element, but is positioned at an upper edge defined by the intersection of said vertical or near vertical sides and an upward facing portion of the upper gas discharge surface of the element.

The diffusion elements will generally be mounted in a natural or man-made water impound such as a lake, lagoon or tank, most commonly a large tank of concrete construction for activated sludge treatment of domestic sewage. The diffusion elements will be mounted in the water impound in one or more arrays connected to the gas distribution network and may be supported at one or more elevations, assuming suitable pressure or flow controls or separate compressors are provided to insure proper distribution of the aeration gas to the elements at the various levels. Preferably however all elements within a given tank which are in open communication with the same gas distribution network are mounted at substantially the same elevation.

FIGS. 1 through 18 disclose specific embodiments of particularly preferred forms of apparatus useful in connection with the invention. In this connection FIG. 1 shows a sewage aeration tank 1 including a bottom 2 with side and end walls 3 and 4 to contain a body of sewage which is to be aerated. A compressor 5 is provided to feed filtered atmospheric air through valve 6B, flow indicator 7A, and branch conduit 18A to air main 8. Storage tank 19 contains a supply of cleaning gas stored at high pressure which may be discharged to air main 8 in controlled or predetermined admixture with the compressed air via valve 6A, flow indicator 7B and branch conduit 18B. By manipulation of valves 6A and 6B one may commence, terminate or control the flow of aerating and cleaning gas whereby the foregoing elements constitute means for feeding aeration gas and for continuously or intermittently feeding a mixture of aeration gas and cleaning gas to the distribution network.

The distribution network comprises air main 8 which is generally supported above the level of liquid in the tank 1, and which feeds into a downcomer pipe 9, extending vertically from air main 8 to a horizontally disposed distributor pipe 10 supported substantially horizontally a short distance above bottom 2. Parallel rows of air header pipes 11, also supported horizontally a short distance above bottom 2, are fed by distributor pipe 10. The spacing, in a horizontal plane, of air headers 11 and diffusers 12 is determined on the basis of criteria known to persons skilled in the art.

In certain preferred embodiments, air main 8 and downcomer pipe 9 are of metal, while distributor pipe 10 and branch conduit 18B are of synthetic resin; downcomer 9 and pipe 10 are connected at a gas tight pipe coupling (not shown). In one such embodiment, conduit 18B enters but does not communicate with air main 8 at the point of intersection shown in FIG. 1 and extends continuously within air main 8 and downcomer 9 to a discharge outlet in pipe 10 downstream of the coupling and below the surface of the liquid in the tank. Alternately, conduit 18B extends, separately from air main 8, directly to a submerged connection with pipe 10 downstream of the coupling.

FIG. 2 shows in perspective a broken out and enlarged portion of one of the air headers 11 with its diffusers 12.

As shown in FIGS. 3 and 4, header pipe 11 has air outlet openings 13 formed at longitudinally spaced intervals along its top center line to feed air into the respective plenums 14 of diffusers 12. Each plenum 14 includes lower wall means 15. All or at least a substantial portion of the lower wall means is circular in transverse cross section and conforms to the outer surface 16 of pipe 11. Lower wall 15 may be held in close fitting engagement with pipe 11 in a variety of ways, including various mechanical arrangements, such as clamps or straps but preferably by bonding to the pipe. In general any bonding technique may be employed, such as for instance, adhesive bonding; but if the pipe is of polymeric material, which is preferred, the attachment may also be made by solvent or thermal (including sonic) welding. The latter is of considerable advantage in terms of ease and economy of construction. Depending on the type of attachment means employed, the plenum may be sealed to the pipe by the same means used in attachment, or by different means. Thus one may provide an elastomeric seal between the plenum lower wall means and pipe outer surface 16, or the seal may be provided by the welding or adhesive referred to above.

From the standpoint of structural integrity, especially when using both polymeric pipe and a plenum of polymeric material, it is beneficial that lower wall means 15 be held in close fitting engagement with a substantial portion of the length of the pipe outer surface 16 (as shown in FIG. 4) and of the transverse cross section of the pipe. Preferably, lower wall 15 conforms and engages with the transverse cross section of the pipe through an arc of at least about 20°, more preferably about 45 or more degrees and most preferably about 70 or more degrees, at least in the mid portion 17 (FIG. 4) of the lower wall means. In the illustrative and preferred embodiment shown in FIGS. 3 and 4 the arc is about 90°.

As shown in FIGS. 3 and 4, lower wall means 15 includes an air inlet opening 22, around which there may be provided a small upstanding boss 23 (FIG. 3) on the inner surface of plenum lower wall means 15. Air outlet opening 13 and air inlet opening 22 are maintained in registry with one another.

According to the invention, the system is provided with an air flow regulator member, one possible example of which is indicated by reference numeral 24. According to a preferred embodiment a combined bonded assembly is formed by the pipe, by lower wall means 15 and by the air flow regulator member or a sleeve member 25 in which the air flow regulator member is mounted. Thus, for instance, all of these parts may be simultaneously adhesively bonded or welded, with considerable savings in manufacturing steps and costs. The air flow regulator member 24 and various embodiments thereof will be discussed in greater detail below. The lower wall means 15 may be of any desired shape as viewed in horizontal plan view. It may for instance have a square, rectangular, circular or oval outline, the latter being preferred. Air inlet opening 22 and regulator 24 are both preferably within this outline as viewed in plan view.

Figure 5:
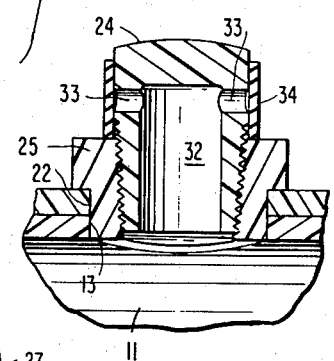
FIG. 5 is an enlarged portion of FIG. 4 showing portions of the wall of the header pipe and the lower wall of the plenum, along with the details of the air flow regulator member which is in communication and connected with the air outlet and inlet openings in said pipe and lower wall. This figure also shows an optional lower valve member on the air flow regulator member.
Figure 6:
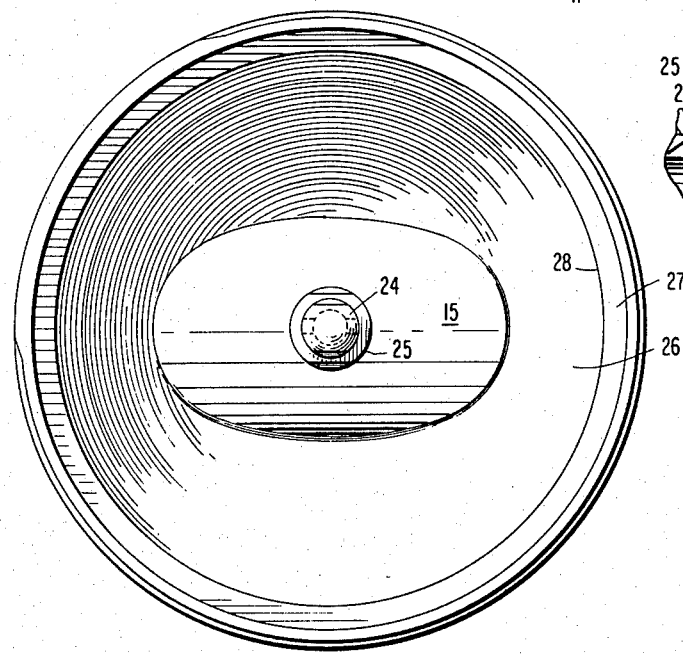
FIG. 6 is a plan view of the plenum of FIG. 4.

FIG. 5 shows the regulator 24 of FIGS. 3 and 4 enlarged and in longitudinal cross section. In this embodiment the regulator is a plug member having a central void to communicate through the open bottom of sleeve 25 with the interior of pipe 11. Extending laterally from recess 32 are a pair of horizontal orifices 33 communicating with the interior of plenum 14. As shown in FIGS. 3 and 4 these orifices 33 are in direct open communication with the interior of plenum 14. However, if the outer ends of orifices 33 are covered by an elastic band 34 as shown in FIG. 5, the orifices have a unidirectional flow characteristic, i.e. they function as check valves. Such characteristic is valuable if there is a temporary loss of air pressure in header pipe 11. The uni-directional flow characteristic of the regulator tends to maintain pressure within plenum 14, thus discouraging backflow of liquid from the exterior of the diffuser through the diffusion element 35 into the plenum. This reduces the difficulties of starting up the system when pressure is restored. Backflow of sewage-laden water through diffusion element 35 or regulator 24 tends to plug these components, leading to possible complete plugging or non-uniform distribution of air flow through the element and/or system when the flow of air under pressure is restored.

Figure 5A:
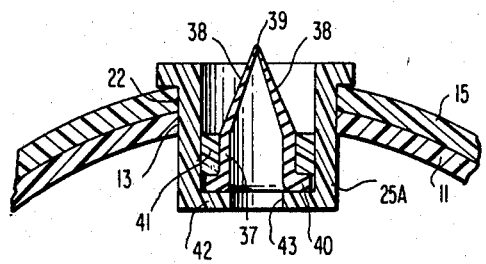
FIGS. 5A–D show the same portions of the header pipe and plenum walls as FIG. 5 with alternate forms of air flow regulator members which may be substituted for those shown in FIGS. 4 and 5.

FIG. 5A discloses a pressure responsive uni-directional flow regulator commonly referred to as a "duckbill". The duckbill is normally made of flexible and elastic material in a lip-like configuration reminiscent of a duck's bill and having lips terminating in a slit which is normally closed. In this embodiment the duckbill is mounted in a sleeve 25A recessed in the plenum lower wall 15 and header pipe 11, so that the duckbill may be mainly within the outline of the header pipe. The duckbill has a cylindrical barrel portion 37, lips 38 terminating in a horizontal slit 39 and an annular flange portion 40 which is confined in sleeve 25A by a concentric collar 41 fixed within sleeve 25A. An inwardly directed flange 42 with central opening 43 at the lower end of sleeve 25A supports the duckbill from beneath and provides communication with the interior of cylindrical barrel 37, by means of which air is communicated from the interior of the pipe between lips 38 and through slit 39 into the interior of plenum 14. The orifice provided upon opening of slip 39 varies in accordance with the pressure, but closes on termination of inward flow relative to the plenum. Thus, like the modification illustrated in FIG. 5, this regulator acts as a check valve.

Figure 5B:
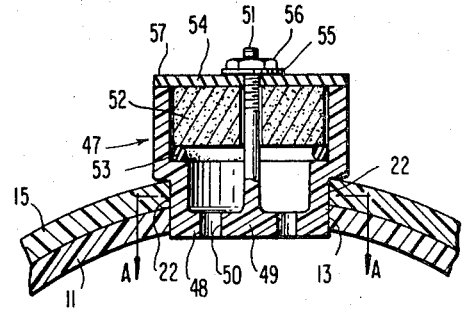
Figure 5D:
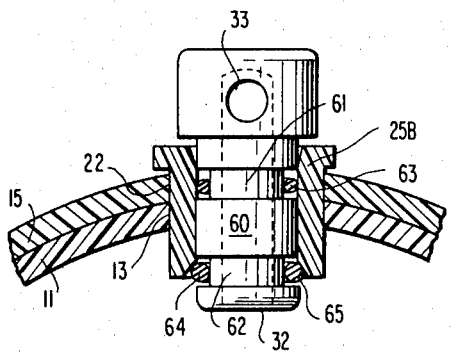
Figure 5C:
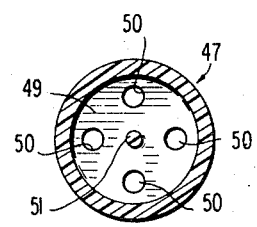

FIGS. 5B and 5C illustrate a flow regulator comprising a plurality of passages having a large ratio of length to cross sectional area. The regulator of FIG. 5B, shown in partial section, includes a stepped cylindrical housing 47 of which lower end 48, having a reduced cross section, closely fits within the air outlet and inlet openings 13 and 22 of header pipe 11 and plenum lower wall 15, which components may if desired be welded into a unitary assembly. Housing 47 includes a circular lower base 49 with air inlet holes 50 more clearly shown in FIG. 5C, and serves as the base for a central threaded post 51 which extends above the top of housing 47. In the upper larger diameter portion of housing 47, is an annular porous plug 52 which substantially fills the space between post 51 and the side walls of housing 47. Bypassing of air flow between the outer periphery of plug 52 and the internal walls of housing 47 is prevented by an O-ring seal 53 adjacent the plug and compressed between the plug and the step in housing 47. Bypassing of air through the center hole in plug 52 between the plug and post 51 is prevented by a flexible sealing flap 54 held in sealing engagement with the center portion of the upper surface of the plug by washer 55 and nut 56 threaded on post 51. The flexibility of flap 54 permits its outer edge to rise when air passes from the interior of header pipe 11, through porous plug 52 to its upper surface. Thus air emitted from the upper surface of the porous plug may pass between the upper edge of housing 47 and the flap edge 57 which acts as a uni-directional valve. On termination of upward flow through porous plug 52, or upon the commencement of flow in the opposite direction, the flap closes, preventing reverse flow of gas back towards header pipe 11. Alternatively, the bypassing effects described above can be controlled by impermeable coatings on the walls of the center hole and periphery of plug 52.

Like FIGS. 3, 4 and 5, FIG. 5D illustrates a readily removable and replaceable flow regulator. In this embodiment, the regulator is partly within plenum 14 and partly within pipe 11. A sleeve 25B is positioned in air outlet and inlet holes 13 and 22 of header pipe 11 and plenum lower wall 15. Like the regulator of FIGS. 3, 4 and 5, the regulator in FIG. 5D includes a cylindrical void or recess 32 open at the bottom and, in communication therewith, a horizontal orifice 33. The cylindrical barrel portion 60 of this regulator closely fits within the cylindrical bore of sleeve 25B and has two annular grooves, upper and lower grooves 61 and 62 respectively, in which upper and lower O-rings 63 and 64 are mounted. Upper O-ring seal 63 is of slightly larger outer diameter than the inner diameter of sleeve 25B, and effectively seals off flow from header pipe 11 to the interior of plenum 14 through the space between cylindrical barrel 60 and the inner surface of sleeve 25B. Lower O-ring 64 has a somewhat larger external diameter which enables it to act as a catch to hold the flow regulator in place. O-ring 64 is sufficiently compressible and has sufficient space in groove 62 so that cylindrical barrel portion 60, with O-ring 64 in place in groove 62, may be introduced into the upper end of sleeve 25B and forced through sleeve 25B to the position shown in FIG. 5D, at which point O-ring 64 expands against the tapered lower inner surface 65 which forms a detent at the lower end of sleeve 25B. O-4ing 64 has sufficient exterior diameter to hold the regulator member in place under normal operating pressure, but the regulator may be withdrawn without destroying the regulator or the sleeve 25B, and may be replaced with a regulator of differing flow characteristics. This is beneficial when it becomes necessary to replace diffusion element 35 (FIGS. 3 and 4) with elements having different head loss characteristics, or in the event it is desired to alter the overall operating characteristics of the aeration system.

The foregoing FIGS. 3, 4, 5, and 5A–5D disclose but a few of the possible alternative forms of regulators which may be mounted within the transverse cross-sectional area of the plenum, of the header pipe or of both of them. However, the various flow regulator devices depicted herein have the common characteristic that each of them is included in a member which terminates beneath the diffuser element 35. Persons skilled in the art will readily furnish a variety of alternative regulator devices, mounted in various fashions, which correspond with the foregoing.

As shown in FIGS. 3 and 4, side wall means 26 is connected with the periphery of lower wall means 15. The side wall may be vertical, or inclined inwardly or outwardly from the lower wall means. Preferably, the side wall means is connected with the entire periphery of the lower wall means, and is inclined upwardly and outwardly from the lower wall means. Diffusion element supporting means, spaced upwardly and outwardly from the lower wall means, are provided on said side wall means. Such supporting means may for instance include a horizontal annular shelf 27 with inner and outer diameters respectively smaller and larger than the diameter of the lower edge of the diffusion element 35, to be described in greater detail below. Shelf 27 may, if desired, be part of a step in side wall means 26, the rising portion of which step comprises a cylindrical generally upright wall 21. The diffusion element supporting means may be in any desired position on side wall means 26, but is preferably at (in, on or near) the extreme upward and outward projection of wall means 26. Preferably also wall means 26 is of a conical shape.

According to one of the preferred alternative forms of the invention, disclosed in FIGS 3–4, the plenum includes an integral generally upstanding wall 28 which, when viewed in plan view, surrounds the diffusion element supporting means, e.g. annular horizontal shelf 27. When provided, which is preferred, upstanding wall 28 has a height which is about equal to the height of the diffusion element 35. Thus, according to this preferred alternative, the height of wall 28 may be equal to or slightly greater or less than the height of the diffusion element. Wall 28 has an inner surface 29, also generally upstanding, an upper edge 30 and threaded outer surface 31. The shelf 27 and generally upstanding wall 28 therefore can, in the preferred embodiment, provide a socket to receive diffusion element 35, in which substantially the entire height of diffusion element 35 is recessed as shown in FIG. 3 and in the enlargement in FIG. 7.

The most preferred diffusion element is a ceramic plate of circular outline having a stepped edge, depicted in FIGS. 3 and 4, and includes circular central flat area 70, annular beveled edge 71, annular flat surface 72, outer annular beveled surface 73 and horizontal annular surface 74, whose respective outer diameters are 4.5, 6.5, 7.6, 8.7 and 9.25 inches respectively. Surface 70 lies 0.070 inch below surface 72. Beveled surface 73 is at an angle of inclination of 25° relative to the horizontal. The respective overall heights of horizontal annular surface 74, the top edge of vertical side surface 75 and horizontal flat surface 72 are 0.5, 0.7 and 1.0 inch respectively.

The plate is formed from a mix containing particles of alumina with mean transverse and longitudinal dimensions of 0.020 and 0.032 inch respectively, and 20 parts by weight of ceramic bonding agent, per hundred parts by weight of alumina particles. The mix is compacted in a press having a ram with a planar surface and a cylindrical die cavity having a bottom wall with a shape corresponding to the upper surface of diffusion element 35.

The sides of the die cavity and the ram correspond in diameter with the peripheral edge 76 of diffusion element 35 the height of the die cavity from its bottom surface to its upper edge being 1.5 inches. The mix is poured into the cavity in excess, is struck off level with the top of the die and is compressed to the dimensions previously given under a pressure of approximately 900 psi. The resultant compact, after removal from the press, is fired in a kiln at a temperature sufficient to fuse the bounding agent and is then gradually cooled. The resultant product is a coherent porous ceramic diffusion element having a specific permeability of 25 SCFM±3 SCFM.

The diffusion element, whether of the above-described preferred type or not, is supported by and preferably nests within the plenum on the diffusion element supporting means. A sealing means is provided adjacent the periphery of the diffusion element for preventing leakage of air past the periphery of the element.

In the preferred embodiment disclosed in FIGS. 3, 4 and 7 herein, a polyisoprene O-ring 80, having a Shore A Durometer hardness of about 40±3, nests in an annular step formed about the upper portion of the peripheral surface of diffusion element 35. The diameter of the cross section of O-ring 80 preferably slightly exceeds both the spacing between inner surface 29 of plenum side wall means 26 and opposed, facing vertical or near vertical side 75 of element 35, and the height of vertical or near vertical surface 75.

The preferred retaining means of the present invention shown in FIGS. 3, 4 and 7 is an internally threaded clamping ring 84 including a cylindrical member 85 having internal threads 86 matching external threads 31 on side wall means 28 of the plenum. Cylindrical member 85 has attached to it above the threads 86 a flange 88 which extends inwardly over generally upstanding wall 28 of the plenum and at least partly across the top of sealing means 80. According to a preferred embodiment the said flange 88 leaves the upper inner quadrant of the cross section of the O-ring 80 uncovered (shown in greater detail in FIG. 7) while clamping the O-ring with sufficient force to press it in tight engagement with at least the uppermost portion of vertical side portion 75 closely adjacent the edge 89 between side 75 and the upwardly facing adjacent surface 73, thereby avoiding formation of a crevice at the side of the diffusion element which would be in communication with the overlying water and could evacuate itself.

FIGS. 8 through 14 shown alternative but less preferred embodiments of the combination of plenum, diffusion element, sealing means and retaining means which may nevertheless be used successfully in the invention. Each of these various embodiments has in common a plenum side wall means 26, annular horizontal shelf 27, and generally upstanding wall means 28 which is about of equal height with the diffuser element and which faces the opposed peripheral surface or surfaces of the diffusion element which is indicated by reference numerals 35 and 35A through 35G. For example, in FIG. 8, generally upstanding wall means 28 is provided with peripheral flange 90 and circumferentially spaced bolt holes 91 through which extend bolts 93 to clamp a plurality of circumferentially spaced clips 92 against the respective upper surfaces of flange 90 and diffusion element 35A. An elastomeric band or hoop member 95 serves as sealing means. For example, the hoop or band may have an unstretched inside diameter of about 85% of the outside diameter of diffusion element 35A, and is of slightly greater width that the vertical thickness of the diffusion element. When stretched and placed around diffusion element 35A, the extra width of the band forms an inturned upper edge 97, an inturned lower edge 98 and a cylindrical center portion 96, which respectively enclose the upper and lower edges 99 and 100 of the element. Inturned lower edge 98, bearing against annular horizontal shelf 27, seals the interior of the plenum from the vertical space between upstanding wall 28 and element 35A. Cylindrical portion 96 of the elastomeric band prevents air from passing peripherally out of diffusion element 35A into the crevice between itself and upstanding wall means 28. This is an example of retaining means which engages only the element and not the sealing means, and does not contact the entire periphery of the element.

The embodiment of FIG. 9 includes in its generally upstanding wall means 28 a second horizontal shelf 105 and, at the upper edge of said wall means, an outwardly extending generally horizontal flange 106. The peripheral edge of diffusion element 35B is provided with an impermeable coating 107 throughout the height of its peripheral surface, bears laterally against O-ring sealing means 80 which rests on shelf 105, and has an interference fit between diffusion element 35B and wall means 28. O-ring 80 is retained in place, i.e. prevented from upward movement, by a retaining ring 108 of cylindrical configuration having an inner surface 109 about which are situated a plurality of circumferentially spaced inwardly projecting lugs 110 which bear down at widely spaced points, with limited inward projection, on the upper surface of element 35B. Retaining ring 108 also includes an integral outwardly extending annular flange member 111 which rests upon and generally coincides with the outwardly extending flange 106 connected with wall means 28. These tow flanges are held together by a split ring clamp 116 of generally C-shaped cross section having in transverse cross section limbs 112,113 with curved inner faces which engage similarly shaped annular detents 114,115 in the respective lower and upper surfaces of the flanges. The vertical flexibility of limbs 112,113, and a radial split (not shown) in split ring clamp 116 enable the latter to act as a snap action clamp to hold flange 111 and its integral retaining ring 106 firmly together, while lugs 110 secure the diffusion element 35B in place and the lower surface of ring 108 does not clamp, but does prevent upward movement of O-ring 80.

The embodiment of FIG. 10 is similar in many respects to that shown in FIG. 9. The side of diffusion element 35C has an impermeable coating 107 and faces generally upstanding wall means 28. The latter, as in the previous embodiment, includes a second annular horizontal shelf 105 upon which rests O-ring 80, the latter being held in place by a retaining ring 108 with inner surface 109 and lugs 110. However, instead of the flange 106 previously described, upstanding wall 28 has an intergral catch 120 formed about the entire periphery of its outer surface 121, and retaining ring 108 has a plurality of circumferentially spaced outwardly, downwardly and inwardly extending hooks 122 for engaging the catch 120, whereby ring 108 is held in place preventing upward movement of O-ring 80 and holding diffusion element 35C securely in place with lugs 110.

In FIG. 11, annular horizontal shelf 27 includes an inner upstanding lip 27A which helds retain in place a sealing means 125 of substantially rectangular cross section, upon which rests the marginal edge of the lower surface of diffusion element 35D. The side 127 or periphery of element 35D is in opposed, facing relationship with generally upstanding wall means 28 across a narrow vertical space or crevice 131. However side 127 is sealed off from crevice 131 by a substantially impermeable layer including an annular portion 126 above sealing means 125 and a peripheral edge portion 128 on the side of the element adjacent crevice 131. Element 35D is held firmly in place against sealing means 125 by internally threaded clamping ring 129 engaging threads 130 on the outer surface of wall means 28.

FIG. 12, like FIG. 7, is an example of a sealing means located at the edge between a side surface and an upwardly facing upper surface of the diffusion element. As shown in the FIG. 12, diffusion element 35E rests directly upon annular horizontal shelf 27 and has a substantially impermeable peripheral edge coating 128, which seals off the side of the element from the crevice 131 formed between the element and generally upstanding wall means 28. In this embodiment the sealing means 133 is of hybrid cross section, having a semi-circular outline in its upper portion and a rectangular outline in its lower portion. The semi-circular portion of sealing means 133 is engaged by the form fitting lower surface of annular flange 134 on internally threaded clamping ring 135, the latter engaging threads 136 formed on the outer surface of wall means 28. A short dependent lip 137 on the innermost edge of flange 134 tends to urge sealing means 133 outwardly and downwardly, so that the sealing means flat outer surface 139 and flat bottom surface 138 bear outwardly against the inner surface of wall means 28 and downwardly on diffusion element upper surface 140, and especially on the edge 141 at which upwardly facing surface 140 intersects with the element side surface 142.

FIGS. 7 and 12 both show the sealing means as a member of substantially lesser height than the height of the diffusion element which member is located at an edge at the intersection between the side of the diffusion element and an upwardly facing gas discharge surface thereof. The two embodiments show the sealing means below and adjacent said edge, or above and adjacent said edge; however, it is also possible to provide sealing means which covers a portion of the element both above and below the said edge. These various preferred configurations minimize the above described difficulties which occur with crevices that can be swept free of water and relieve adjacent portions of the element from the influence of surface tension, resulting in disturbance of the uniformity of distribution of air by the element. A particularly beneficial result is obtained when a sealing means at such an edge is used in combination with means for reducing the permeability of the side of the element, such as for instance, the band member 95 of FIG. 8 and the impermeable coatings 107 and 128 of FIGS. 9-12, or the stepped side configuration shown in FIG. 7. In the stepped configuration the particulate material of the diffusion element beneath horizontal annular surface 74 and adjacent peripheral surface 76 has been subjected to sufficient compression to reduce its permeability as compared to the upwardly facing gas discharge surfaces 72 and 73. The peripheral surface 76 may have merely a reduced permeability relative to the upwardly facing gas discharge surfaces, or may be rendered substantially impermeable. The property of reduced permeability relative to the upwardly facing gas discharge surfaces (including substantial non-permeability), is beneficial when combined with the sealing means at the above described edge. The combination tends to reduce both the crevice difficulties described above and difficulties with short circuiting of air from the plenum to the element gas discharge surface along air flow paths of differing length. For this reason, the combination of a side of reduced permeability and a sealing means at the above described edge represent a preferred embodiment of the present invention.

In FIG. 13, as in the preceding figure, the diffusion element 35F rests directly upon annular horizontal shelf 27. In this embodiment element 35F includes an annular recess 143 at the upper edge of its side 144. Side 144 as well as the lower and upper portions 145 and 146 of recess 143 are covered with a non-adherent cover or an impermeable coating 147. O-ring sealing means 80 rests in recess 143 and has an interference fit with impermeable coating 147 and the inner surface of wall means 28, while engaging the curved transitional surface 148 between the lower and upper surfaces 145 and 146. The O-ring seal 80 is clamped tightly in place by internally threaded sealing ring 149 engaging threads 150 in wall means 28, and consequently retains diffusion element 35F in place.

In the embodiment of FIG. 14 the side of diffusion element 35G includes a step generally indicated by 151 and including a generally horizontal annular surface 152 and vertical cylindrical surface 153, both of which are covered with a non-adherent cover or coated with impermeable coating 154. The remainder of the side of element 35G is a lower cylindrical surface 155 which need not necessarily have any impermeable coating thereon. O-ring seal 80 is compressed against four surfaces, including diffusion element surfaces 152 and 155, horizontal annular shelf 27 and the inner surface of wall means 28. Thus, inverted step 151 rests upon the O-ring 80 and is thereby indirectly supported by the diffusion element supporting means. An internally threaded clamping ring 156 engaging threads 157 on wall means 28 clamps the diffusion element in place. The annular flange 158 of clamping ring 156 has an inner surface 159 of about the same diameter as the diffusion element side surface 153. Lugs 160, situated at spaced points around the ring inner surface 159, extend a short distance inwardly over the upper surface of element 35G, holding it in place. Thus, the diffusion element 35G is clamped only at its periphery, and only at spaced positions along the periphery.

Figure 15:
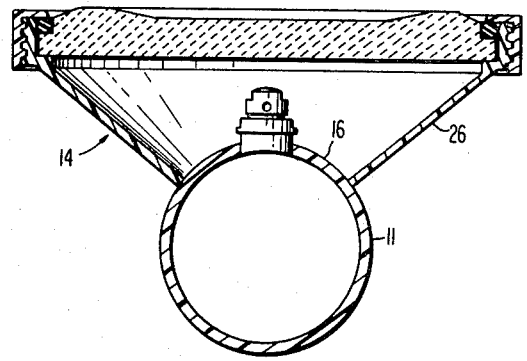
FIG. 15 is a vertical transverse cross section of the header pipe and one of the diffusers of FIG. 2 wherein the plenum side walls are affixed directly to the pipe wall, whereby the upper surface of the header pipe serves as the bottom wall of the plenum.

As shown in FIG. 15 side wall means 26 are affixed directly to the surface 16 of header pipe 11 so that surface 16 forms the lower wall of plenum 14.

Figure 16:
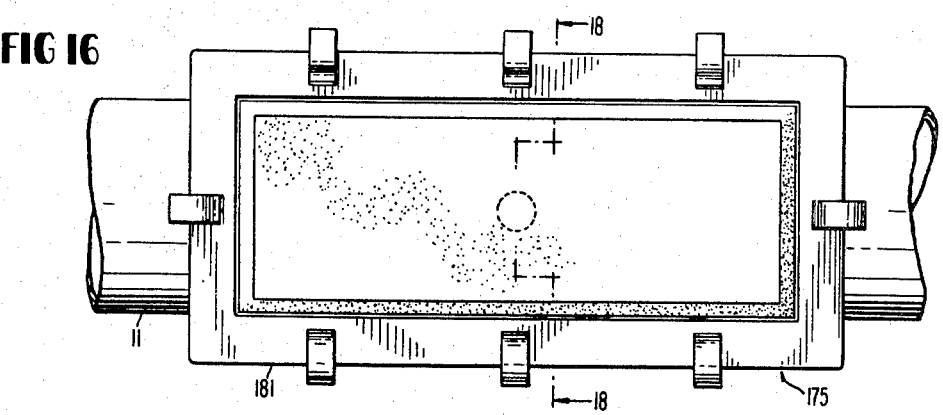
FIGS. 16 and 17 are plan and elevation views of a header pipe and diffuser wherein the diffuser has vertical side walls.
Figure 17:
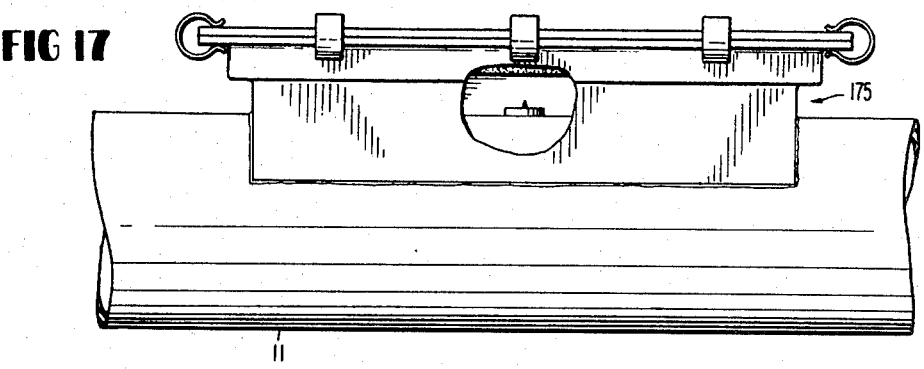
Figure 18:
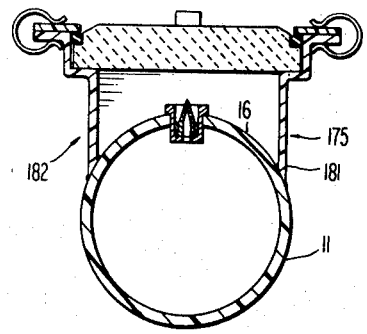
FIG. 18 is a vertical transverse cross section of header pipe and diffuser of FIG. 16 taken at section 18–18 of FIG. 16 showing a structure wherein the upper surface of the header pipe serves as the bottom wall of the plenum.

In the embodiment of FIGS. 16, 17 and 18, diffuser 175 is shown with vertical walls 181. FIG. 18 shows the vertical side walls bonded directly to surface 16 of header pipe 11 whereby surface 16 forms the lower wall of plenum 182. Although shown as rectangular, the wells could be curvilinear, including circular and elliptical, or irregular.

FIG. 19 discloses a preferred apparatus for obtaining dynamic wet pressure and/or network back pressure at any point in time under a variety of operating conditions, and can provide a basis for comparison at other conditions. The figure is a vertical transverse cross-section of a header pipe through an associated plenum and diffusion element, along with an air flow regulator (not in section) showing the location of pressure taps, a bubble pipe and ancillary equipment required to obtain the pressure(s) in question. The pressure taps and a series of lines feeding manometers or other suitable pressure measuring devices are used to determine the various desired pressure readings. An air supply A, which can be a separate compressor or a tap into the plant aeration air system is used to supply a slow rate of air through a bubble pipe B, having its lower, open end located at the same elevation as the discharge surface of the diffuser elements. The pressure detected in line 1 will indicate the hydrostatic head applied to the diffusion element. This pressure is read from the manometer connected between line 1 and the atmosphere. Dynamic wet pressure is read from the manometer connected to lines 1 and 2. Assuming the use of flow regulators having gas orifices or apertures of known pressure/flow characteristics, and the availability of the barometric pressure and other information needed for making the requisite calculations, the flow rate through the element can be calculated based on the pressure read from the manometer serving lines 2 and 3. Temperature measuring means, for example thermometers or transducers, may be provided at any convenient submerged or nonsubmerged location within or without the gas distribution network for obtaining temperature data which is sufficiently related to or representative of the temperature of the gas flowing through the above-mentioned flow regulator for calculating flow with the requisite precision. Preferably, the temperature measuring means is situated adjacent to, including just upstream of, the flow regulator of that diffusion element which is used to take the pressure readings, or as close thereto as practicable.

FIGS. 20, 20A and 20B illustrate the determination of bubble release pressure. FIG. 20 depicts a diffusion element in plan view at the top of the figure and in vertical cross-section at the bottom of the figure. This element includes an integral annular peripheral zone generally indicated by reference numeral 229 (FIG. 20B), vertical cylindrical edge 230, horizontal annular surface 231 and vertical side surface 232, as well as gas infusion surface 234 and discharge surface 233. However, it should be noted that surface 233 can also serve as the gas infusion surface, in which case surface 234 would become the gas discharge surface. FIG. 20 illustrates the testing of this plate for bubble release pressure. One possible apparatus for performing such a test is shown in the lower portion of FIG. 20 and in FIG. 20A.

The exemplary apparatus includes a tank 240 (FIG. 20) having bottom wall 241 and side walls 242, 243. Resting on bottom wall 241 are supports 244, 245 which support the diffusion element with its gas discharge surface 233 facing upwardly beneath the water level 246. Compressor C is connected via conduit 251, pressure regulating valve 252 and flowmeter 253 with a first hose 254. The latter is in turn connected to the first horizontal leg 256 of a tee 255 having a second horizontal leg 257 and vertical leg 258. A sealing ring 259 is provided around the open bottom end of vertical leg 258. Second horizontal leg 257 is connected via second hose 263 with a manometer 264 having a scale 265. By comparison of liquid levels 266 and 267 with scale 265 it is possible to determine the pressure within the system, which is assembled carefully to provide gas tight joints at all connections between components.

As shown in greater detail in FIG. 20A, the vertical leg 258 of tee 255 and the sealing ring 259 constitute a test probe. It may for example be fabricated from a standard laboratory glass tee having a sufficient internal diameter to readily deliver the desired gas flow and from a standard rubber stopper assembled as shown, the bottom of the stopper constituting the end of the probe and having outside and inside diameters 259A and 259B of 3/8 inch and 3/16 inch, respectively. The probe, when manually pressed against the gas discharge surface 233 of the diffusion element, is circumscribed by the site to be tested. The lower surface of sealing ring or stopper 259 forms a gas-tight seal with surface 233, which forces air to pass through the element below and adjacent to seal 259 and to exit into the liquid in the test site area as bubbles 260. The pressure required to release the bubbles can be read from the manometer. Since the stopper 259 is non-adherent relative to surface 233, the probe may be readily moved from one test site to another to take a series of pressure readings from which bubble release pressure can be calculated.

Returning to FIG. 20, mutually perpendicular reference lines 271 and 272 are drawn on gas discharge surface 233 of the diffusion element. Equally spaced reference marks 273 situated along reference line 271 and 272 identify probe positions over which the open end of the above-described probe of FIG. 20A is sequentially positioned in such a way as to produce an effective seal as described above. Regulating valve 252 is adjusted against a relatively high pressure from compressor C to a relatively low rate of flow, i.e. $2\times10^{-3}$ C.F.M. When a bubble or bubbles 260 are produced through a portion of the gas discharge surface adjacent the probe, the pressure in the system is read from manometer scale 265. The bubble release pressure at the test point is obtained by subtracting the hydrostatic head H, between gas discharge surface 233 and water level 246, from the pressure read from the manometer. Taking bubble release pressure measurements at a statistically significant number of randomly or uniformly established points on gas discharge surface 233 enables one to determine the bubble release pressure of said surface. However, in actual practice it has been found to be reasonably accurate and convenient to establish all of the pressure testing points along two mutually perpendicular reference lines as shown. In a diffusion element manufactured with reasonable care, conducting the tests along two such reference lines provides a reasonably accurate approximation of the uniformity of distribution of air flow capabilities across the gas discharge surface.

The central portion of FIG. 20 includes a graph having a horizontal coordinate 274 with divisions 274A corresponding in scale and position to reference marks 273 on reference line 271. Vertical coordinate 275 of this graph includes an appropriate scale of pressure values whereby the pressure readings taken at reference marks 273 on reference line 271 may be plotted between the coordinates to develop a bubble release pressure profile or curve 276. In a tank 240 with sufficient space between side walls 242,243 and the sides of the diffusion element, it is possible also to take bubble release pressure readings at the vertical cylindrical edge 230, horizontal annular surface 231 and vertical side surface 232 as well as at a point on gas discharge surface 233 which is quite close to the vertical side surface 232. The positions of the test sites on the diffusion element and the corresponding positions of the pressures as plotted in the graph are shown by dashed reference lines 280A, 280B (vertical cylindrical edge 230), 281A, 281B, (horizontal annular surface 231), 282A, 282B (vertical side surface 232) and 283A, 283B (edge of gas discharge surface 233). The aforementioned testing and plotting positions are shown in greater detail in FIG. 20B, an enlarged and foreshortened portion of FIG. 20.

The bubble release pressure is an indication of the pressure required for bubbles of air to overcome surface tension upon discharge from the pores of the plate. It has been found that this pressure requirement can considerably exceed the pressure losses due to friction in pushing the gas from the air infusion surface to the gas discharge surface of the plate. This is particularly true where the plate is fabricated of hydrophilic materials which are readily wetted by the water as compared to hydrophobic materials.

The graph in FIG. 20 shows that the diffusion element exhibits minimum bubble release pressure (B.R.P.) in a central region of the element. In surrounding regions of the element, the bubble release pressure grows gradually higher, climbing towards a maximum 285A, 285B, indicated by reference lines 283A, 283B, based on tests made on gas discharge surface 233 adjacent vertical side surface 232. Bubble release pressure tests on side surface 232 indicated by reference lines 282A, 282B indicate that the bubble release pressure reaches a second minimum 286A, 286B in this area. A further measurement of bubble release pressure on horizontal annular surface 231, indicated by dashed lines 281A, 281B shows that the pressure can reach a second maximum 287A, 287B in this area. A final observation taken on vertical cylindrical edge 230 as indicated by reference lines 280A, 280B indicates there can be some reduction of bubble release pressure in this area as compared to the second maximum 287A, 287B. The existence of a low bubble release pressure region in vertical side surface 232 as indicated by the second minimum 286A, 286B of bubble release pressure curve 276 is unexpected. Using data accumulated along reference line 272, it is also possible to develop a bubble release pressure curve (not shown) for the test sites along reference line 272.

Inasmuch as the rate of flow of gas through a given region of the diffusion element will be an inverse function of the bubble release pressure in said region, it is possible to develop a flow curve 277 which is considered representative of the flow profile of the plate across reference line 271. Actual flow data may be obtained for the central portion of the element by operating the element for timed intervals with an inverted graduated cylinder over the test sites. Estimated flows based on bubble release pressure may be derived for the edges of the element. Analysis of the resulting flow curve provides a practical indication of the uniformity of gas flow distribution across the element. As shown by gas flow curve 277, peak flow occurs in the central region of the diffusion element, tapering off to a first minimum 290A,290B (corresponding to bubble release pressure maximum 285A,285B) near the outer edge of gas discharge surface 233. There are also flow peaks 291A,291B and second minima 292A,292B corresponding inversely and respectively to bubble release pressure minima 286A,286B and second maxima 287A,287B. Thus the testing technique illustrated in FIG. 20 has provided a much clearer and more quantitatively accurate indication of the flow profile of the diffusion element than has heretofore generally been available in the industry. Moreover it has made it possible to see that such diffusion elements may exhibit higher flow rates per unit area in certain regions, while other regions of the elements are underused. Excessive gas flow through one or more regions of the elements tends to produce excessively large bubbles, thereby impairing the oxygen transfer efficiency of the elements.

FIGS. 21 through 31 disclose various forms of diffusion elements configured in such a manner as to avoid the above-described difficulties. In general, these are rigid, monolithic, porous, gas diffusion elements having an enhanced apparent volumetric compression ratio in permeable central and/or boundary portions thereof. The elements are formed of a body of solid particles which has been shaped, pressed and rendered coherent by bonding or sintering in a compacted form having pores. As viewed in vertical cross section the element includes a generally horizontal portion having a specific permeability in the range of about 6 to about 200 SCFM at 2 inches of water gauge. The maximum horizontal dimension of the aforesaid portion is in a ratio of at least about 4 to 1 relative to the thickness of said portion. The said portion also includes an upper gas discharge surface, which is generally horizontal and which has a bubble release pressure in water in the range of about 2 to about 20 inches of water. The central and boundary zones are beneath a portion of the upper gas discharge surface. Within one or both of these zones the solid particles have been pressed to a greater apparent volumetric compression ratio as compared to the material in an adjacent portion of the element, for example in an outward zone positioned between the central and boundary zones beneath the gas discharge surface. The diffusion element may also include a peripheral zone in which the element has a lesser permeability, a greater density or a lesser height than a portion of the element surrounded by the above-mentioned boundary zone or of the gas discharge surface above said portion.

Among the elements referred to above are those in which the apparent volumetric compression ratio of a central zone has been enhanced by distributing the particles in the aforementioned body, prior to or during pressing, for providing a larger mass of particles per unit horizontal area in the central zone, as compared to the mass of particles per unit area in an outward zone. The particles may be distributed prior to or during pressing by providing a larger mass of particles per unit volume in the central zone. Moreover the larger mass per unit area of particles may be provided by performing the pressing in a die having a cavity and filling a central portion and a surrounding portion of the cavity with said particles in respectively greater and lesser depths.

In those elements having central and outward zones, the enhanced apparent volumetric compression ratio may also be provided by effecting, during pressing, relatively larger and smaller ratios of thickness reduction in the central and outward zones respectively; and this is true whether the height of particles in that portion of the body of particles corresponding to the central zone, prior to or during pressing, is substantially the same or different, e.g. greater, than the height of the particles in that portion of the body corresponding to the outward zone. These larger and smaller percentages of thickness reduction can be effected by performing the pressing in a press having a ram and die cavity, with spaced, opposed compression faces having respectively smaller and larger clearances in central and surrounding portions of the space between the faces, whether the smaller clearances are provided by a protuberance on the compression face of the die cavity or by other means.

Within the boundary zones of those elements which have boundary zones the greater apparent volumetric compression ratio may be provided in a variety of ways, including effecting, during pressing, relatively larger and smaller ratios of thickness reduction respectively in the boundary zone and in a further portion of the element surrounded by the boundary zone, such as the above mentioned outward zone. Here again, a press having a ram and die cavity with spaced, opposed compression faces with relatively smaller and larger clearances corresponding to the positions of the boundary zone and the aforementioned further portion may be used. The respectively smaller and larger clearances may be provided by protuberances on the compression face of the die cavity, on the compression face of the ram or by other means.

The above-described elements may be embodied in a wide variety of forms including for example those having planar surfaces and those having a depression above or below the central zone and spaced inwardly from the periphery of the element. That is, the element may be provided with a central depression or depressions in its gas infusion surface, its gas discharge surface or both. However, the aforesaid depression(s) may or may not be coextensive with the central zone. The depth and area of the depression(s) may be varied as desired for enhancing the uniformity of gas distribution laterally across the horizontal gas discharge portion of the element, and the depth may vary in portions of, or throughout, the depression(s). There may be one or more areas within the outline of the depression(s) which are not depressed. Moreover the enhanced apparent volumetric compression ratio of the boundary zone discussed above, may be provided by forming the upper gas discharge surface of the element above the boundary zone with a downward and outward slope at an angle of depression in the range of about 10° to about 80° relative to the horizontal.

The above features are of assistance in providing gas diffusion elements having the property of discharging gas in a substantially uniform manner throughout an upper gas discharge surface of the element with a coefficient of variation not greater than about 0.25, said coefficient of variation being based on the values of bubble release pressure measurements at at least about 5 equally spaced points along each of two mutually perpendicular reference lines extending across said surface and through the center thereof.

The above-described elements may be manufactured according to any convenient method. However, FIGS. 21 through 29 disclose illustrative methods which may be used if desired.

These illustrative methods are modifications of a previously used method. In common with the prior method they employ a die 301 having a cylindrical cavity 302 defined in part by a compression face or bottom wall 303 and side walls 304 and 305. The die is filled with a loose mix of solid organic or inorganic particles with or without binder which can be pressed and rendered coherent. For instance, one may employ beads or granules of synthetic resin, such as polyethylene or polystyrene, glass beads, granules of inorganic materials such as metal particles, alumina, mullite, silica and others. Organic and inorganic binders may also be included in the mix. The mixes may be designed for developing coherency by pressing and sintering and/or bonding, such as for instance organic adhesive bonding, glass bonding, or ceramic bonding.

In common with the known technique the die 301 is filled above its upper surface 306 with a body of loose particulate solid material 310. Then, the excess material is struck off with a screed. Next, a ram 317 having compression face 318 is moved toward the particulate material and eventually engages same. Further travel of ram 317 presses the body 310 in die cavity 302, converting the body of particulate material to various compacted forms. Withdrawal of ram 317 permits one to remove the resultant compacts from die cavity 302. Depending on the mix used, the compact may or may not be baked or fired to produce the completed element.

Figure 21:
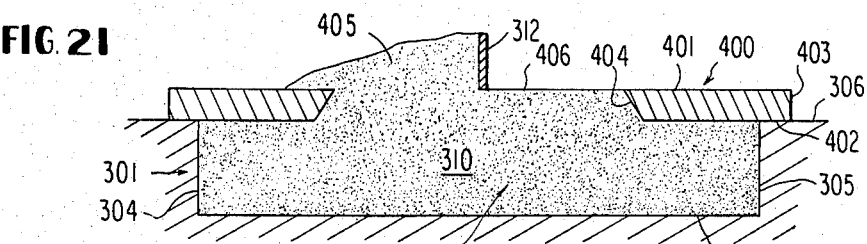
Figure 22:
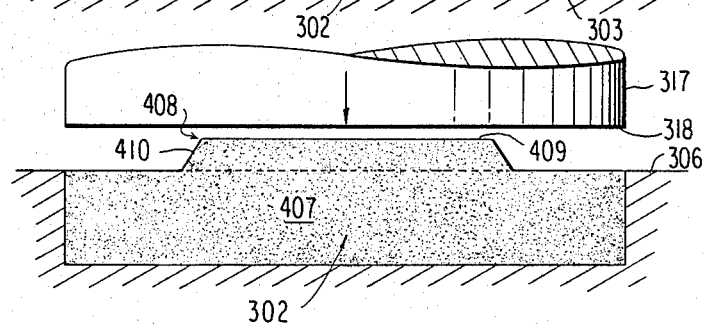
Figure 23:
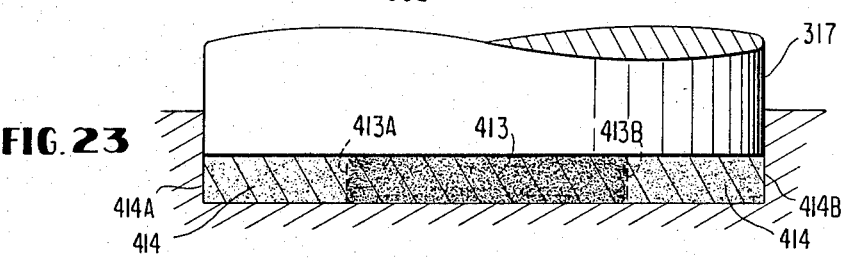

A first example of the modified method, shown in FIGS. 21 through 23, begins with the shaping ring 400 removed, so that the die cavity 302 is open. Particulate materials are introduced in sufficient amount to fill cavity 302 and are levelled off at the elevation of die upper surface 306. Onto said surface is placed a shaping ring 400 having planar upper and lower surfaces 401 and 402 and perpendicular peripheral surface 403 representing its outer edge. The ring also has an internal conical surface 404 defining a central frustro-conical chamber open at the top and bottom. The aforesaid chamber is initially empty because the body of particulate material has previously been screeded off flush to the die upper surface 306. However the chamber within internal conical surface 404 is now filled with excess particulate material 405 which is then struck off with screed 312 to a level surface 406 flush with upper surface 401 of shaping ring 400. Upon careful removal of shaping ring 400, there is left in die cavity 302 a body 407 of particulate material having an elevated central portion 408 with a flat top 409 and conical sides 410; however portion 408 can have various shapes.

Body 407 and the above described technique of preparing same constitute one example of providing a larger mass of particles per unit of horizontal area in a central zone or region, as compared to the mass of particles per unit area in an outward surrounding zone or region. In this case, the larger mass of particles per unit of horizontal area is provided by filling a portion of the die to a greater depth than the surrounding portions.

However, a larger mass of particles per unit area can also be provided by filling a central portion of the die with particles at a greater density. For instance, one may fill the die cavity, level the contents flush with the top of the cavity and then densify the particles in a central region of the die by localized vibration or pressing, which will cause the material in such region to sink lower in the die than the surrounding material. The resulting depression can be filled with additional particulate material prior to pressing or final pressing as the case may be. This is an illustration of distributing the particles prior to or during pressing for providing a larger mass of particles per unit volume in a central region or zone as compared to the mass of particles per unit volume in an outward or surrounding region or zone.

Irrespective of whether the central region or zone of the die is filled to a greater height and/or greater density the body of material is then pressed as shown in FIG. 23. This produces an element having an enhanced apparent volumetric compression ratio in its central zone 413 (bounded by reference lines 413A, 413B) as compared to the volumetric compression ratio in an outward zone 414, which in this case is an annular zone bounded at its inner edges by reference lines 413A, 413B and by the peripheral edges of the element indicated by 414A, 414B.

FIG. 24 through 29 illustrate the preferred technique of providing enhanced apparent volumetric compression ratio. More specifically these figures disclose the technique of effecting, during pressing, relatively larger and smaller ratios of thickness reduction in the aforementioned central and outward zones, respectively.

Figure 24:
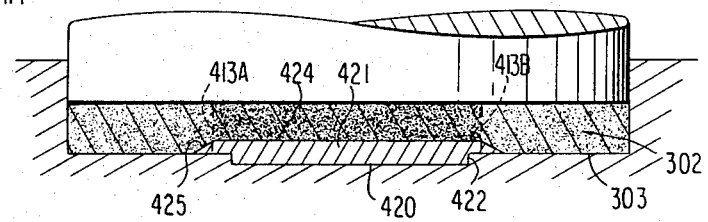
Figure 25:
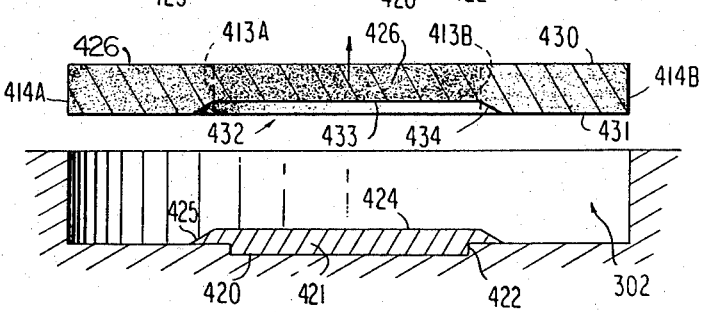
Figure 28A:
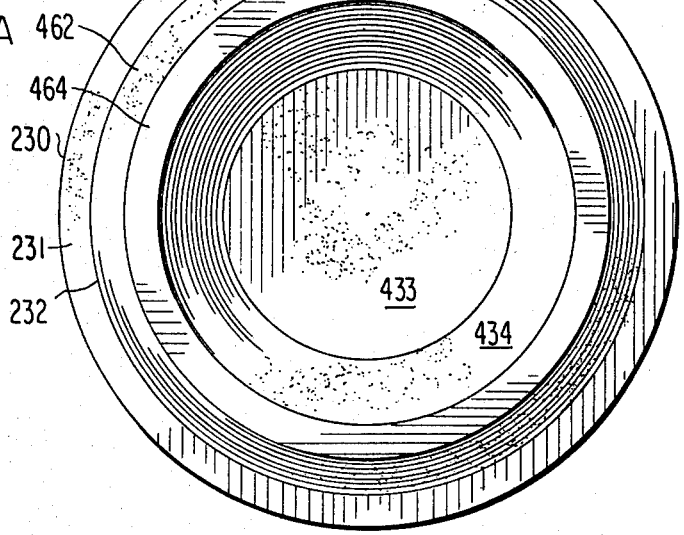
FIG. 28A is a plan view from the top, of the diffusion element of FIG. 28.

According to one of the preferred techniques disclosed in FIGS. 24 and 25, the relatively larger and smaller ratios of thickness reduction are obtained with the assistance of an annular insert 421 constituting a protuberance on the compression face 303 of die cavity 302. Insert 421 includes a lower cylindrical projection 422 which mates with a corresponding socket 420 in die cavity lower wall 303. The upper portion of insert 421 is a shaping member which includes a flat top 424 surrounded by a conical surface 425. When the die cavity 302 of FIG. 24 is filled, and the contents are first made level with upper surface 306 and then compressed as shown in FIG. 24, the resultant compact 426, shown in FIG. 25, includes a planar air infusion surface 430 and a generally horizontal air discharge surface 431 including a central depression 432 having a flat area 433 and a beveled edge 434. This is an example of enhancing the apparent volumetric compression ratio of the central zone of a diffusion element by effecting, during pressing, relatively larger and smaller ratios of thickness reduction in the central and outward zones, respectively. In this case, the respectively larger and smaller percentages of thickness reduction have been effected by performing the pressing in a press having a ram and die cavity with spaced, opposed compression faces with respectively larger and smaller clearances in central and surrounding portions of the space between the faces. In this case, the smaller clearance is provided by a protuberance, i.e. insert 421, on the compression face of the die cavity; but it is also possible to carry out this technique using a die cavity with a flat bottom wall and a protuberance on the compression face of the ram.

One can make a wide variety of modifications to the article and manufacturing technique shown in FIGS. 24 and 25 without departing from the invention. The shape, depth and area of the depression 432 may be freely varied to obtain the desired level of uniformity of air distribution at the gas discharge surface 431 of the element. The shape of the depression may include any desired outline which contributes to uniform distribution of air flow; but preferably the outline of the depression is similar to the outline of the element. Within the outline of the depression, there may be a wide variety of shapes as viewed in transverse cross section. The floor of the depression may be composed wholly of straight or curved surfaces or a combination of straight or curved surfaces. The center of the depression may be flat as shown, or gently curved throughout or may be in the form of an extremely flat cone or may have any other convenient or desireable shape which accomplishes the purposes of the invention. The showings of depressions including flat areas and beveled edges shown in the drawings herein are simple and preferred but are by no means intended to limit the invention.

As indicated above, the area of the central depression is not necessarily coextensive with the area which establishes the central zone of the element. The depression may terminate within or extend beyond the area which defines the central zone. However, it is convenient for purposes of design to establish the area of the depression in such a way that it is coincident with the area which defines the central zone of the element.

One may select any combination of area and average depth for the depression which are sufficient for significantly enhancing the uniformity of gas distribution laterally across the gas discharge portion of the element. For example, the area of the depression may comprise about 10 to about 80 percent, preferably about 25 to about 70 percent and more preferably about 45 to about 65 percent of the total area of the element gas discharge surface or of the total area of the element, while the average depth of the depression may be about 2 to about 20 percent, preferably about 4 to about 15 percent and more preferably about 5 to about 10 percent of the average thickness of the horizontal portion of the element.

The depth of the element may vary within its outline, in either a stepwise or gradual fashion, the latter being preferred. Most preferably the variation occurs gradually along gradually sloping portions of the gas discharge surface. It is also contemplated that there may be certain areas within the outline of the depression in which there is no depression. Such is illustrated by FIG. 26.

FIG. 26 discloses an element which can be formed for example, by a modification of the technique shown in FIG. 25. The insert 421 is replaced by an annular insert 440 having an annular rib 441 in its underside which engages a correspondingly shaped annular channel 442 in the bottom wall 303 of die cavity 302. Annular insert 440 includes a flat top 443 with beveled inner and outer edges 444,445. When the thus modified die cavity 302 is employed, the resultant element, shown in the upper portion of FIG. 26, includes a depression 449 of annular shape, having tapered edges 450,451 and including a non-depressed center portion 452. Within the body of the circular element thus formed is a circular central zone whose boundaries are indicated by 413A,413B, surrounded by an outward zone extending from 413A,413B to the cylindrical peripheral surface of the element indicated by 414A,414B.

As illustrated in FIG. 27 the outward zone of the element does not necessarily extend to its extreme peripheral edge. The cylindrical die cavity 302 includes a circular insert 421 in its bottom wall 303. A step is formed about the periphery of bottom wall 303 where it joins side walls 304 and 305, said step including vertical cylindrical surface 324 and horizontal annular surface 325. Production with such a die produces an element as illustrated in the upper portion of FIG. 27. This element includes a gas discharge surface 431 having depression 432 with tapered edges 434 within the bounds 413A,413B of the central zone of the element. The vertical cylindrical surface 324 and horizontal annular surface 325 of the die cause the extreme peripheral portion of the element to include a vertical cylindrical edge 230, horizontal surface 231 and vertical side surface 232 defining a step in the edge of the element. That portion of the volume of the element bounded by planar air infusion surface 430, vertical cylindrical edge 230, horizontal annular surface 231 and reference lines 460A,460B define an annular peripheral zone of reduced permeability, greater density and lesser average height as compared to the permeability, density and average height of the relatively inward and adjoining portions of the element. In this element the outward zone is bounded inwardly by reference lines 413A,413B and at its outer edge by reference lines 460A,460B.

FIG. 27 represents a way of improving the uniformity of air distribution of a porous gas diffusion element such as for instance that shown in FIG. 20A. Formation of a peripheral zone of lesser height or greater density or lesser permeability affects not only the flow characteristics of the peripheral zone itself, but also the characteristics of the relatively inward portions of the element, tending to concentrate flow in a central zone. By providing an enhanced apparent volumetric compression ratio in the central zone, the foregoing tendency can be countered, equalized or eliminated.

FIG. 28 illustrates how the present diffusion element may include a boundary zone adjacent to a peripheral zone. From the description of the element without a depression in FIG. 20A and the testing thereof as illustrated in that figure, it will be recalled that the vertical side surface 232 of said element tended to exhibit a second minimum 286A,286B of bubble release pressure and a corresponding peak 291A,291B on the flow rate curve 277, indicated by dashed lines 282A,282B. The tendency for the flow to peak in this area of the element may be considered undesireable, depending on a number of factors such as for instance the type of holder and sealing arrangement adopted in mounting the element in a diffusion system. Where the element is mounted in such a manner that it is free to discharge bubbles through vertical side surface 232 into the medium to be aerated, there is a tendency for the surface to produce undesireably large bubbles and high flux rate. Moreover, if the surface 232 discharges into a crevice which can be swept clear of water (and thereby freed of surface tension) by the bubbles emanating from the pores in surface 232, a disproportionate share of the total air flow will be shifted to said surface. This tendency may be countered, equalized or overcome by a variety or combination of techniques including, for example, covering the surface 232 with an impermeable layer which is held or adhered in place, by utilization of seals and diffusion element holders of proper design, by the modification shown in FIG. 28, by a combination of these measures or by any other desired means.

FIG. 28 illustrates a diffusion element which includes a boundary zone adjacent to and inwardly of the peripheral zone, the solid particles having been pressed to a greater apparent volumetric compression ratio in the boundary zone as compared to the aforementioned outward zone. This is accomplished for instance by modifying the die cavity 302 to include a fillet 461 at the base of, and extending inwardly of, the step formed by vertical cylindrical surface 324 and horizontal annular surface 325. This fillet may for instance be at an angle relative to the horizontal, or relative to the surface of the aforementioned outward zone (especially if the latter is not perfectly horizontal), in the range of about 10° to about 70°. In other respects the die of FIG. 28 is identical to that shown in FIG. 27. Thus FIG. 28 is one example in which larger and smaller percentages of thickness reduction have been effected by performing the pressing in a press having a ram and die cavity with spaced, opposed, compression faces and wherein there are relatively smaller and larger clearances in those portions of the space between the faces which correspond to the positions of the boundary zone and the aforementioned outward zone in the diffusion element. In this particular instance, the smaller clearance is provided by a protuberance on the compression face of the die cavity, i.e. fillet 461.

When an element is pressed in the die of FIG. 28, the resultant element shown in the upper portion of FIG. 28 includes a beveled edge 462 which is at an angle alpha relative to the horizontal. For the style of plate shown in FIG. 28, 25° is considered the optimum value of alpha. The benefits of providing the beveled edge 462 were not foreseen when the concept of central volumetric compression ratio enhancement was developed. However, experience gained from working with the central depression concept and the above described bubble release pressure measuring technique have led to some hypothetical explanations for the possible effects of beveled edge 462.

As noted previously, the existence of a low bubble release pressure region in vertical side surface 232 as indicated by the second minima 286A, 286B of bubble release pressure curve 276 in FIG. 20B is unexpected. Perhaps this phenomenon may be explained in retrospect by a theoretical consideration of the flow of particles within the die cavity. Inasmuch as the solid particles between ram compression face 318 and horizontal annular surface 325 are subjected to greater compression than the adjoining particles between ram surface 318 and die bottom wall 303, downward and inward force vectors may possibly develop in the material above surface 325 as some of the particles, under compression, migrate downwardly and inwardly in the compact. Vertical side surface 232 may be shielded somewhat from such vectors by the inner edge of horizontal annular surface 325, whereby the material along surface 232 is less compacted than that along surface 231, imparting respectively greater and lesser permeability to said surfaces.

It is theorized that the fillet 461 in the die of FIG. 28 can exert a crowding effect on the material above it, creating next to the outward zone a ring-like boundary zone bounded at its outer edges by reference lines 460A, 460B adjacent annular peripheral zone 229 and bounded at its inner edge by reference lines 463A, 463B. This, we believe, tends to bring the bubble release pressure—and therefore the potential flow rate—of the surface 232 into a more favorable balance with the remainder of the element, which may be indicated by a reduction in the above-mentioned permeability difference.

FIG. 29 discloses an alternative technique for providing the larger and smaller percentages of thickness reduction referred to above. More specifically, in FIG. 29 the smaller clearance is provided by a protuberance on the compression face of ram 317. For example, as shown in FIG. 29 the compression face 318 of ram 317 includes an annular rib which may for instance extend full circle around compression face 318 a short distance inwardly of its peripheral edge. This rib may be of any desired cross section but is preferably arcuate. It may have any suitable depth consistent with the structural integrity of the peripheral edge of the element and which is suitable for producing the desired enhancement of apparent volumetric compression ratio. Representative depths would be those stated above for the central depression 432.

In this embodiment, the die cavity 302 may include the fillet 461 of FIG. 28 but preferably is like the die cavity of FIG. 27 having insert 421 and a step defined by surfaces 324 and 325. When this die cavity and the ram 317 of FIG. 29 are employed, the resultant element is as shown in the central portion of FIG. 29. The annular rib 466 produces a corresponding annular groove 467 in the air infusion surface 430 of the element. The groove 467 may be positioned so that its shape intersects with or is slightly inward of the edge of the peripheral zone or the projected surface of vertical side surface 232. Thus, while annular groove 467 should be situated at least in part within the boundary zone of the element, it may project to some extent into the peripheral annular zone 229. An element having an annular groove 467 positioned as shown in FIG. 29 will include central, outward, boundary and annular peripheral zones delineated by reference lines 413A,413B; 463A,463B; 460A,460B; and vertical cylindrical edges 230 in the same general manner as the element of FIG. 28.

Elements with boundary zones are illustrated by FIGS. 28 and 29 and have the advantage that their side surfaces 232 have an increased bubble release pressure. Thus they may suffer less or not at all from the disadvantages described above in respect to the FIG. 20B and 27 element. Thus, diffusion elements with or without central enhancement of apparent volumetric compression ratio, and with peripheral zones that have been rendered semi-permeable or substantially non-permeable, can be improved if desired by enhancement of the apparent volumetric compression ratio in a boundary zone adjacent to and inwardly of the peripheral zone.

Figure 30:
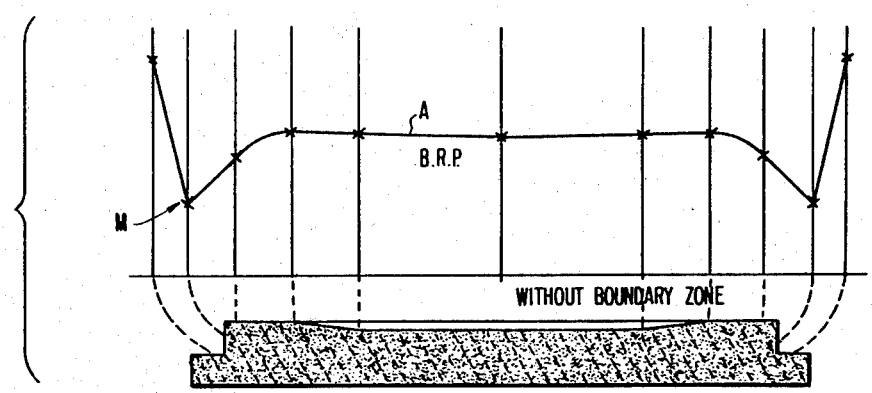
FIG. 30 is a transverse cross section of a diffusion element in accordance with FIG. 27 and an associated bubble release pressure plot exemplary of said element.
Figure 31:
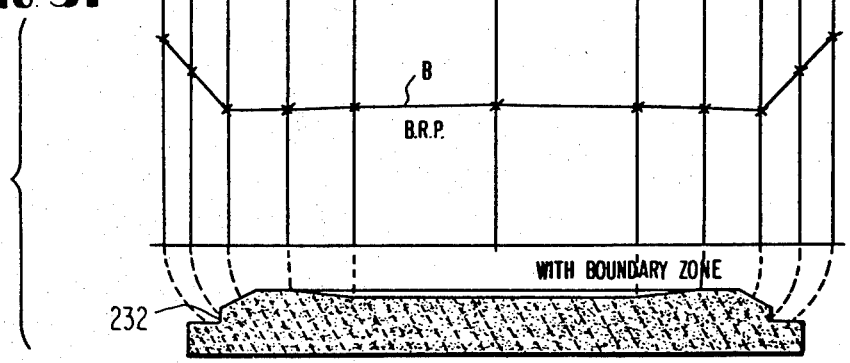
FIG. 31 is a transverse cross section of a diffusion element in accordance with FIG. 28 and an associated bubble release pressure plot exemplary of said element.

The benefits of providing a boundary zone are illustrated graphically in FIGS. 30 and 31, which show respectively the diffusion elements of FIGS. 27 and 28, without and with boundary zones, respectively. Using the bubble release pressure testing procedure of FIG. 20 and a form of graphical representation similar to that Figure, one may develop bubble release pressure (B.R.P.) curves A and B for the respective elements. Comparison of these curves shows that without the boundary zone there is a minimum M in the bubble release pressure curve at the element vertical side surface 232. When the boundary zone is provided, the bubble release pressure is increased in the area of surface 232 as shown by curve B in FIG. 31. In view of the inverse functional relationship of flow to bubble release pressure, the presence of the boundary zone enables one to control the flow from surface 232, making it less than the flow through the center of the element.

Although the benefits of the boundary zone have been illustrated above by its effect upon a vertical surface, i.e. surface 232, the vertical surface is not required. The upper surface of the boundary zone may for example be a non-vertical surface, such as an outwardly and downwardly inclined surface extending all the way from the upper surface of the element to the upper surface of the peripheral zone at an angle of depression of, for example, about 30 to about 70 degrees, and more preferably about 35 to about 60 degrees, relative to the horizontal.

In FIGS. 23 through 29 there have been shown diffusion elements in which reference lines such as 413A, 413B; 460A, 460B; 463A, 463B and so forth have been used to generally indicate the lateral bounds of various zones such as the central zone, outward zone, boundary zone and peripheral zone. These reference lines have not been drawn to scale nor should they be taken to mean that there should be a clearly identifiable vertical line of demarcation between the respective zones in actual products according to the invention. In diffusion elements within the scope of the invention, it may not be possible to draw any line of division between zones where material of significantly greater and lesser density or compaction will be found immediately to either side of the division between two zones. Rather these bounds have been given to illustrate the lateral extent of a volume which, when compared as a whole with an adjacent volume, exhibits the desired difference in apparent volumetric compression ratio.

It is believed that many applications of the invention will involve elements wherein the apparent volumetric compression ratio of the central zone has been enhanced, relative to the outward zone, by at least about 2%, more particularly about 2 to about 20% and preferably about 3 to about 15%. The foregoing percentages are obtained by expressing the difference in apparent volumetric compression ratios of the two zones as a percentage of the volumetric compression ratio of the outward zone. Similarly, most applications of the invention will involve enhancement of the apparent volumetric compression ratio of the boundary zone, relative to a further portion (such as the outward zone) of the diffusion element surrounded by the boundary zone, by at least about 10%, more particularly by about 10 to about 35% and preferably by about 35 to about 100%.

In principle, the invention is not limited to diffusion elements of a specific pore size, but many applications of the invention will involve diffusion elements in which the pore size is in the range of about 60 to about 600 microns, more particularly about 90 to about 400 microns and preferably about 120 to about 300 microns as computed in applying the bubble release pressure to the equation shown in ASTM E-128 $D = 30\gamma/P$ wherein D=maximum pore diameter $\gamma$=surface tension of the test liquid in dynes/cm, and p=pressure in mm of Mercury.

Generally, unused diffusion elements in accordance with the invention will have a specific permeability in the range of about 6 to about 200 SCFM, more particularly about 12 to about 70 SCFM and most preferably about 15 to about 35 SCFM in the case of alumina and silica sewage aeration diffusion elements.

While most diffusion elements in accordance with the invention will have a bubble release pressure in the range of about 2 to about 20μ and more particularly about 4 to about 15, the most preferred bubble release pressure for the preferred sewage aeration diffusion elements disclosed herein is about 5 to about 10.

The above-described techniques of enhancement of apparent volumetric compression ratio may be used to produce any desired amount of improvement in the uniformity of flow distribution across a diffusion element, and it would be virtually impossible to predict the minimum degree of improvement which might ever be considered functionally significant, given the potential for changes in the quality of instrumentation and technological need. However, certain classes of diffusion elements are illustrative of the type of benefits which can be produced. These include diffusion elements wherein the coefficient of variation of the gas discharge surface is not greater than about 0.25, based on the values of bubble release pressure measurements of at least five equally spaced points along each of two perpendicular reference lines extending across the surface of the element and through the center thereof. More preferred examples include diffusion elements, as just described, in which the coefficient of variation is in the range of about 0.05 to about 0.25 or more preferably less than about 0.05.

As previously disclosed the solid particles in the boundary zone of a diffusion element according to the invention can be pressed to a greater apparent volumetric compression ratio as compared to the particles in the outward zone by forming the upper gas discharge surface above the boundary zone with a downward and outward slope at an angle of depression in a range of about 10 to about 80 degrees relative to the horizontal, with many applications of the invention falling in the range of about 20 to about 70 degrees and more preferably about 25 to about 65 degrees, with about 25 degrees being considered the optimum for the preferred sewage aeration elements.

Figure 32B:
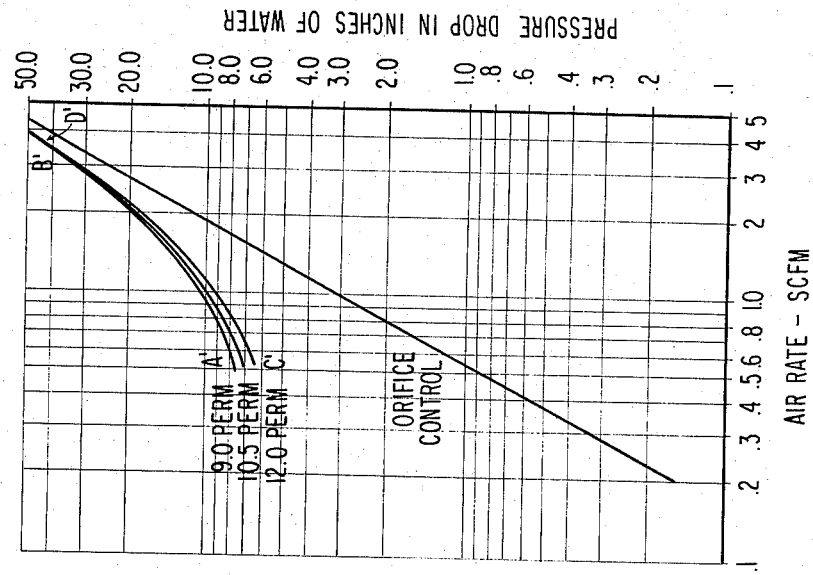
FIGS. 32A and 32B are pressure versus flow diagrams illustrating the benefits of a preferred embodiment of the invention in which a plurality of diffusion elements each has its own individual flow regulating means.
Figure 32A:
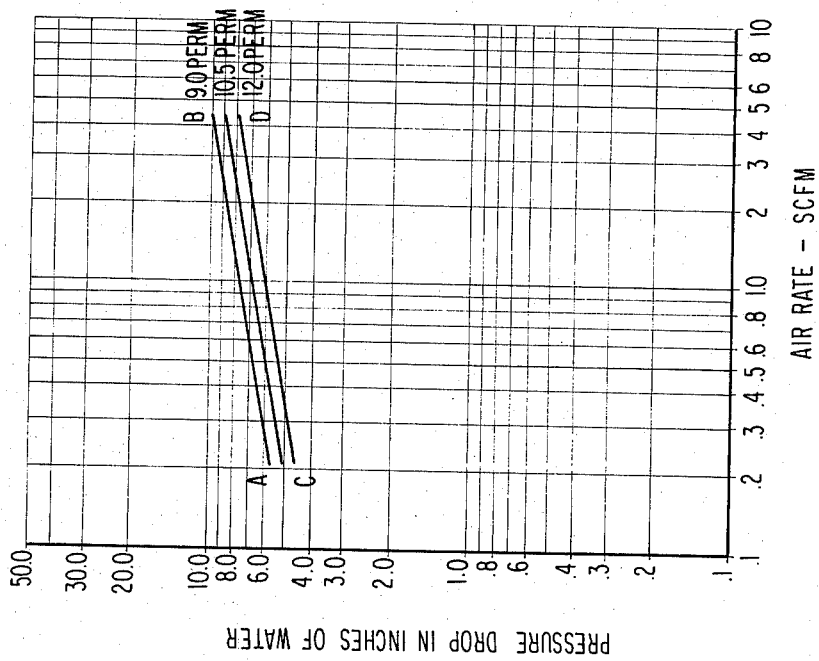

When at least a portion (including all) and preferably at least a major portion of the diffusion elements in a given gas treatment system are mounted on separate or individual plenums, so that each of the respective plenums and each of the respective elements in such portion are supplied with treating gas and/or cleaning gas through separate or individual flow control means, certain advantages accrue in respect to gas distribution and/or fouling rate and/or cleaning efficacy. The flux rate or rate of gas discharge per unit area of a multi-pore diffusion element influences the size of the bubbles formed and the efficiency of the diffusion element expressed as the fraction of oxygen or other treating gas absorbed, e.g. oxygen transfer efficiency (OTE). Generally higher flux rates result in lower efficiencies. Further, with a given number of elements being supplied a given rate of air, the maximum efficiency will be obtained when all the diffusion elements are operating at a uniform flux rate. However, in the manufacture of diffusion elements there are usually variations in such properties as permeability, dynamic wet pressure and others. More specifically, diffusion elements which are normally made in the same way, to the same specifications, can differ significantly from one another in permeability and other properties. FIGS. 32A–32B illustrate how the resultant pressure/flow relationships of such elements can also differ significantly.

Assume that there are two diffusion elements, one having a permeability of about 12 and the other having a permeability of about 9. Assume further that they are mounted without the above-mentioned separate or individual flow regulating means in such a manner as to be supplied with air at substantially the same pressure through a common plenum to deliver a combined flow of approximately 2.6 SCFM for an average of about 1.3 SCFM per element.

Curves AB and CD respectively of FIG. 32A indicate the air rates for the above elements at various pressure drops, measured in inches of water gauge, while an intermediate curve provides similar information for an element of average (10.5) permeability. At a typical pressure drop of about 7 inches in water gauge, it will be seen that the flow rate through the element having a permeability of 9 will be about 6 SCFM, while the flow for the 12 permeability element will be about 2.0.

FIG. 32B is a plot of the pressure flow characteristics of the same two elements mounted on separate plenums which are furnished with air from a common distribution pipe, each through a 5/16 inch diameter control orifice. In FIG. 32B, the curves A'B' and C'D' respectively indicate the air rates for the above elements at various pressure drops, while an intermediate curve provides similar information for an element of average permeability. From the figure it may be seen that in order to discharge 2.6 SCFM through the two diffusion elements, (average of 1.3), the pressure drop would rise to about 11.0 inches of water gauge due to the effect of the orifice control. The corresponding flow through the 9 permeability element would be about 1.2 SCFM while the flow through the 12 permeability element would be about 1.4. The ratio of the flux rates of the two elements in this case is about 1.2:1 rather than about 3.3:1 as it was in the first case. The air and the power required to provide it will be more effectively used in diffusion elements with separate flow regulating means than in diffusion elements not so equipped.

Additional advantages accrue from the use of individual plenums fed through individual flow regulators. In the case of some organic slimes which are believed to foul the diffusion element surfaces more severely at low flux rates, the disparity between flux rates of diffusion elements of different permeabilities increases more rapidly with time when the elements are mounted on a common plenum, than when they are mounted on separate plenums with individual flow regulating means. Additionally, in cleaning, those elements which have lowest permeability and may thus be most in need of cleaning will receive the least cleaning gas. Unfortunately, those elements which have the highest permeability, and may thus have a lesser need of cleaning, will receive the most cleaning gas. Moreover, the disproportionate flow relationship just described tends to become more aggravated as the cleaning cycle progresses and the more permeable diffusion elements become clean.

According to one embodiment of the invention, the use of elements with separate or individual flow control means as above described is preferably practiced in a system in which at least about 90% (and preferably about 95% or more) of the diffusion elements which receive gas at a uniform pressure are capable when new and preferably also after use and thorough cleaning of delivering a flow rate in SCFM per square foot, which is within about ±15% and more preferably within about ±10% of the average flow rate of all such elements, when operated at 2" w.g. in a dry unsubmerged condition.

Figure 33:
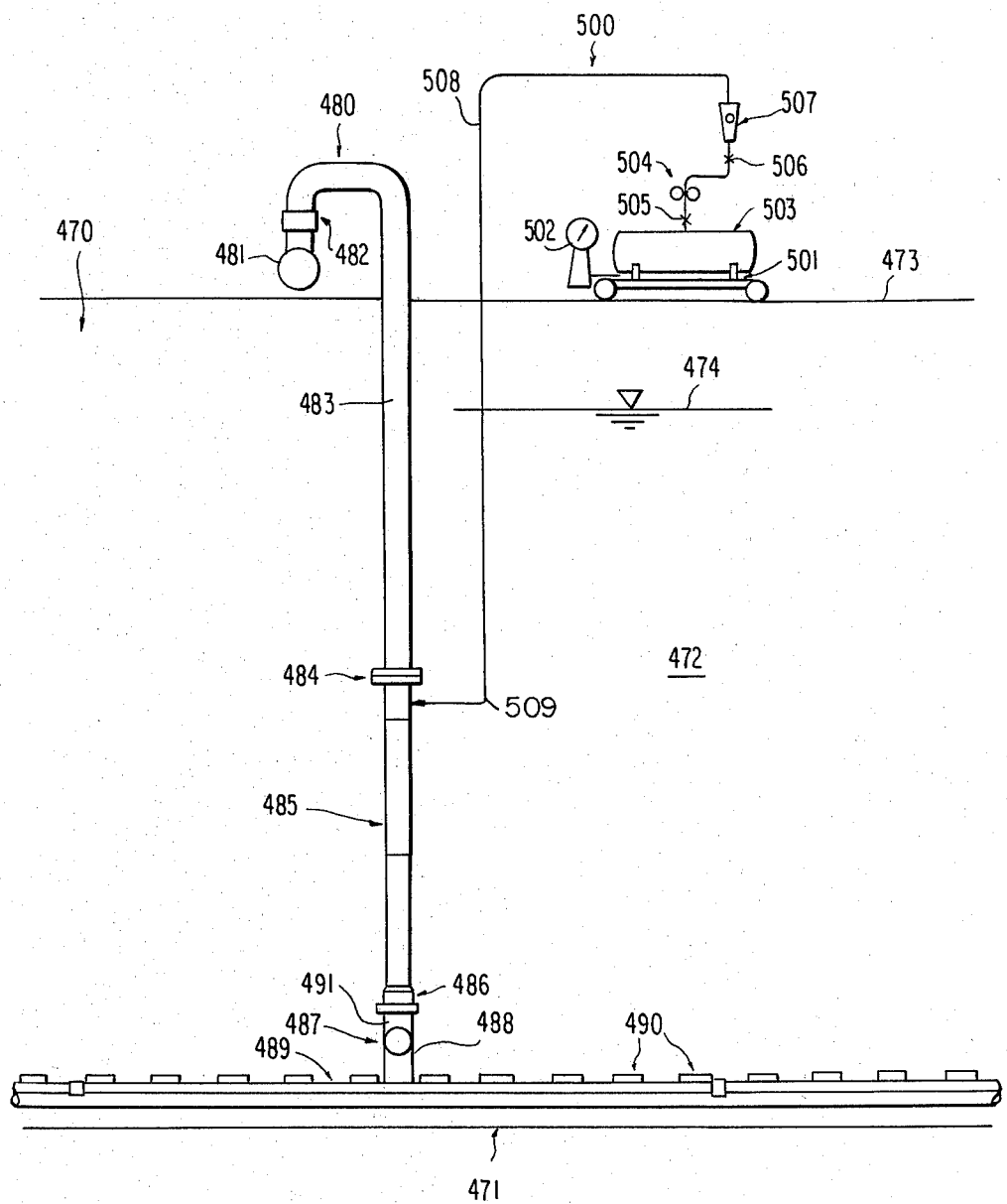
FIG. 33 is a partly schematic diagram of the presently preferred embodiment of a tank-type sewage aeration system including means for supplying and mixing aeration gas and cleaning gas and for discharging same through area-release multi-pore diffusion elements.

A particularly preferred embodiment of the invention is shown in FIG. 33, in which may be seen a schematic representation of a portion of an aeration system for a tank type aeration process. The tank 470 comprises a bottom wall 471 and upright walls including wall 472 which contain a liquid medium having an upper surface 474. Wall 472 has its upper edge 473 at ground level, adjacent to which is a walkway (not shown) provided with the usual safety rails (not shown). In this case, the treatment gas system 480 is an aeration network including blowers (not shown), equipped with the usual filters, pressure regulators, valving and the like, connected to supply air to yard piping 481. Through a follower flange 482 the latter supplies air to a stainless steel drop pipe 483 which extends from a position above the water surface 474 to a coupling 484 below water surface. At coupling 484 a further drop pipe of corrosion resistant material such as PVC or polybutylene plastic pipe is joined to the first drop pipe 483. The second drop pipe 485 extends further downward in the tank to a slip flange 486 and T arrangement 491 through which drop pipe 485 communicates with a generally horizontal header pipe 487 extending generally perpendicular to tank wall 472. Through a plurality of short vertical connectors 488 extending downwardly from header 487 the latter is connected to a plurality of parallel air distribution pipes 489 which extend generally parallel to tank wall 472. Arranged along distribution pipes 489 at suitable intervals, e.g. about 1 to about 4 feet, are a plurality of diffusers 490 comprising a combination of flow regulating means, plenums and diffusion elements depicted in FIGS. 2 through 6. The diffusion elements have the preferred characteristics set forth herein for multi-pore diffusion elements, exhibit the characteristics and dimensions set forth in respect to the diffusion elements depicted in FIGS. 3, 4, 28 and 28A and have an average permeability of about 10.5±15% for a 0.41 sq. ft. by 1 in. thick element.

The gas cleaning system 500 of this embodiment includes a traveling scale 501 equipped with rollers whereby it may be moved along the above mentioned walkway at the tank edge 473 and has an indicator 502. A cylinder 503 for the storage and discharge of cleaning gas rests on the traveling scale 501 and is connected via gas regulator 504, valves 505, 506, flow meter 507, plastic tubing 508 and elbow 509 to that portion 485 of the drop pipe which is of plastic material and is situated below the water line 474. In this schematic view the plastic tubing 508 is shown to be spaced from the drop pipe sections 483, 485 but in actual practice it will be beneficial to strap the plastic tubing securely to the exterior of the drop pipe or to run the tubing along the inside of the drop pipe sections.

The cylinder 503, scale 501 combination above is considered the most convenient arrangement at present for supplying cleaning gas. However a wide variety of alternatives are possible, only a few of which can be referred to herein. For example the cylinder 503 may be replaced by a burner which is adapted to burn a fuel such as sulphur that can be oxidized to a cleaning gas such as sulphur dioxide. Alternatively the cylinder could be replaced with a liquid-gas contacting apparatus in which a liquid source of cleaning gas, such as aqueous acid or solvent, is sprayed in concurrent or countercurrent flow with treatment gas whereby the cleaning gas is introduced into the treatment gas by vaporization or extraction. If carbon dioxide is employed as cleaning gas, it may be obtained from anaerobic digester gas which typically contains both carbon dioxide and methane, from which the carbon dioxide may be stripped and recovered for use as cleaning gas. Moreover, the methane may be burned to produce energy, water and carbon dioxide which may additionally be employed as cleaning gas.

However, for reasons of efficacy, cost and ready availability, the use of HCl is considered to be best. Mole fractions of HCl gas to air in the range of about $7.5 \times 10^{-5}$ to about $3.1 \times 10^{-2}$ or more may for example be used. Against foulants similar to those described in the examples which follow it is contemplated that HCl gas added at a mole fraction of about $3.1 \times 10^{-2}$ would require a cleaning cycle in the range of about 30 to 40 minutes while a mole fraction of about $6.6 \times 10^{-3}$ would require approximately 4 times as long. In either case the total amount of gas consumed would be about 0.25 pounds per diffusion element. At a gas cost of about $0.50 per pound the material cost to clean a diffusion element would be about $0.125. This compares favorably with the cost of refiring the diffusion elements which has been estimated at up to $7.00 per element. It should of course be appreciated that the above mentioned times and gas consumption will vary widely depending on the nature of the foulant deposit(s).

It is our present recommendation to clean the above described 0.41 sq.ft. diffusion elements at a rate of about 2.5 to about 3 SCFM per element which is the approximate equivalent of about 6 to about 8 SCFM per square foot of active discharge area. In general it is recommended that the mole fraction of HCl should be about $4 \times 10^{-5}$ or more, preferably about $8.6 \times 10^{-5}$ or more and most preferably about $4 \times 10^{-4}$ or more, with about $5.7 \times 10^{-5}$ to about $3.1 \times 10^{-2}$ and about $6.6 \times 10^{-3}$ to about $3.1 \times 10^{-2}$ being particularly preferred ranges. It is understood that the above mole fractions are all applicable to use at atmospheric pressure. Where gas pressure at the point of bubble release is other than atmospheric, the values should be corrected by multiplying by 760 and dividing by the total gas pressure at the point of bubble release, expressed in mm of mercury.

EXAMPLES

The following non-limiting examples illustrate the invention. The examples were performed in an experimental apparatus, shown schematically in FIG. 34, designed and operated to produce an environment in which ceramic diffusion elements would become fouled with inorganic precipitates of calcium and iron at a faster rate than would normally be encountered in the field. Small test fixtures were fabricated with diffusion elements of uniform thickness having approximately one square inch of active gas discharge area, the latter having been cut from standard production run Sanitaire (Trademark) diffusion elements made in accordance with standard Sanitaire production specifications consistent with the criteria applicable to the diffusion elements of FIGS. 3 and 4. These were placed in the above mentioned environment and operated in a controlled fashion to observe the relative rate of rise of dynamic wet pressure across the elements and the relative success of various operational and cleaning techniques.

Figure 34:
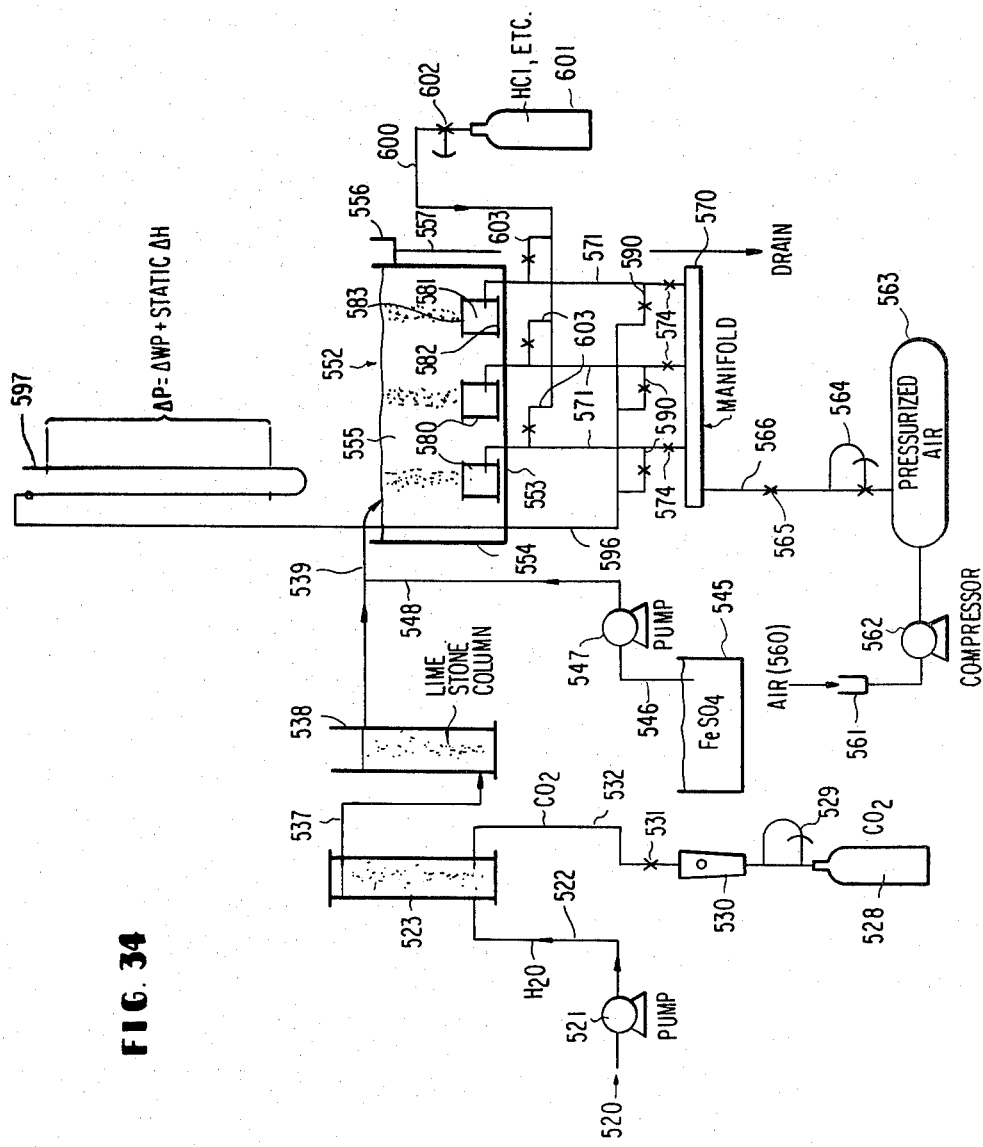
FIG. 34 is a schematic diagram of testing apparatus for producing accelerated fouling of, and for cleaning, multi-pore diffusion elements.

Into the FIG. 34 apparatus is introduced Milwaukee city tap water 520 from Lake Michigan, using a bellows-type pump 521, at a rate of from about 250-280 cc/sec. Via conduit 522 the water enters a closed contact chamber 523 to which gaseous $CO_2$ is added at a rate of about 2-4 scc/sec. The source of $CO_2$ is a cylinder 528 of compressed $CO_2$ gas which is regulated by regulator 529 to an approximate output pressure of 10 psi upstream of an appropriately sized rotameter 530. The flow from rotameter 530 is regulated by metering valve 531 which feeds via conduit 532 into the contact chamber 523. There, the $CO_2$ gas bubbles through the tap water from conduit 522. Both the water and $CO_2$ enter near the bottom and exit near the top of the chamber, which is covered to facilitate dissolving $CO_2$ in the water. The latter is then introduced via transfer line 537 into the bottom of limestone column 538, containing limestone chips, and flows upward through the limestone, exiting near the top of the column. Via supply line 539 the water is sent to aeration tank 552.

Reagent tank 545 contains $FeSO_4$ prepared from $FeCl_3$ acidified with $H_2SO_4$. The $FeSO_4$ is drawn from tank 545 by draw pipe 546 and metering pipe 547, and sent through feed line 548 to its intersection with supply tube 539, at which a mixture is formed which contains 5 mg per liter of $Fe^{++}$ ion in the liquid introduced into aeration tank 552. Said tank has bottom wall 553, side walls 554 and an open top, and is sized to retain a bath 555 of liquid for an average retention time of about 2 hours. The liquid enters at the surface at one end of the tank and discharges into a weir 556 at the liquid surface at the opposite end and is discharged to a floor drain 557.

The aeration test fixtures 580, previously mentioned, are placed in the bottom of said aeration tank 552. Each includes a plenum constructed of a short cylindrical section 581 of PVC pipe with flat PVC sheets serving as the top 583 and bottom 582 of each plenum. A sample of ceramic porous structure approximately 1 inch wide, 1 inch long and 1 inch thick was cemented into the top of each plenum 580. Each plenum is equipped with an air inlet and a liquid purge line (not shown) and contains sufficient lead ballast to maintain each fixture securely on the tank floor 553. The source of air 560 for each ceramic sample is an air compressor 562 which draws air through filter 561 and discharges via storage tank 563 to pressure regulator 564 to regulate the outlet air pressure to about 40-50 psig upstream of flow metering valve 565. This valve delivers a controlled flow of air through conduit 566 to an air manifold 570 which is common to all the test plenums. The air flow via branch lines 571 to each test plenum is individually controlled by metering valves 574. Means (not shown) are provided to add controlled levels of humidity to the gas mixture introduced into the plenums. In branch lines 571, upstream of each plenum, are valve-controlled taps 590 used to monitor dynamic wet pressure over the course of the experiment. Dynamic wet pressure (DWP) is determined with a water-filled manometer 597 connected to taps 590 through a common conduit 596. DWP is equal to the total pressure differential ($\Delta P$) across the elements minus the height of liquid above each test fixture in test bath 555.

Down stream of the pressure taps 590 and upstream of each plenum in branch lines 571 are valve controlled taps 603 through which cleaning gas(es) may be introduced into branch lines 571 to form an admixture with the treating gas prior to entering the plenums and diffusing through the ceramic elements. The source of treating gas is a cylinder 601 containing compressed HCl gas whose flow is controlled in a manner similar to that of the $CO_2$ gas, through a pressure regulator 602 and rotameter (not shown) to the valve-controlled taps 603.

Alternatively, where practical, solutions containing the active agent, e.g. HCl, may be used to furnish cleaning gases by stripping them from solution with air or other gas. In this way the cleaning gas may be furnished in a carefully controlled ratio of cleaning gas to treating gas to permit an evaluation of the effective limits of the cleaning gas with requisite periods of addition to achieve acceptable reductions in DWP. In the experiment schematically described in FIG. 34 the solution-stripping method of gas generation was used to facilitate measuring and controlling the relatively small flow rates at which treating gas was fed to each ceramic element, e.g. about 15-22 scc/sec., as well as the flow of cleaning gas, which may be in the order of 3% to small fractions of 1% of the treating gas flow. Evolution of small quantities of cleaning gas is very conveniently accomplished by bubbling the treating gas stream, air in this instance, through appropriate strength solutions of cleaning gas, e.g. liquid hydrochloric acid, whose solution strength is only very gradually altered with time, whereby a nearly constant mole ratio of cleaning gas to treating gas may be fed and maintained for relatively long periods of time.

Typical data obtained in the above experimental program are depicted in FIG. 35, which plots the log of DWP in inches of water gauge versus the total elapsed time of the experiment for two ceramic test specimens operated under different control programs. A description of these curves is as follows: Curve No. 1 represents a control philosophy which permits the DWP to rise to approximately 3.5 times the initial DWP value prior to initiating gas cleaning, whereas Curve No. 2 allows a DWP rise of only 1.5 times the initial value prior to cleaning.

Curve No. 1

The portion of the curve from point A to point B represents the gradual deposition of foulant materials on the surface of the test diffusion element, causing a gradual rise in DWP until the limiting condition of 3.5 times the initial DWP is reached. At this point, after approximately 1100 hours of continuous operation, in-place gas cleaning was attempted using chlorine gas ($Cl_2$), which is represented by line B-C. A more detailed plot of line B-C is shown in FIG. 36 in which the time scale has been expanded. Prior to the addition of chlorine gas to the treating gas the plenum was carefully drained of any liquid by removing it from the aeration tank while maintaining the flow of treating gas and carefully tipping the unit on its side and allowing the liquid to discharge through the purge line (not shown). After replacement of the unit into the aeration tank and prior to gas cleaning, the air flow rate through the diffusion element in the unit was carefully observed and adjusted as necessary and its DWP was measured. This DWP, equal to about 28 in.wg. and shown as time zero on the expanded scale of FIG. 36, is point B of FIG. 35. At this time chlorine gas was introduced into the treating gas stream at a sufficient rate to produce a mole ratio of chlorine to air (treating gas) of about $9.25 \times 10^{-3}$. A cylinder (not shown) of compressed chlorine gas replaced the HCL cylinder 601 for this portion of the experiment. After about 540 minutes of continuous chlorine addition the DWP dropped from the initial 28.0 in.wg. value to about 12 in.wg. which is point C on FIG. 35.

Since point B is 20 in.wg. above the initial DWP and point C is 4 in.wg. above the initial DWP the reduction in DWP with the chlorine gas is equivalent to a $(20-4)/20 \times 100$ or an 80 percent reduction of the incremental DWP increase.

From point C to point D no cleaning gas was applied to the unit. At point D, gas cleaning with HCl was initiated, which reduced the DWP from about 14.4 in.wg. at point D to about 8 in.wg. at point E. The mole ratio of HCl to treating gas during this period was about $6.5 \times 10^{-3}$ compared to the use of a molar ratio of $9.25 \times 10^{-3}$ with $Cl_2$ gas between points B and C. Thus, as is apparent from both FIGS. 35 and 36, the use of HCl gas appeared to further reduce the DWP from the equilibrium value of DWP obtained by use of chlorine gas alone to the initial or base DWP condition of the element, which was 8.0 in.wg.

Two additional fouling and cleaning cycles are depicted on FIG. 35 for Curve No. 1. The lines E-F and G-H are similar to line A-B, where treating gas was the only gas applied during these periods of time and foulants were being deposited on the element with a resultant rise in DWP.

Lines F-G and H-I represent two cleaning cycles similar to the cycle described between point D and point E, where the cleaning gas was HCl at an approximate mole ratio of HCl to treating gas of about $6.5 \times 10^{-3}$. These two cleaning cycles are also shown on FIG. 36 which indicates that the amount of HCl gas appears substantially more effective than the chlorine at a $9.2 \times 10^{-3}$ mole ratio, not only in respect to the quantity of chemical required, but also in respect to the degree of restoration and shorter time interval required to reach equilibrium conditions with respect to DWP.

It is of interest that the scaling cycles represented by the time intervals between points A and B, E and F and G and H are relatively regular in their duration and that successive cleaning attempts appear to the equally successful, indicating that this cycle may be repeated numerous times without loss of effectiveness.

Curve No. 2

The cleaning strategy for the test specimen indicated by Curve No. 2 was to clean the ceramic element each time the DWP reached a level which was equivalent to about 1.3 times its initial value of 8.0 in.wg. Since FIG. 35 is plotted chronologically with time it is apparent that the start-up or initial operation of the unit depicted by Curve No. 2 was at about 1900 hours from the start-up of the experiment overall.

The general characteristics of Curves No. 1 and 2 are similar. Five fouling and cleaning cycles however are depicted with Curve No. 2 and in each cleaning cycle HCl gas was used at a mole ratio of about $6.5 \times 10^{-3}$ with the treating gas, similar to the cleaning cycles D-E, F-G and H-I of Curve No. 1. FIG. 36 shows one of the characteristic cleaning cycles for Curve No. 2 on the expanded time scale. All the cleaning cycles generated show similar DWP decreases with time and as with HCl gas cleaning in Curve No. 1, complete restoration of the initial DWP was obtained in each case.

As with Curve No. 1, the relative period of fouling from cycle to cycle for Curve No. 2 is somewhat variable; however there are no consistent trends towards reduced or increased intervals before the limiting DWP is reached from the previous base condition. Under field conditions of scaling and/or organic fouling one or the other of the cleaning philosophies indicated by Curves No. 1 and 2 may be preferred over the other, depending upon many factors including, for example, the cost of power, the rate of DWP rise, and the loss in aerator performance with time.

Definitions

Apparent Volumetric Compression Ratio

For purposes of the present invention the "apparent volumetric compression ratio" is used as a basis for comparison of two or more zones of an element formed from a body of solid particles which has been shaped, pressed and rendered coherent by bonding or sintering in a compacted form having pores. As applied to a given zone, said ratio constitutes the quotient obtained when the height of material prior to pressing is divided by the height of material after pressing within said zone. Although it is recognized that pressing may cause some lateral migration of material from one zone to another, with limited effects on the observed compression ratio, such migration can be and normally is ignored, hence the reference to the compression ratio as "apparent". If the height of material differs at different locations within a zone either prior to or subsequent to pressing, an average height is used which is weighted on the basis of area in plan view. The height of all material subjected to compression is considered part of the height prior to compression. Therefore, if an additional height of material is placed upon an original quantity of material which has already been compacted, such as by preliminary partial pressing or vibration compaction, the height of the added material is included in the computation; more specifically, in determining the quotient, the divisor is the fully compacted height of all the material and the dividend is the uncompacted height of both the original and additional material.

Base Condition

This refers to a dynamic wet pressure or to a mean bubble release pressure exhibited by a multi-pore diffusion element at a selected point in the operational history of the diffusion element. It is permissible, for example, to employ as the base condition that pressure exhibited by a multi-pore diffusion element under any of the following circumstances or under whichever of the following circumstances last occurred in the operational history of the element: (a) when first put into operation in the treatment of a liquid medium containing at least one foulant, (b) when last cleaned with a cleaning gas, (c) when last cleaned with means other than cleaning gas, (d) when last maintained in contact with a liquid medium without discharging gas, or (e) at the lowest pressure previously recorded.

According to a particularly preferred embodiment of the invention the dynamic wet pressure or mean bubble release pressure base condition is that pressure exhibited by the element when manufactured or when first put into operation in the treatment of a liquid medium containing at least one foulant. The base condition just described may be and preferably is employed as the base condition in a first and/or subsequent gas cleaning of the element. Thus, according to a particularly preferred embodiment of the invention the reduction of dynamic wet pressure or mean bubble release pressure or both in a first and at least one subsequent gas cleaning is substantial and is calculated based on the base condition of the diffusion element as manufactured or when first used. Preferably, in each of a plurality of distinct, consecutive gas cleaning operations, cleaning is conducted until there has been substantial reduction of the pressure increase relative to the base condition of the element when manufactured or first used.

In a first or subsequent gas cleaning, especially during the first gas cleaning, such reduction may exceed the difference between the element dynamic wet pressure or mean bubble release pressure when manufactured or first used, and the corresponding value of either of such variables as of the commencement of a gas cleaning operation in accordance with the invention.

Boundary Zone

A "boundary zone" may be situated adjacent to and inwardly of a peripheral zone, when such is present, and may be situated between the peripheral zone and the outward zone preferably adjacent the outer edge of the outward zone. It is a zone in which there is a progressive increase, continuous or stepwise, in the apparent volumetric compression ratio of the element in the direction of the peripheral zone, or towards a vertical surface which is near the periphery of the element, which surface may for example be a portion of the side of an element, which portion is inwardly of and in or adjacent to the peripheral zone.

Bubble Release Pressure

The "bubble release pressure" is used to characterize resistance to discharge of a gas such as air under a liquid medium such as water from a point or area on any surface of a diffusion element. As applied to a given point of a given element it constitutes the quasi-static pressure which must be applied to release a bubble from said point on the gas discharge surface. As applied to a given area of the active gas discharge surface area of a diffusion element, which given area may include all or a part of the active area, the bubble release pressure is the mean of the bubble release pressures observed at a statistically significant number of points distributed over said area in a random or uniform manner. For purposes of this disclosure the bubble release pressure is expressed in terms of inches of water gauge, after deduction of the hydrostatic head. The test may be conducted using the apparatus disclosed in the above description of FIG. 20 of this specification, or any other apparatus capable of producing data similar to or convertible to an indication of bubble release pressure. The values of bubble release pressure set forth herein were determined on a "quasi-static" basis in that the test apparatus was adjusted to a sufficiently low rate of flow to release bubbles slowly enough, so that the bubble release pressure observed would be substantially that which would be obtained under static conditions.

Center

The term "center" refers to the position centroid or geometric center of the active gas discharge surface or of the center of the element itself in plan view, whether the element is of regular or irregular shape.

Central Zone

The "central zone" of a diffusion element in accordance with the invention constitutes a central portion of the volume of the diffusion element which lies beneath a central area constituting a stated percentage of the total active gas discharge area of the element, it being understood that the bounds of said volume may or may not coincide with the position or positions of the edges of certain depressions which may be applied to the surface(s) of the element in accordance with the present invention. The "central zone" applies to diffusion elements of varying outline in plan view, whether circular, oval, square, rectangular, polygonal, irregular or otherwise, and the above-mentioned central area has a similar outline to, and a common center with, the active gas discharge surface of the element. In general, the central area which establishes the bounds of the central zone may constitute up to about 80% of the total active gas discharge area, more preferably about 60% and more preferably about 40%.

Cleaning

Cleaning is a process of preventing, retarding or removing foulant deposits in multi-pore diffusion elements with cleaning gas, which is effective against potential or actual flow effects on a multi-pore diffusion element which are or would be attributable to the presence of foulant deposits in or adjacent its gas discharge passages. Such removal of deposits substantially reduces any increased level of dynamic wet pressure and/or bubble release pressure, above the corresponding base condition, attributable to the aforementioned deposits.

Cleaning Gas

A cleaning gas is a gas, as defined herein, which when introduced into the gas discharge passages of a multi-pore diffusion element alone or in admixture with other gases, including treatment gas, in a given concentration and in a given amount, is sufficiently aggressive toward foulant deposits to accomplish cleaning. Such gases may act in any effective mode, such as for example: by dissolving the foulant, especially in the case of precipitated inorganic salt deposits; by dissolving material which attaches the foulant to the diffusion element; by destroying the bond between the foulant and the element; by poisoning, especially in the case of living foulants which may by poisoning be caused to detach from the diffusion element; in any other suitable mode; or in a combination of modes. Thus, for example, the cleaning gas may be or include one or more gaseous (including vaporized) organic and/or inorganic solvent compounds or mixtures of solvent compounds including those compounds capable of existing as liquids and those capable of existing as gases at 20° C. and standard atmospheric pressure. Examples include $H_2O_2$, $CH_3OH$ and other volatile organic solvents. But the preferred cleaning gases are those which exist as gases at 20° C. and which give an acid reaction when dissolved in water, such as for example, $SO_2$, $SO_3$, $CO_2$, $Cl_2$, $ClO_2$, HCl, $NO_x$, $O_3$, $Br_2$, and the like, HCl being particularly preferred.

Coefficient of Variation

For purposes of the present invention, the "coefficient of variation" is the quotient obtained by dividing the "standard deviation" by the "mean". The "standard deviation" represents the root mean square of the deviations from the mean of a stated number of bubble release pressure measurements. The "mean" is the arithmetic average of the aforesaid bubble release pressure measurements. Optimum accuracy is obtained by determining bubble release pressure at random points representative of substantially the entire gas discharge surface of the element, but we have found that with circular plates we can obtain information that is sufficiently accurate to be useful by sampling the bubble release pressure at at least 5 equally spaced points along each of two mutually perpendicular diameters of the plates.

Diminished Hydrostatic Head

An amount of hydrostatic head of any liquid medium, expressed in inches of water gauge, and applied to the effluent surfaces of diffusion elements in a given plant during gas cleaning, which (whether increasing, remaining substantially constant or decreasing at any given time) is less than the pre-cleaning operating head for said plant, as herein defined.

Dynamic Wet Pressure

The pressure differential between the gas pressure at the influent surface of a diffusion element and the hydrostatic head at a point of bubble formation. It is a measure of the resistance to gas flow of an area release diffusion element, including the effects of friction in the gas discharge passages of the element and at the influent and effluent ends of such passages, as well as the effects of surface tension at the effluent ends of the passages. One convenient method for determining the dynamic wet pressure is to determine the difference between the hydrostatic head in the liquid medium at the effluent surface of the diffusion element and the total gas pressure at the influent surface of the element expressed in terms of inches of water gauge.

Enhanced Pressure Differential

A dynamic wet pressure differential maintained during gas cleaning which is greater than the differential that would have existed if the only change in apparatus and operating conditions had been the successive removal of foulant deposits by the cleaning gas.

Enhancement Level

A difference between that dynamic wet pressure existing during cleaning under altered conditions of operation, i.e. enhanced pressure differential, and that dynamic wet pressure which would have existed if the only changes in apparatus and operating conditions had been the successive removal of foulant deposits with the cleaning gas.

Equilibrium Concentration

Equilibrium concentration may be used to indicate the aggressiveness of cleaning gas/treating gas mixtures. The determination is made by bubbling such a mixture through the liquid medium at the temperature at which cleaning is to be conducted. Upon attainment of saturation of the liquid medium with the treating gas and cleaning gas, concentration is measured by any suitable analytical procedure and expressed as the fraction by weight of the cleaning component to total weight. In the case of acidic cleaning agents, a pH meter may be used to determine the negative log of the hydrogen ion concentration, which value represents the equilibrium pH value of the gaseous mixture.

Foulant

A "foulant" is any material, present in a liquid medium and/or in a treatment gas, which tends to form a deposit at (including in or adjacent) the inlets and/or outlets of gas discharge passages of multi-pore diffusion elements or within such passages in such a manner as to affect the gas pressure/flow relationship such as for example by impeding flow or impairing uniformity of distribution of treatment gas discharged through a given element or group of such elements.

The foulant and/or resultant deposits may be of natural and/or synthetic origin, organic and/or inorganic, living or non-living, and composed of liquid, solid and/or gaseous components. Non-limiting examples of the more common foulants are fungal and bacterial strains, algae, protozoa, rotifers, higher life forms, oily residues, organic pipe coatings, soap and detergent residues, dust, inorganic salts, rust and other metal oxides, and hydroxides, such as for example the carbonates and sulfates of such metals as calcium, magnesium, copper, aluminum, iron and other substances which may be suspended in or dissolved in a liquid medium and be rendered less soluble by any means, especially by discharge of treatment gas into the liquid medium at its interface with a multi-pore diffusion element.

The term "present" is employed in this definition in the broadest possible sense so as to embrace foulants which are present in any form of admixture such as, for example, suspensions, dispersions, emulsions, solutions and other forms.

The deposits are usually, but not necessarily, adherent to the diffusion element and tenacious in the sense that under normal conditions of discharge, the treatment gas will not sufficiently remove them from the diffusion elements to overcome their above-indicated effects on gas flow.

The term deposits is also used in a broad sense to include solid and/or liquid components in the form of pasty, semi-solid or solid particles or masses, such as for example, slimes, scales and other incrustations.

The formation of deposits may occur in any manner such as, for example: by mere lodgment, as when a rust particle borne by treatment gas enters the inlet of a gas discharge passage of a diffusion element and lodges within; by accretion, as when tiny oil droplets and dust particles borne by treatment gas adhere to one another and to the influent surface of the element, combining to form a gradually enlarging mass which partly or fully obstructs the inlets of gas discharge passages; by organic growth, as when one or more life-forms present in the liquid medium at the effluent surface of the diffusion element forms layers or networks at such surface which impede the flow of treatment gas or at least impair uniformity of treatment gas distribution; by ingestion, as when suspended solids in the liquid medium are borne into the gas discharge passages by a reverse flow of liquid medium through the diffusion element when the flow of treatment gas is intentionally or unintentionally suspended; or by precipitation (including crystallization), as when insolublized inorganic salts are deposited in the gas discharge passages and/or at their outlets during discharge of the treatment gas.

Gas

For purposes of the present invention a gas is a gaseous material or mixture, which may be or include true gases or vapors or mixtures thereof, and which may also include entrained liquids or solids in the form of fine or substantially colloidal droplets or particles, which material or mixture is in the gaseous state to a sufficient extent under conditions of use for forming bubbles when discharged through a multi-pore diffusion element into liquid media.

Liquid Medium or Media

A "liquid medium" is any material (including single materials or mixtures) which is liquid to a sufficient extent to form gas bubbles therein when gas is discharged therein through a multi-pore diffusion element. The liquid material may for example include one or more organic liquids, or one or more inorganic liquids, or any combination of organic and/or inorganic liquids in admixture (including miscible and immiscible liquids) and may also include other liquid, gas and solid materials which do not deprive the medium of the above-described liquidity under the conditions prevailing during discharge of the treatment gas therein. Also, at least one of the components of the medium, which may be one or more foulant(s) and/or one of the other components of such medium, is subject to change in a predetermined manner in response to discharge of a treatment gas therein. A preferred category of such media is aqueous waste liquors, such as for example, the mixed liquors treated in the activated sludge process, refinery and brewery waste liquors, paper mill white water, and the like.

Mean Bubble Release Pressure

The arithmetic average of a statistically significant number of bubble release pressure measurements at randomly or systematically established locations on any surface of a diffusion element.

Multi-Pore Diffusion Element

In general, such an element is an area release diffuser having an active gas discharge surface of substantial area e.g. usually at least about 20 square inches, more preferably at least about 30 square inches, and still more preferably at least about 40 square inches, having a multiplicity of fine pores closely spaced with respect to one another and distributed in a random or ordered manner throughout said active gas discharge surface. However, it should be understood, for reasons apparent from the above discussion of theoretical considerations, that only a portion of the pores will transmit gas under a given set of operating conditions. On the other hand, there will normally be a plurality of active pores per square inch of active gas discharge area under the design operating conditions of the element, when in its new or as manufactured condition in clear water.

Such elements may include certain optional, additional characteristics or properties, certain of which are preferred embodiments. For example such elements include pores comprising gas discharge passages. Said passages may be essentially linear but are usually tortuous. Although discrete passages are contemplated, elements with substantial numbers or even major proportions of interconnecting passages are more commonly encountered. Irrespective of their degree of linearity, tortuousness, intercommunication or lack thereof, the respective gas discharge passages have discrete or shared inlets at the gas influent surfaces of the elements and outlets at the gas discharge surfaces of the elements. The closely spaced nature of the passages in the preferred elements is indicated in part by the fact that the average lateral spacing between pores is smaller than the average thickness of the elements and is therefore smaller than the average length of the gas discharge passages. The reference to spacing is intended to refer to the spacing between all pores in the diffusion element not merely those which happen to be active at a given set of operating conditions.

It is also preferred that the pores have a pore size which is in the range of about 60 to about 600 and more preferable about 90 to about 400 and most preferably about 120 to about 300 microns, as computed in applying the mean bubble release pressure of the element to the equation $D = 30\gamma/P$, shown in ASTM E-128, wherein $D$ = maximum pore diameter, $\gamma$ = surface tension of the test liquid in dynes/cm, and $p$ = pressure in mm of Mercury.

The elements may be members of any desired shape in plan view and vertical cross section and, as viewed in vertical cross section, include a substantially horizontal portion having a ratio of at least about 4:1, more preferably at least about 6:1 and still more preferably at least about 8:1 between the maximum horizontal dimension of the element and the area-weighted average thickness of the element.

Said horizontal portion preferably also is characterized by having a ratio of active gas discharge area to average thickness, weighed on an area basis, of at least about 10, more preferably at least about 20 and still more preferably at least about 40 square inches of area per inch of thickness.

Said horizontal portion may and preferably does include, beneath its active gas discharge surface, zones of enhanced volumetric compression ratio. For this purpose the said horizontal portion may be regarded as including various zones (defined herein) referred to as the central, outward, boundary and peripheral zones, which may or may not have visible characteristics, but will usually be associated with depressions at the central zone and/or angled surface(s) at the boundary zone. For example, it is contemplated that the central zone would preferably have an apparent volumetric compression ratio which is enhanced relative to that of the outward zone by at least about 2%, preferably about 2 to about 20%, and more preferably about 3 to about 15%. Where a boundary zone is provided, preferred applications of the invention will involve enhancement of the apparent volumetric compression ratio of the boundary zone, relative to the outward zone, by at least about 10%, more particularly about 10 to about 35%, and preferably about 35 to about 100%.

The diffusion elements may include a wide variety of particulate (including fibrous) materials of both organic and inorganic character, but preferably have a modulus in compression of at least about $0.2 \times 10^5$ psi, more particularly about $0.2 \times 10^5$ to about $4 \times 10^5$ psi in applications involving softer particulate materials, and preferably about $4 \times 10^5$ to about $6 \times 10^6$ psi when working with the harder inorganic materials.

Outward Zone

The "outward zone" includes all or a substantial portion of the body of the diffusion element beneath the total active gas discharge surface other than the "central zone". As compared to the central zone the outward zone lies further outward from the center of the element than the central zone. Other than the central zone, the outward zone may or may not be the sole additional zone in the element.

Oxygen-containing Gas

An "oxygen-containing gas" includes pure oxygen and any gas (as defined herein) that includes oxygen in appreciable quantities and is useful as a treatment gas.

Peripheral Zone

The "peripheral zone", if such is present, constitutes a portion of the volume of the diffusion element at or along the edge of the active gas discharge surface of the element which normally constitutes the outermost edge or periphery of the element. The peripheral zone, whether annular or non-circular, is one in which the element has been treated by pressing, including a combination of pressing with other techniques, to develop a zone having lesser permeability (including no permeablity), greater density or lesser height than all or a portion of the outward zone. An element with a peripheral zone may or may not include a boundary zone.

Pre-cleaning Operating Head

The total amount of hydrostatic head of any liquid medium, expressed in inches of water gauge, and applied to the effluent surfaces of diffusion elements in a given plant during a period prior to the commencement of cleaning, including either the time weighted average of the liquid head during the last ninety (90) days of operation prior to cleaning, or more preferably the last head applied in normal operation prior to cleaning, or still more preferably the larger of said average and said last head.

SCFM

SCFM means rate of gas flowing in terms of cubic feet per minute corrected to a temperature of 20° C., an absolute pressure of 760 mm of mercury and a relative humidity of 36%.

Specific Permeability

The term "specific permeability" describes the overall rate of passage of gas through a dry diffusion element, and for purposes of the present invention is expressed in standard cubic feet per minute per square foot of area per inch of thickness at a driving pressure of 2 inches in water gauge under standard conditions of temperature, pressure and relative humidity (20° C., 760 mm Hg. and 36%, respectively). The specific permeability is calculated from the equation $G=Q(t/A)$, wherein G equals specific permeability, Q equals flow in standard cubic feet per minute, t equals thickness of the element in inches and A equals the mean effective gas flow area in ft.$^2$ through the element normal to the direction of flow. If the gas discharge surface of the diffusion element overlies portions of the element which are of varying thickness, the average thickness is used, the thickness being weighted on the basis of area.

System Back Pressure

This is a measure of the overall resistance to flow of an entire gas distribution network or of at least a portion of such a network at a given rate of flow through the diffusion elements. The resisitance in question includes the frictional and surface tension resistance attributable to the conduits, to the diffusion elements and other elements of the network, to fouling, whenever such is present and to the hydrostatic head. It is assumed that the network or portion thereof which is under consideration comprises a plurality of pneumatically interconnected diffusion elements. These are elements which share a source of treating gas, and which thus contribute along with conduits and other components of the network to a combined resistance to flow which must be overcome by that source. By way of illustration and not limitation, activated sludge plants are known in which the design system back pressure is about 3 to about 20, more typically about 4 to about 15, and frequently about 6 to about 10 psi measured at the compressor or blower outlets.

Tank-type Process

For purposes of the present disclosure, a tank type process, whether for aeration or other purposes, is a process of discharging treating gas into a liquid medium at a rate of at least about 2, more preferably at least about 4, and still more preferably at least about 6 SCFM per 1000 cubic feet of liquid medium, a rate which is far in excess of those employed in the sewage treatment lagoons or ponds in which tubing type diffusers are installed. Alternately, or in combination with the foregoing, a tank-type process may be characterized by an average liquid medium retention time of less than about 48 hours, more commonly less than 24 hours, and quite frequently less than 12 hours, considerably less than the retention times of the aforementioned lagoons or ponds.

Treatment Gas

This is a gas, as defined herein, which includes one or more components that is able to effect a predetermined desired change in at least one component of a liquid medium, and is less aggressive towards foulant deposites than a cleaning gas, as defined herein.

Vertical

The term "vertical", as applied to a surface of a diffusion element, includes truly vertical and near vertical, e.g. within about 20° of vertical.

What is claimed is:

1. In a process of treating a liquid medium by passing treating gas through multi-pore diffusion elements submerged in the medium, wherein foulants in the medium or treating gas have a tendency to form deposits in the elements or at their surfaces and to cause a progressive increase in the dynamic wet pressure and/or mean bubble release pressure of the diffusion elements relative to a previous base condition of said elements, and in which the elements are cleaned in place by passing a cleaning gas through them alone or in admixture with treating gas, said cleaning gas having a different composition than said treating gas and being capable of reducing the dynamic wet pressure and/or the mean bubble release pressure of fouled diffusion elements, the improvement which comprises:

conducting said gas cleaning with sufficient frequency, including continuously, and with sufficient amount(s) of cleaning gas for restricting any potential or actual increase in the dynamic wet pressure level of the elements, above a previous base condition of said dynamic wet pressure, to about 25 inches or less of water gauge of 2 SCFM per square foot of active gas discharge surface of the elements, and/or restricting any potential or actual increase in the mean bubble release pressure level of the elements, above a previous base condition of said mean bubble release pressure, to about 25 inches of water gauge or less;

simultaneously applying said cleaning gas to one or more groups of at least about 10 diffusion elements per group by feeding the cleaning gas to the elements through a gas distribution network having a submerged portion including a plurality of flow regulating means, a plurality of plenums and a plurality of diffusion elements, said flow regulating means being connected with said plenums to deliver gas to said plenums, said flow regulating means being sized or adjusted to deliver said gas at a substantially similar rate to each of said plenums, each of said plenums being connected directly or indirectly with one or more of said diffusion elements whereby said diffusion element or elements connected to one of said plenums can be supplied with gas at a substantially similar rate as compared to the rate at which gas is supplied to the diffusion elements connected to the other plenum or plenums; and discharging treating gas alone or in admixture with cleaning gas, through the diffusion elements for an extended cycle of operation constituting at least about 30 total days of continuous or intermittent passage of treatment gas through the elements;

whereby fouling is restrained during said cycle by applying the cleaning gas with sufficient frequency and in sufficient amounts to maintain the dynamic wet pressure and/or mean bubble release pressure at or below the aforesaid levels.

2. In a process of treating a liquid medium by passing treating gas through multi-pore diffusion elements submerged in the medium, wherein foulants in the medium or treating gas tend to form deposits in the elements or at their surfaces causing a progressive increase in the dynamic wet pressure and/or the mean bubble release pressure of the diffusion elements relative to a previous base condition of said elements, and in which the elements are cleaned in place by intermittently passing a cleaning gas through them, alone or in admixture with treating gas, said cleaning gas having a different composition than said treating gas and being capable of reducing the dynamic wet pressure and/or the mean bubble release pressure of fouled diffusion elements, the improvement which comprises:

initiating cleaning with said cleaning gas when the dynamic wet pressure level of the elements has increased to a level above their base condition by an amount which is equal or equivalent to about 25 inches of water gauge or less at 2 SCFM per square foot of active gas discharge surface, or when the mean bubble release pressure of the diffusion elements has increased to a level above their base condition by about 25 inches of water gauge or less;

simultaneously applying said cleaning gas to one or more groups of at least about 10 diffusion elements per group by feeding the cleaning gas to the elements through a gas distribution network having a submerged portion including a plurality of flow regulating means, a plurality of plenums and a plurality of diffusion elements, said flow regulating means being connected with said plenums to deliver gas to said plenums, said flow regulating means being sized or adjusted to deliver said gas at a substantially similar rate to each of said plenums, each of said plenums being connected directly or indirectly with one or more of said diffusion elements whereby said diffusion element or elements connected to one of said plenums can be supplied with gas at a substantially similar rate as compared to the rate at which gas is supplied to the diffusion elements connected to the outer plenum or plenums; and applying said cleaning gas in one or more periods of application and in a sufficient amount of for reducing said increase in dynamic wet pressure by at least about 0.3 times said increase in dynamic wet pressure or for reducing said increase in mean bubble release pressure by at least about 0.5 times said increase in means bubble release pressure.

3. The process according to claim 2 wherein said cleaning gas is HCl in a gas mixture in a mole fraction in the gas mixture at atmospheric pressure in the range from about $6.6 \times 10^{-3}$ to about $3.1 \times 10^{-2}$ and said period of application of said cleaning gas is from about 30 to about 160 minutes.

4. The process according to claim 3 wherein the cleaning gas is passed through said diffusion elements at a rate from about 6 to about 8 SCFM per square foot of active discharge area.

5. The process according to claim 2 wherein said cleaning is initiated when said increase in dynamic wet pressure of said elements above said base condition, or said increase in mean bubble release pressure of said elements above said base condition is at least about 0.5 inches of water gauge.

6. The process according to claim 2 wherein said cleaning is initiated when said increase in dynamic wet pressure of said elements above said base condition, or said increase in mean bubble release pressure of said elements above said base condition is at least about 0.7 inches of water gauge.

7. The process according to claim 2 wherein said cleaning is initiated when said increase in dynamic wet pressure of said elements above said base condition, or said increase in mean bubble release pressure of said elements above said base condition is from about 0.5 to about 15 inches of water gauge.

8. The process according to claim 2 wherein said cleaning is initiated when said increase in dynamic wet pressure of said elements above said base condition, or said increase in mean bubble release pressure of said elements above said base condition is from about 0.5 to about 7 inches of water gauge.

9. The process according to claim 2 wherein said cleaning is initiated when said increase in dynamic wet pressure of said elements above said base condition, or said increase in mean bubble release pressure of said elements above said base condition, is from about 0.7 to about 15 inches of water gauge.

10. The process according to claim 2 wherein said cleaning is initiated when said increase in dynamic wet pressure of said elements above said base condition, or said increase in mean bubble release pressure of said elements above said base condition is from about 0.7 to about 7 inches of water guage.

11. The process according to claim 2 wherein said cleaning is conducted until the dynamic wet pressure of said elements is reduced by at least about 0.5 of the increase in dynamic wet pressure or mean bubble release pressure above said base condition caused by said foulants.

12. The process according to claim 2 wherein said cleaning is conducted until the dynamic wet pressure or mean bubble release pressure of said elements is reduced by at least about 0.8 of the increase in dynamic wet pressure or mean bubble release pressure above said base condition caused by said foulants.

13. The process according to claim 2 wherein said cleaning is conducted until the mean bubble release pressure of said elements is reduced by at least about 0.9 of the increase in bubble release pressure above said base condition.

14. The process according to claim 2 wherein during the cleaning period, a surface-active agent is applied to the interfaces between the diffusion elements and the medium in an amount sufficient to reduce the surface tension of the liquid medium.

15. The process according to claim 14 wherein at least about 60 percent of the cleaning gas is discharged from said diffusion elements while said surface-active agent is present at said interfaces between the diffusion elements and the liquid medium.

16. The process according to claim 14 wherein at least about 80 percent of the cleaning gas is discharged from said diffusion elements while said surface-active agent is present at said interfaces between the diffusion elements and the liquid medium.

17. The process according to claim 2 wherein at least about 60 percent of the cleaning gas is discharged from said diffusion elements while an enhanced pressure differential of at least about 2 inches of water is maintained across said diffusion elements.

18. The process according to claim 2 wherein at least about 80 percent of the cleaning gas is discharged from said diffusion elements while an enhanced pressure differential of at least about 2 inches of water is maintained across said diffusion elements.

19. The process according to claims 1 or 2 wherein said liquid medium is an aqueous waste liquor from domestic sewage, or industrial wastes.

20. The process according to claims 1 or 2 wherein the treating gas is an oxygen-containing gas.

21. The process according to claims 1 or 2 wherein the treating gas is air.

22. The process according to claims 1 or 2 wherein said diffusion elements each comprise a porous mass of finely-divided solid particles bonded together, and having a fine-bubble emitting gas discharge surface free of macro openings and capable of discharging gas in a substantially uniform manner.

23. The process according to claim 22 wherein said finely-divided particles are ceramic particles in said mass which are bonded together.

24. The process according to claim 22 wherein said diffusion elements have a bubble release pressure in the range of about 2 to about 20 inches of water gauge.

25. The process according to claim 22 wherein said diffusion elements have a bubble release pressure in the range of about 3 to about 15 inches of water gauge.

26. The process according to claim 22 wherein said diffusion elements have a bubble release pressure in the range of about 4 to about 10 inches of water gauge.

27. The process according to claims 1 or 2 wherein said diffusion elements comprise finely pored ceramic plates having an upper gas discharge surface with a bubble release pressure in the range of about 2 to about 20 inches of water, said elements including a central zone and an outward zone, said central zone having an enhanced volumetric compression ratio relative to said outward zone, said element having pore sizes in the range of about 60 to about 600 microns, and a coefficient of variation of the bubble release pressure of the gas discharge surface not greater than about 0.25 based on the values of bubble release pressure measurement of at least 5 equally spaced points along each of two perpendicular reference lines extending across said upper surface of the element and through the center thereof.

28. The process according to claim 27 wherein the area of the central zone comprises from about 10 to about 80 percent of the total area of the gas discharge surface.

29. The process according to claim 27 wherein the area of the central zone comprises from about 25 to about 70 percent of the total area of the gas discharge surface.

30. The process according to claim 27 wherein said bubble release pressure is in the range of from about 5 to about 10 inches of water gauge.

31. The process according to claim 27 wherein the volumetric compression ratio of the central zone has been enhanced, relative to the outward zone, by at least about 2 percent.

32. The process according to claim 27 wherein the volumetric compression ratio of the central zone has been enhanced, relative to the outward zone, by from about 3 to about 15 percent.

33. The process according to claims 1 or 2 wherein at least about 90 percent of the diffusion elements to which said cleaning gas is applied are able, when new or when thoroughly cleaned, to transmit gas at a flow rate within about 15 percent of the average flow rate of all such elements when tested at 2 inches of water gauge in a dry condition.

34. The process according to claims 1 or 2 wherein at least about 95 percent of the diffusion elements to which said cleaning gas is applied are able, when new or when thoroughly cleaned, to transmit gas at a flow rate within about 10 percent of the average flow rate of all such elements when tested at 2 inches of water gauge in a dry condition.

35. The process according to claims 1 or 2 wherein said diffusion elements comprise finely-pored ceramic plates having upper gas discharge surfaces with a bubble release pressure in the range from about 2 to about 20 inches of water, each of said elements including a central zone, an outward zone, a boundary zone, a peripheral zone and vertical cylindrical sides, said central zone having an enhanced volumetric compression ratio relative to said outward zone by from about 3 to about 15 percent, said boundary zone having an enhanced volumetric compression ratio relative to said outward zone by from about 10 to about 100 percent, and each of said elements having a coefficient of variation of the bubble release pressure of its upper gas discharge surface not greater than about 0.25 based on the values of bubble release pressure measurements of at least 5 equally spaced points along each of two perpendicular reference lines extending across said upper gas discharge surface of the element and through the center thereof.

36. The process according to claim 35 wherein the area of the central zone comprises from about 10 to about 80 percent of the total area of the gas discharge surface.

37. The process according to claim 35 wherein the area of the central zone comprises from about 25 to about 70 percent of the total area of the gas discharge surface.

38. The process according to claim 35 wherein the vertical cylindrical sides of said diffusion elements are semi-permeable and free of adherent material preventing bubble emission, the diffusion elements are supported by holders which at least partly enclose plenums and are secured to said holders by peripheral retaining means and sealed to said holders by non-adherent elastomeric seals at the upper edge of said vertical cylindrical sides.

39. The process according to claims 1 or 2 wherein said diffusion elements each have a gas discharge surface area of at least about 20 square inches.

40. The process according to claims 1 or 2 wherein said diffusion elements each have a gas discharge area of at least about 40 square inches.

41. The process according to claims 1 or 2 wherein said diffusion elements each have a gas discharge area of at least about 40 square inches per inch of thickness of said element.

42. The process according to claims 1 or 2 wherein said cleaning gas dissolves, or poisons said foulant or material which attaches said foulant to said diffusion elements.

43. The process according to claims 1 or 2 wherein said cleaning gas is an oxidizing agent.

44. The process according to claims 1 or 2 wherein said foulants comprise living organisms and said cleaning gas is a poison for said organisms.

45. The process according to claim 1 or 2 wherein said cleaning gas is an organic compound having a solvent effect on said foulant or on material which attaches said foulant to said diffusion elements.

46. The process according to claims 1 or 2 wherein the cleaning gas contains at least one member selected from the group consisting of $H_2O_2$, $CH_3OH$, $SO_2$, $CO_2$, $Cl_2$, $ClO_2$, $HCl$, $NO_x$, $O_3$ and $Br_2$.

47. The process according to claims 1 or 2 wherein said cleaning gas is soluble in water and forms an acidic solution when dissolved in water.

48. The process according to claim 47 wherein said cleaning gas is present in a concentration in said treating gas sufficiently high to form an aqueous acidic solution having a pH at equilibrium of about 3 or less.

49. The process according to claim 47 wherein said cleaning gas is present in a concentration in said treating gas sufficiently high to form an aqueous acidic solution having a pH at equilibrium of about 2 or less.

50. The process according to claim 47 wherein said cleaning gas is present in a concentration in said treating gas sufficiently high to form an aqueous acidic solution having a pH at equilibrium of about 1 or less.

51. The process according to claim 47 wherein said cleaning gas is present in a concentration in said treating gas sufficiently high to form an aqueous acidic solution having a pH at equilibrium of about 0.7 or less.

52. The process according to claim 47 wherein said cleaning gas is present in a concentration in said treating gas sufficiently high to form an aqueous acidic solution having a pH at equilibrium of about 0.5 or less.

53. The process according to claims 47 wherein said cleaning gas is present in a concentration in said treating gas sufficiently high to form an aqueous acidic solution having a pH at equilibrium of about 0.4 or less.

54. The process according to claim 47 wherein said cleaning gas contains HCl in a mole fraction at atmospheric pressure of at least about $4 \times 10^{-5}$.

55. The process according to claim 47 wherein said cleaning gas contains HCl in a mole fraction at atmospheric pressure of at least about $7.5 \times 10^{-5}$.

56. The process according to claim 47 wherein said cleaning gas contains HCl in a mole fraction at atmospheric pressure of at least about $4 \times 10^{-4}$.

57. The process according to claim 47 wherein said cleaning gas contains HCl in a mole fraction at atmospheric pressure at least about $1.3 \times 10^{-3}$.

58. The process according to claim 47 wherein said cleaning gas contains HCl in a mole fraction at atmospheric pressure in the range from about $6.6 \times 10^{-3}$ to about $3.1 \times 10^{-2}$.

59. The process according to claim 47 wherein said cleaning gas contains HCl in a sufficiently high concentration to form an aqueous acidic solution having a pH at equilibrium of less than about 0.7.

60. The process according to claim 47 wherein said cleaning gas contains HCl in a sufficiently high concentration to form an aqueous acidic solution having a pH at equilibrium of less than about 0.4.

61. The process according to claims 1 or 2 wherein said cleaning gas being passed through said diffusion elements is admixed with water vapor.

62. The process according to claims 1 or 2 wherein said cleaning gas being passed through said diffusion elements is admixed with water vapor and treating gas, and the admixture is obtained by dissolving cleaning gas in water, and passing treating gas through the resulting solution of cleaning gas in water.

63. The process according to claims 1 or 2 wherein said cleaning is conducted or initiated to restrict said increase in dynamic wet pressure of the elements above said base condition, or said increase in mean bubble release pressure of the elements above said base condition to about 15 inches or less of water gauge.

64. The process according to claims 1 or 2 wherein said cleaning is conducted or initiated to restrict said increase in dynamic wet pressure of said elements above said base condition, or said increase in mean bubble release pressure of said elements above said base condition to about 7 inches or less of water gauge.

65. The process according to claims 1 or 2 wherein in a portion of said cycle or period of application of said cleaning gas, the dynamic wet pressure across said diffusion elements is increased.

66. The process according to claim 65 wherein the dynamic wet pressure is increased by at least about 1 inch of water gauge.

67. The process according to claim 65 wherein the dynamic wet pressure is increased by at least about 2 inches of water gauge.

68. The process according to claim 65 wherein the dynamic wet pressure is increased by decreasing the depth of submergence of the diffusion elements in the liquid medium.

69. The process according to claim 65 wherein the dynamic wet pressure is increased by increasing the total gas pressure of the gas applied to said elements.

70. The process according to claims 1 or 2 wherein in a portion of said cycle or period of application of said cleaning gas the dynamic wet pressure across said diffusion elements is maintained substantially constant.

71. The process according to claims 1 or 2 wherein in a portion of said cycle or period of application of said cleaning gas, the rate of decrease of the dynamic wet pressure across said diffusion elements is less than the decrease which would be attributable solely to application of said cleaning gas.

72. The process according to claims 1 or 2 wherein at least about 40 percent of the cleaning gas is discharged from said diffusion elements while an enhanced pressure differential of at least about 2 inches of water is maintained across said diffusion elements.

73. The process of claims 1 or 2 wherein the flow regulating means is mounted with the plenum.

74. The process of claim 73 wherein the flow regulating means responds exponentially to pressure.

75. The process of claim 73 wherein the flow regulating means includes means to restrict the flow to unidirectional flow.

76. In a process of treating a liquid medium by passing oxygen-containing gas through multi-pore diffusion elements submerged in the medium wherein foulants in the medium or oxygen-containing gas have a tendency to form deposits in the elements or at their surfaces and to cause a progressive increase in the dynamic wet pressure and/or mean bubble release pressure of the diffusion elements relative to a previous base condition of said elements, a method of cleaning said elements in place comprising;

positioning diffusion elements for submergence in said liquid medium having a bubble release pressure in the range of about 2 to about 20 inches of water gauge, at least about 90 percent of said diffusion elements when new or thoroughly cleaned being able to transmit gas at a flow rate within about 15 percent of the average flow rate of all such elements when tested in a dry condition at a pressure of 2 inches of water gauge, said elements having a coefficient of variation of bubble release pressure of the gas discharge surface not greater than about 0.25 based on values of bubble release pressure measurements for at least 5 equally spaced points along each of two perpendicular reference lines across the gas discharge surface and through the center thereof;

initiating cleaning when the dynamic wet pressure level or mean bubble release pressure of the diffusion elements has increased above said base condition by from 0.7 to about 25 inches of water gauge by simultaneously applying a mixture of HCl and said oxygen-containing gas to the diffusion elements, said HCl being present in a mole fraction of at least about $7.5 \times 10^{-5}$ and sufficiently high to effectuate cleaning of said diffusion elements, said mixture being applied through a gas distribution network having a submerged portion including a plurality of flow regulating means, a plurality of plenums, and a plurality of diffusion elements, said flow regulating means being connected to said plenums and adapted to deliver gas at a substantially similar rate to each of said plenums, each of said plenums being connected directly or indirectly with one or more of said diffusion elements whereby said diffusion element or elements connected to one of said plenums can be supplied with gas at a rate substantially similar to the rate of gas supplied to the diffusion elements connected to the other plenum or plenums; and applying said mixture of HCl and oxygen-containing gas in one or more periods in an amount sufficient for reducing said increase in dynamic wet pressure by at least about 0.3 times said increase in dynamic wet pressure or for reducing said increase in mean bubble release pressure by at least about 0.5 times said increase in mean bubble release pressure.

77. The process according to claim 2 wherein said diffusion elements are divided into two or more groups, said treating gas is applied to the diffusion elements in a portion of said groups at an enhanced rate and/or pressure differential, and cleaning is initiated by selectively admixing cleaning gas with the treating gas applied to said portion.

78. The process according to claim 77 wherein each of said groups constitutes the elements within an individual tank in a multi-tank plant.

79. The process according to claims 1 or 2 wherein during at least a portion of the cleaning an enhanced pressure differential of at least about 0.5 inches of water is applied across the diffusion elements.

80. The process according to claim 2 wherein an enhanced pressure differential is applied across said diffusion elements before cleaning is initiated.

* * * * *